United States Patent [19]

Huettner et al.

[11] 3,771,135

[45] Nov. 6, 1973

[54] REMOTE TERMINAL SYSTEM

[75] Inventors: Robert E. Huettner, Acton; Edward B. Tymann, Natick, both of Mass.

[73] Assignee: Honeywell Information Systems Inc., Waltham, Mass.

[22] Filed: Feb. 12, 1971

[21] Appl. No.: 114,912

[52] U.S. Cl. .............................................. 340/172.5

[51] Int. Cl. ................................................ G06f 3/04

[58] Field of Search .................................. 340/172.5

[56] References Cited

UNITED STATES PATENTS

| | | | |
|---|---|---|---|
| 3,359,543 | 12/1967 | Corr et al. | 340/172.5 |
| 3,623,010 | 11/1971 | Burkhalter | 340/172.5 |
| 3,539,998 | 11/1970 | Belcher et al. | 340/172.5 |
| 3,407,387 | 10/1968 | Looschen et al. | 340/172.5 X |
| 3,308,439 | 3/1967 | Tink et al. | 340/172.5 |
| 3,323,109 | 5/1967 | Hecht et al. | 340/172.5 |
| 3,609,698 | 9/1971 | McCormick | 340/172.5 |

*Primary Examiner*—Harvey E. Springborn
*Attorney*—Ronald T. Reiling and Fred Jacob

[57] ABSTRACT

A remote terminal operates in at least selectable first and second data processing modes with a plurality of input/output devices connected to a common bus system. These modes are established in accordance with the recognition of control characters included within the data being transferred along the bus.

34 Claims, 20 Drawing Figures

PATENTED NOV 6 1973 3,771,135

SHEET 01 OF 25

ROBERT E. HUETTNER
EDWARD B. TYMANN
INVENTORS

BY Faith F. Driscoll
ATTORNEY

| PRESENT STATE: IDLE STATE | READY STATE | ON-LINE STATE | OFF-LINE STATE | AUDIT TRAIL STATE | NEXT STATE: IDLE STATE | READY STATE | ON-LINE STATE | OFF-LINE STATE | AUDIT TRAIL STATE | VARIABLES: IDLE STATE SWITCH | ON-LINE STATE SWITCH | AUDIT TRAIL STATE SWITCH | OFF-LINE STATE SWITCH | GDCA CHECK CONDITION | DEVICE DATA READY | EXECUTE PUSHBUTTON | NORMAL MEMORY RELEASE | CHECK RELEASE MEMORY | SELECTION OR POLLING ADDRESS | OFF-LINE CYCLE | BUS STROBE | BUS BUSY LINE | REMARKS |
|---|---|---|---|---|---|---|---|---|---|---|---|---|---|---|---|---|---|---|---|---|---|---|---|
| | | | | | | | | | | OUTPUT DEVICE CONTROL AREA | | | | | | | | | | | | | |
| 1 | 0 | 0 | 0 | 0 | 0 | 0 | 0 | 1 | 0 | | | | 1 | 0 | | 1 | | | | | 1 | | OPERATOR ACTION |
| 0 | 1 | 0 | 0 | 0 | 0 | 0 | 0 | 1 | 0 | | | | 1 | 0 | | | | | | 1 | 1 | | " " |
| 0 | 0 | 1 | 0 | 0 | 0 | 0 | 0 | 1 | 0 | | | | 1 | 0 | 1 | | 1 | | | | 1 | | " " |
| 0 | 0 | 1 | 0 | 0 | 0 | 0 | 0 | 1 | 0 | | | | 1 | 0 | 1 | | | | | | 1 | | " " |
| 0 | 0 | 0 | 0 | 1 | 0 | 0 | 0 | 1 | 0 | | | | 1 | 0 | 1 | | | | | | 1 | | " " |
| 0 | 1 | 0 | 0 | 0 | 0 | 0 | 1 | 0 | 0 | | 1 | | | 0 | | | | | 1 | | 1 | 0 | SELECTION ADDRESS |
| 0 | 0 | 0 | 0 | 1 | 0 | 0 | 1 | 0 | 0 | | | 1 | | 0 | | | | | 1 | | 1 | 0 | " " |
| 1 | 0 | 0 | 0 | 0 | 0 | 0 | 0 | 0 | 1 | | | 1 | | 0 | | 1 | | | | | 1 | | OPERATOR ACTION |
| 0 | 1 | 0 | 0 | 0 | 0 | 0 | 0 | 0 | 1 | | | 1 | | 0 | | | | | | 1 | 1 | | " " |
| 0 | 0 | 1 | 0 | 0 | 0 | 0 | 0 | 0 | 1 | | | 1 | | 0 | 1 | | 1 | | | | 1 | | " " |
| 0 | 0 | 1 | 0 | 0 | 0 | 0 | 0 | 0 | 1 | | | 1 | | 0 | 1 | | | | | | 1 | | " " |
| 0 | 0 | 0 | 1 | 0 | 0 | 0 | 0 | 0 | 1 | | | 1 | | 0 | 1 | | | | | | 1 | | " " |
| 1 | 0 | 0 | 0 | 0 | 0 | 1 | 0 | 0 | 0 | | 1 | | | 0 | | 1 | | | | | 1 | | OPERATOR ACTION |
| 0 | 0 | 1 | 0 | 0 | 0 | 1 | 0 | 0 | 0 | | 1 | | | 0 | 1 | | 1 | | | | 1 | | SCANNER RELEASE |
| 0 | 0 | 1 | 0 | 0 | 0 | 1 | 0 | 0 | 0 | | 1 | | | 0 | 1 | | | | | | 1 | | OPERATOR ACTION |
| 0 | 0 | 0 | 1 | 0 | 0 | 1 | 0 | 0 | 0 | | 1 | | | 0 | 1 | | | | | | 1 | | " " |
| 0 | 0 | 0 | 0 | 1 | 0 | 1 | 0 | 0 | 0 | | 1 | | | 0 | 1 | | | | | 1 | 1 | | " " |
| 0 | 1 | 0 | 0 | 0 | 1 | 0 | 0 | 0 | 0 | 1 | | | | | | | | | | 1 | 1 | | OPERATOR ACTION |
| 0 | 1 | 0 | 0 | 0 | 1 | 0 | 0 | 0 | 0 | | | | | 1 | | | | | | 1 | 1 | | GDCA LOGIC |
| 0 | 0 | 1 | 0 | 0 | 1 | 0 | 0 | 0 | 0 | | | | | 1 | | | 1 | | | | 1 | | SCANNER RELEASE |
| 0 | 0 | 1 | 0 | 0 | 1 | 0 | 0 | 0 | 0 | 1 | | | | | 1 | | 1 | | | | 1 | | OPERATOR ACTION |
| 0 | 0 | 1 | 0 | 0 | 1 | 0 | 0 | 0 | 0 | 1 | | | | | 1 | | | | | | 1 | | " " |
| 0 | 0 | 0 | 1 | 0 | 1 | 0 | 0 | 0 | 0 | 1 | | | | | 1 | | | | | | 1 | | " " |
| 0 | 0 | 0 | 0 | 1 | 1 | 0 | 0 | 0 | 0 | 1 | | | | | 1 | | | | | | 1 | | " " |
| 0 | 0 | 0 | 0 | 1 | 1 | 0 | 0 | 0 | 0 | | | | | 1 | | | | | | 1 | 1 | | GDCA LOGIC |
| | | | | | | | | | | INPUT DEVICE CONTROL AREA | | | | | | | | | | | | | |
| 1 | 0 | 0 | 0 | 0 | 0 | 0 | 0 | 1 | 0 | | | | 1 | 0 | | 1 | | | | 1 | 1 | 0 | OPERATOR ACTION |
| 0 | 1 | 0 | 0 | 0 | 0 | 0 | 0 | 1 | 0 | | | | 1 | 0 | | | | | | 1 | 1 | 0 | " " |
| 0 | 0 | 1 | 0 | 0 | 0 | 0 | 0 | 1 | 0 | | | | 1 | 0 | 1 | | 1 | | | 1 | 1 | 0 | " " |
| 0 | 1 | 0 | 0 | 0 | 0 | 0 | 1 | 0 | 0 | | 1 | | | 0 | | | | | 1 | | 1 | 0 | POLLING ADDRESS |
| 1 | 0 | 0 | 0 | 0 | 0 | 1 | 0 | 0 | 0 | | 1 | | | 0 | | 1 | | | | | 1 | | OPERATOR ACTION |
| 0 | 0 | 1 | 0 | 0 | 0 | 1 | 0 | 0 | 0 | | 1 | | | 0 | 1 | | 1 | | | | 1 | | SCANNER RELEASE |
| 0 | 0 | 0 | 1 | 0 | 0 | 1 | 0 | 0 | 0 | | 1 | | | 0 | 1 | | | | | | 1 | | OPERATOR ACTION |
| 0 | 1 | 0 | 0 | 0 | 1 | 0 | 0 | 0 | 0 | 1 | | | | | | | | | | 1 | 1 | | OPERATOR ACTION |
| 0 | 1 | 0 | 0 | 0 | 1 | 0 | 0 | 0 | 0 | | | | | 1 | | | | | | 1 | 1 | | GDCA LOGIC |
| 0 | 0 | 1 | 0 | 0 | 1 | 0 | 0 | 0 | 0 | 1 | | | | | 1 | | 1 | | | | 1 | | OPERATOR ACTION |
| 0 | 0 | 1 | 0 | 0 | 1 | 0 | 0 | 0 | 0 | | | | | 1 | | | 1 | | | | 1 | | OPERATOR ACTION REQ. |
| 0 | 0 | 0 | 1 | 0 | 1 | 0 | 0 | 0 | 0 | 1 | | | | | 1 | | | | | | 1 | | OPERATOR ACTION |

GDCA STATE TRANSITION TABLE

*Fig. 5.*

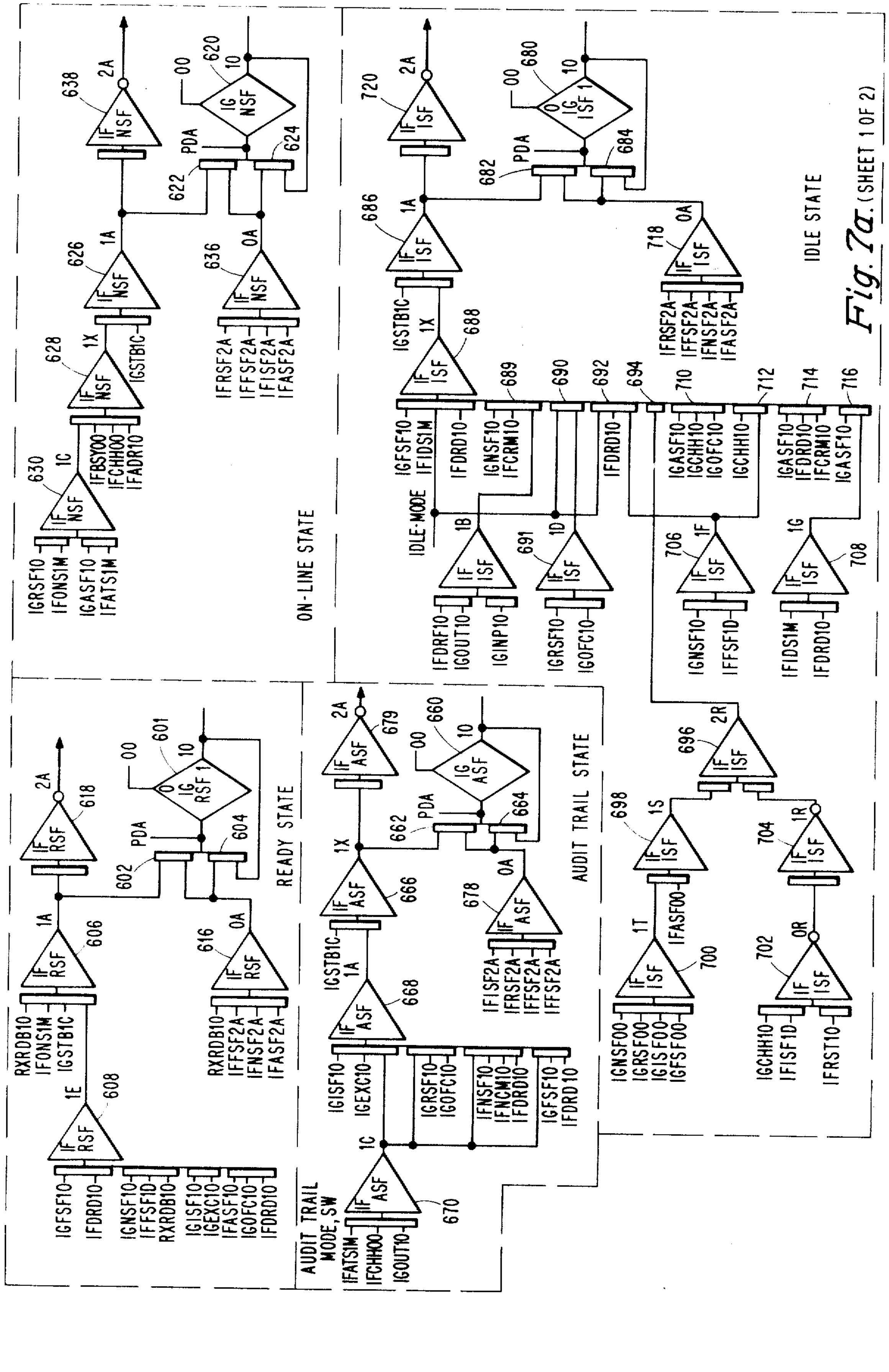
Fig. 7a. (SHEET 1 OF 2)

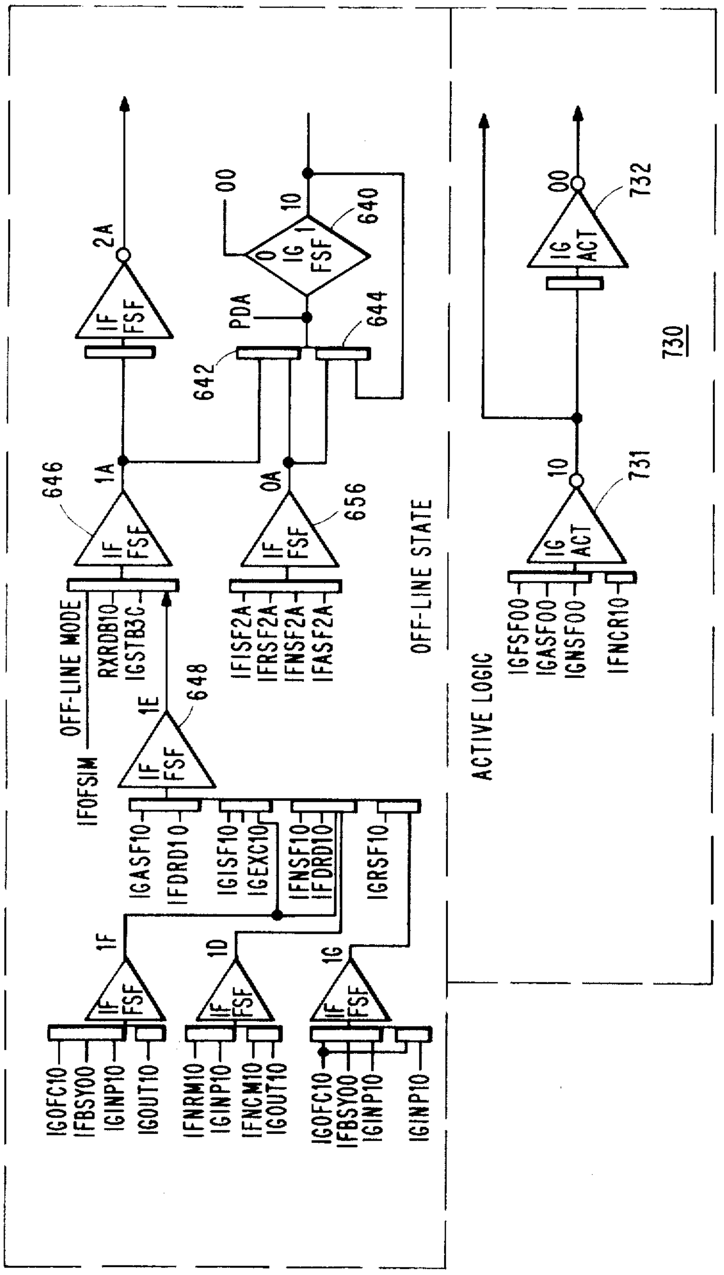
Fig. 7a. (SHEET 2 OF 2)

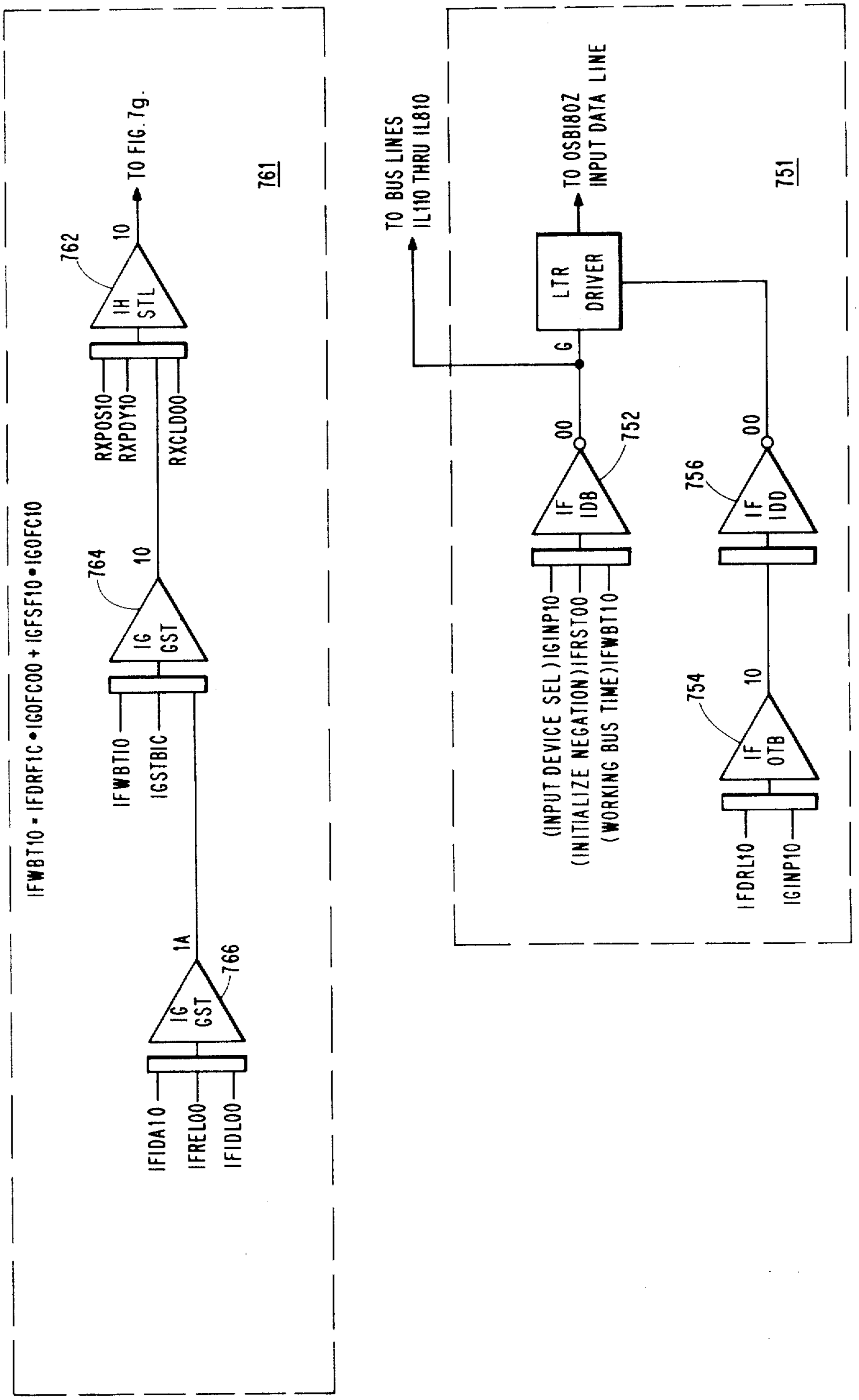
Fig. 7b. (SHEET 1 OF 4)

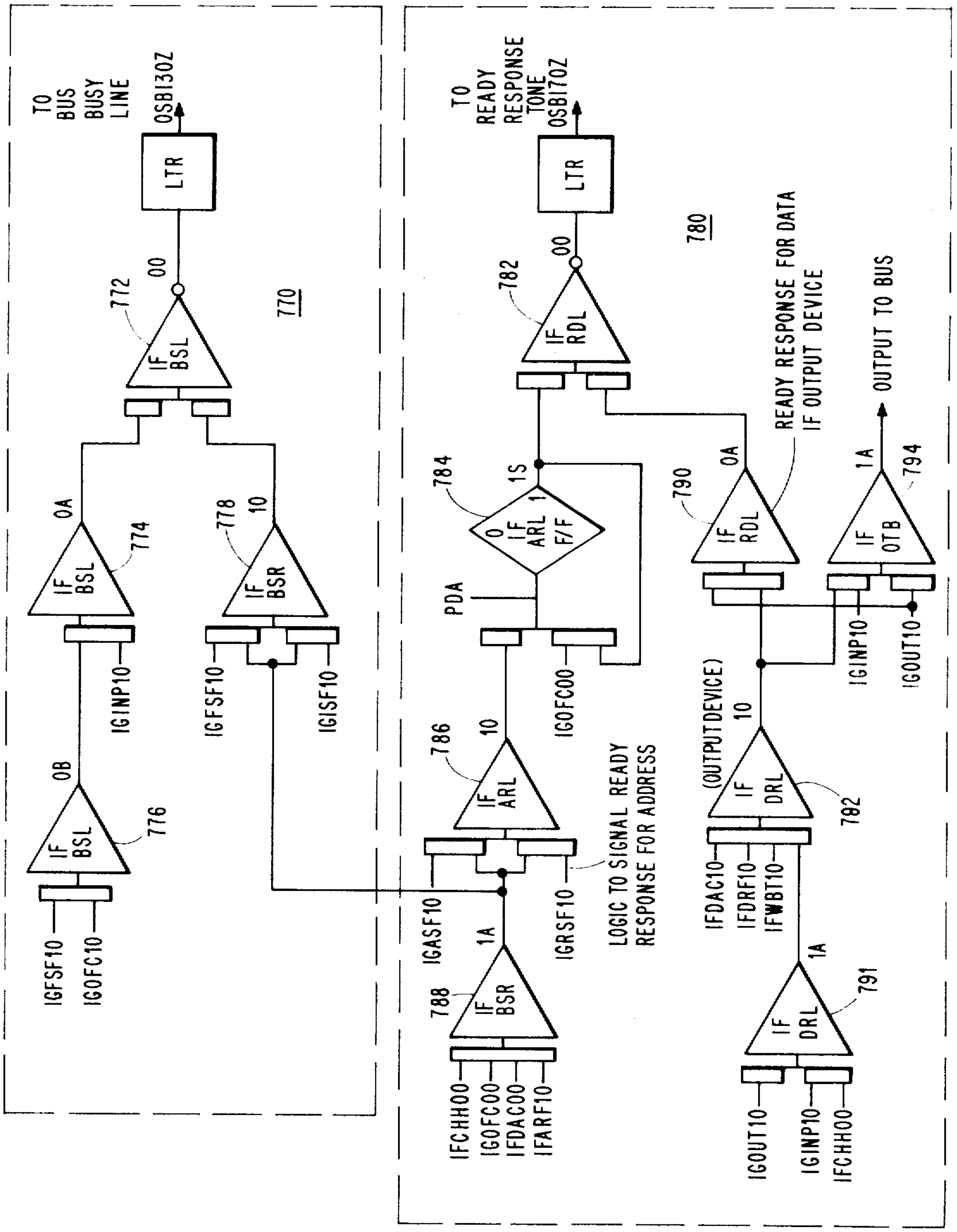
Fig. 7b. (SHEET 2 OF 4)

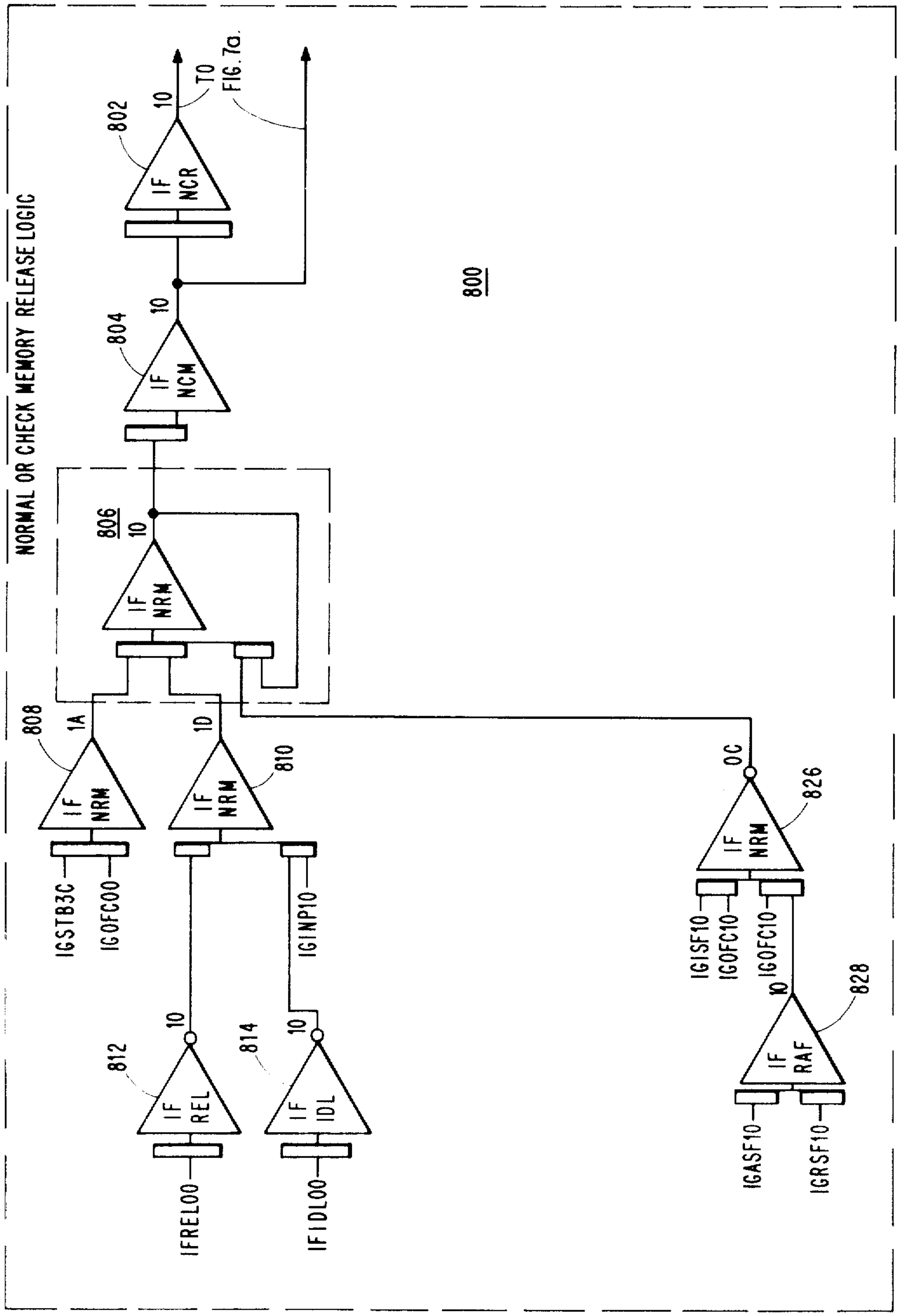
Fig. 7b. (SHEET 3 OF 4)

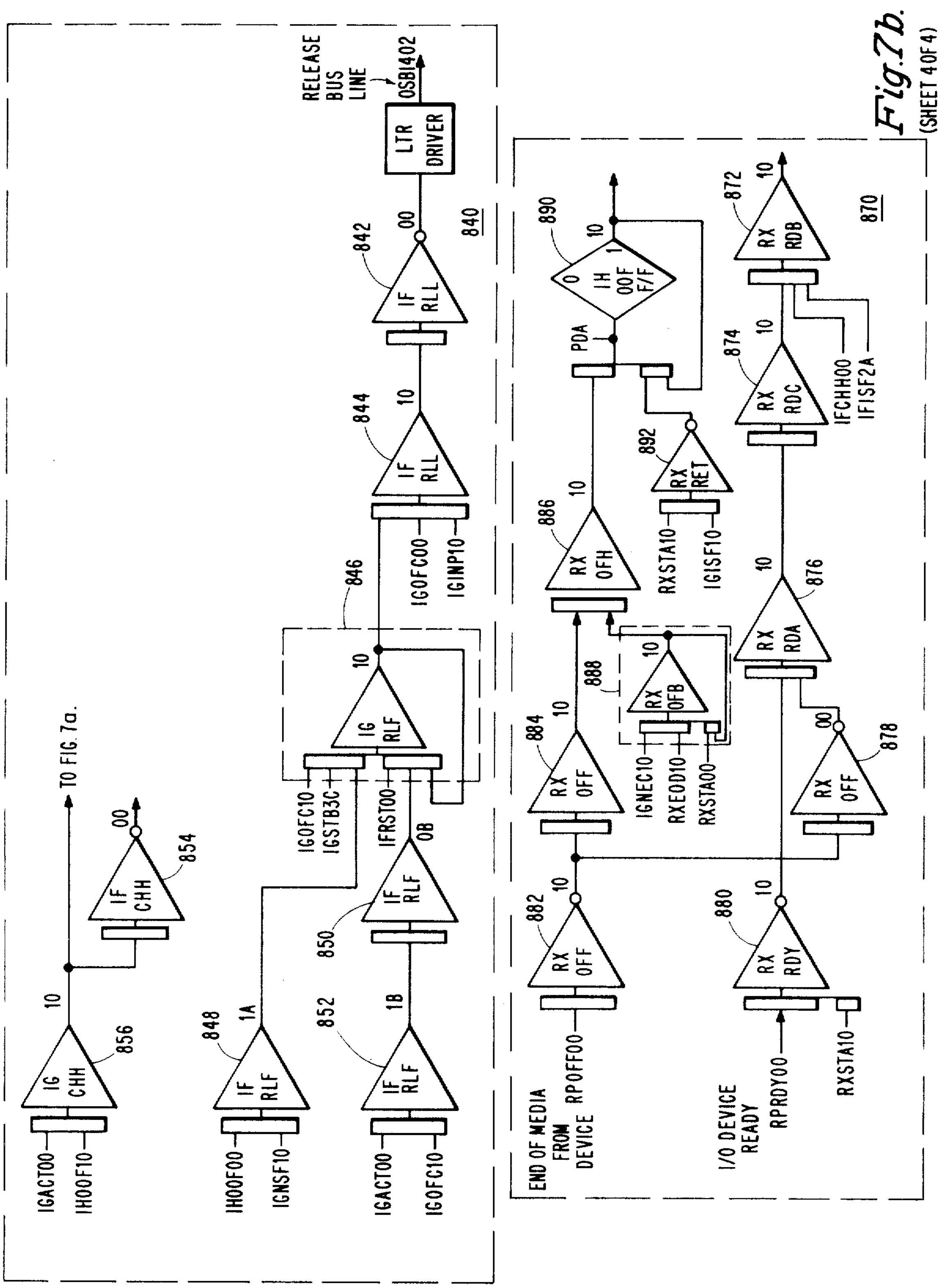
Fig. 7b. (SHEET 4 OF 4)

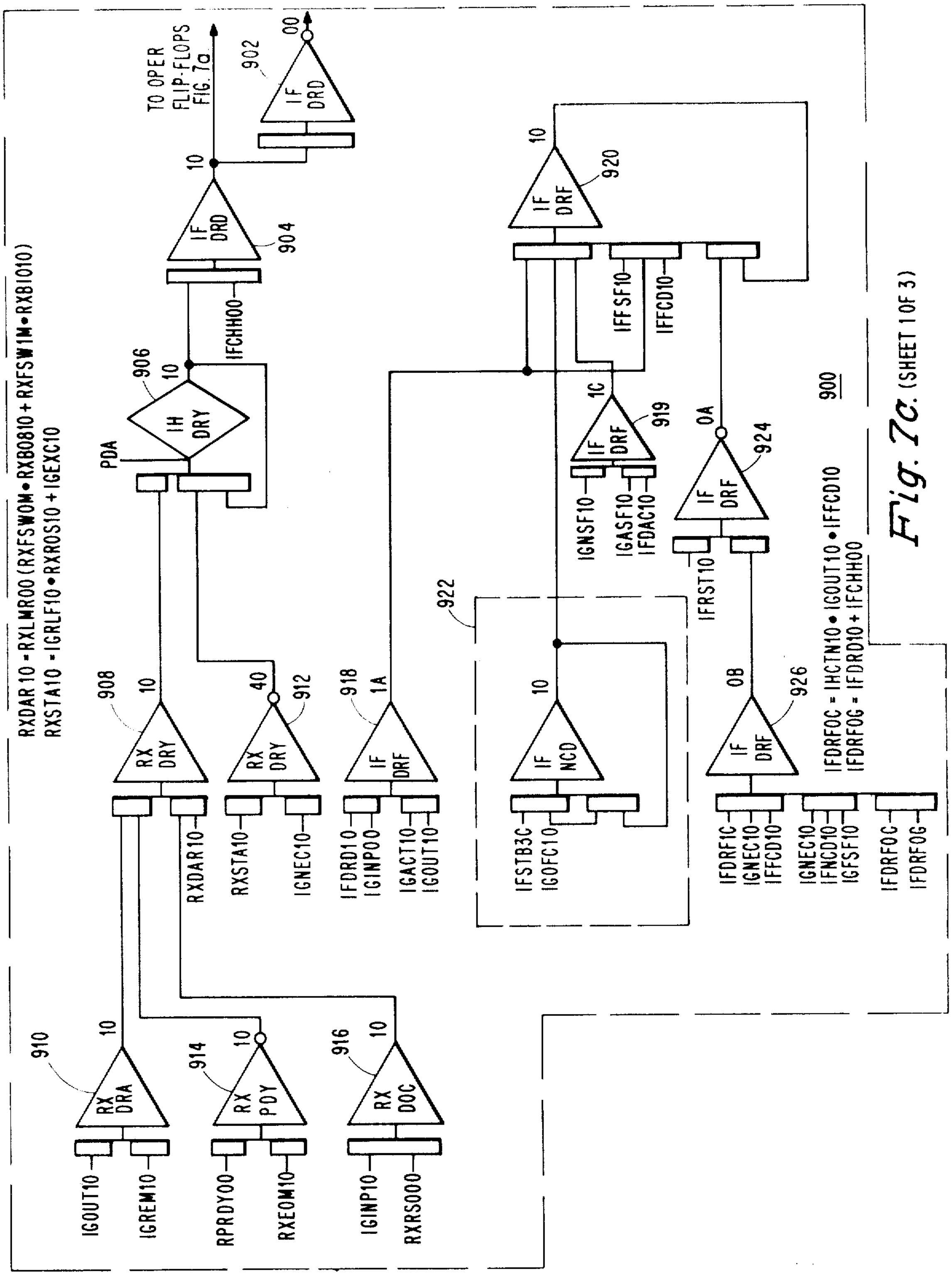
Fig. 7c. (SHEET 1 OF 3)

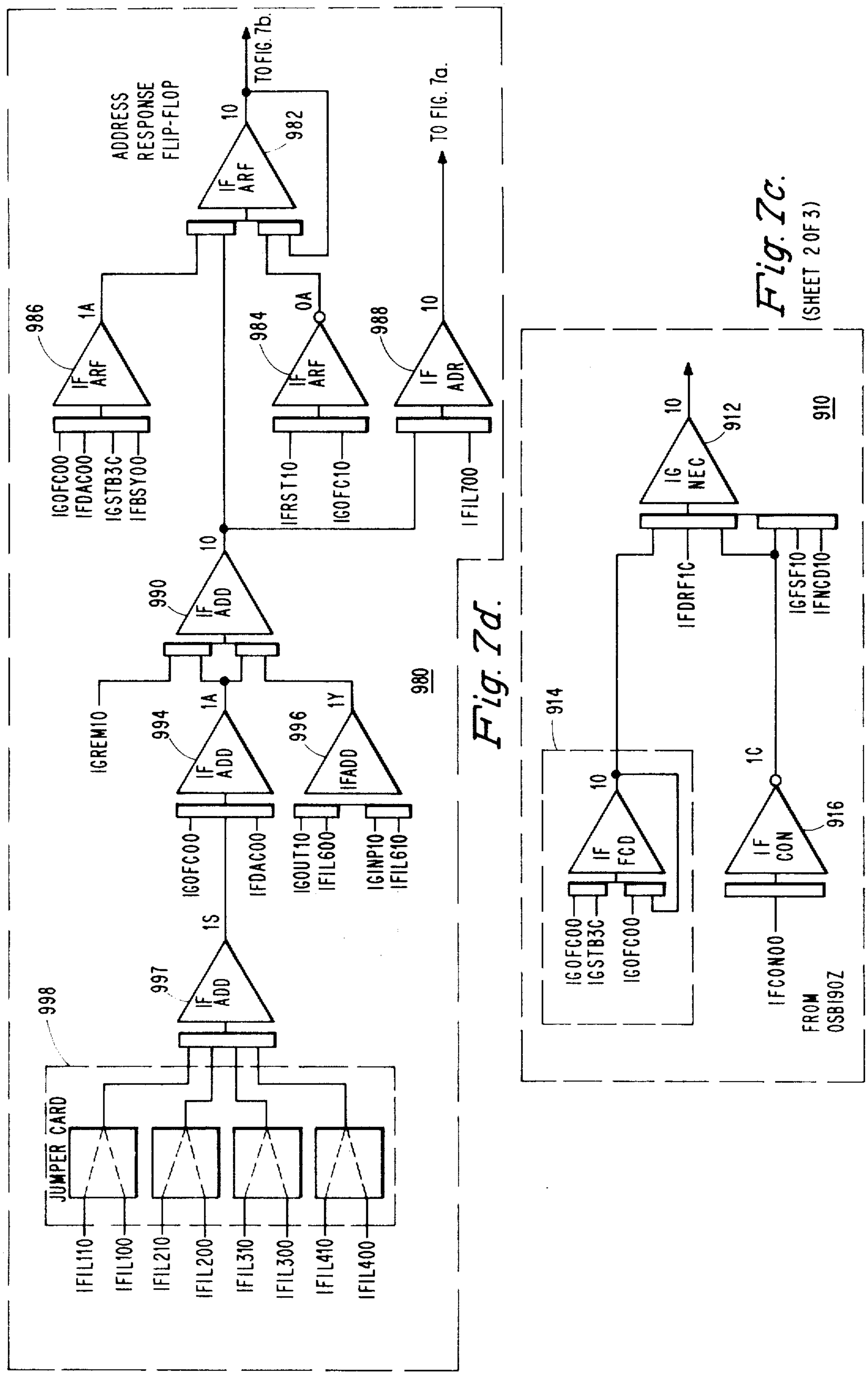
Fig. 7d. Fig. 7c. (SHEET 2 OF 3)

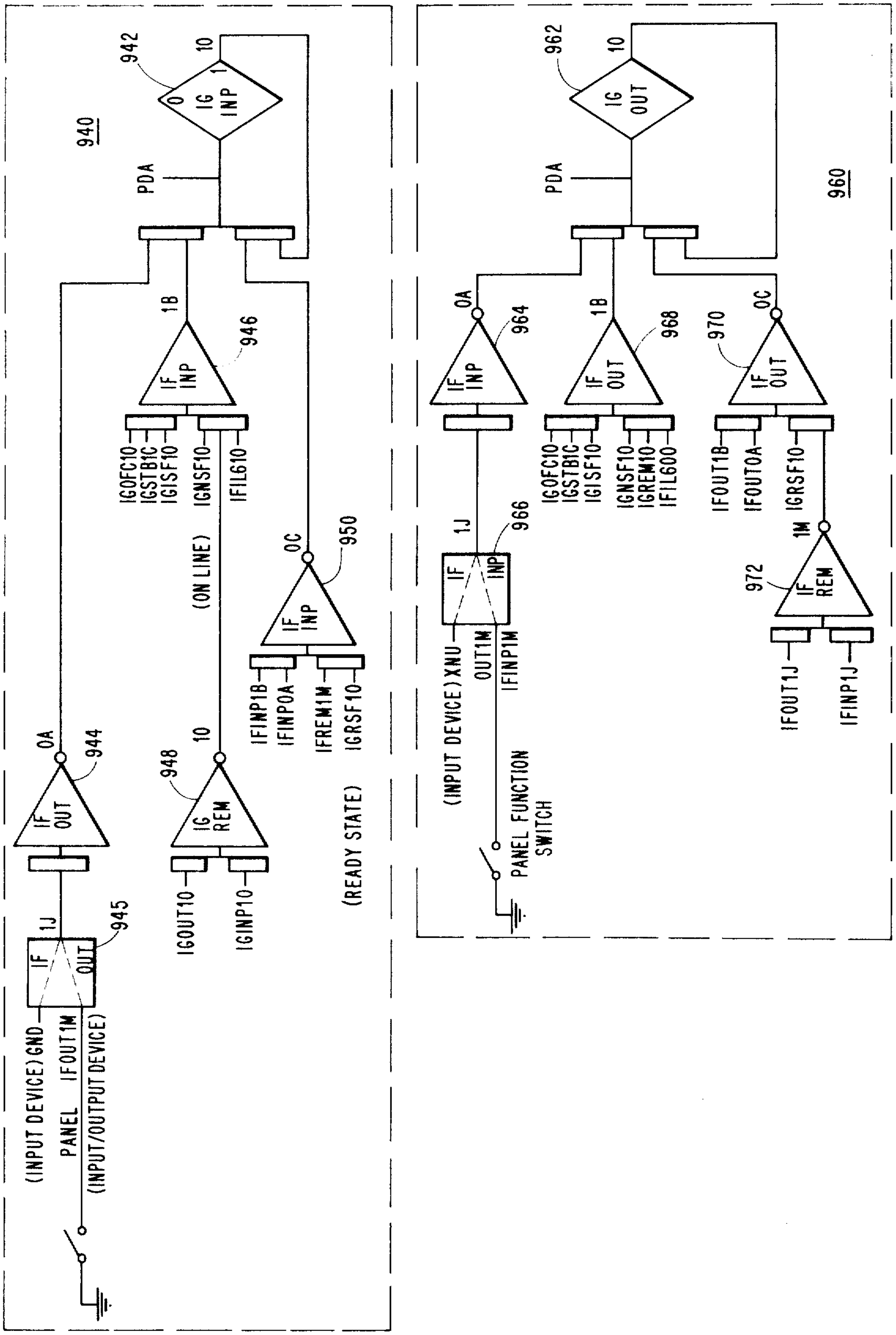
Fig. 7c. (SHEET 3 OF 3)

REMOTE TERMINAL SYSTEM

RELATED APPLICATIONS

1. "A Communication Control Device Utilized as an Input/Output Module for a Remote Terminal System" invented by Robert E. Huettner, Edward B. Tymann and Richard Nolin, filed on even date with this application, Ser. No. 114,852 and assigned to the same assignee named herein.

2. "Multifunction Polling Technique" invented by Robert E. Huettner, Edward B. Tymann and Richard Nolin, filed on Feb. 11, 1971, Ser. No. 114,431 and assigned to the same assignee named herein.

3. "An Automatic Terminal Deactivation Device" invented by Robert E. Huettner and Edward B. Tymann, filed on even date with this application, Ser. No. 114,876 and assigned to the same assignee named herein.

BACKGROUND OF THE INVENTION

1. Field of Use

This invention relates to data processing systems and more particularly, to terminals which operate "on-line" to a data processing system or "off-line" as a free standing unit.

2. Prior Art

In general, prior art systems have provided separate apparatus for handling information transfers on a batch basis and transaction basis. Therefore, whenever apparatus was required to process information on both bases, this necessitated almost complete duplication of apparatus previously used for both modes of transfer.

Additionally, the terminals of the prior art have been arranged to operate either "on-line" or "off-line." That is, the terminals operate either through different communication facilities in conjunction with a central processing unit or the terminals operate without any remote transmission capabilities to prepare processed data.

From the foregoing, it is therefore an object of the invention to provide for selectable single message or multiple message transmission of all of the data presented by a plurality of input devices or of a portion of the data presented by a plurality of input devices not, withstanding the quantity of data present.

It is an object of the present invention to provide a terminal system which can operate both "on-line" and "off-line" simultaneously.

SUMMARY OF THE INVENTION

The above and other objects are provided according to the basic concept of the invention through means for manually selecting a single message or multiple message transmission mode of all data available from a plurality of input devices. Further, the arrangement provides for manual or operator selectable single or multiple message transmission of a portion of the data available from a plurality of input devices independent of the quantity of data present. This is accomplished in part by having a control character or characters contained within a message whereby during the initiation of a polling operation of input devices, the selected mode together with the control characters define the length of message or its duration. This feature of the invention allows the loading of a medium (e.g., cards, tape etc.) in bulk on an input device while still allowing other input devices to be polled or addressed prior to completing the transmission of the bulk loaded medium.

A further feature of the invention is that it allows for addressing of other terminal systems on a multi-point link arrangement prior to exhausting the aforementioned bulk medium.

A further feature of the present terminal system is that it provides control apparatus operative to handle all internal data traffic therein by generating address timing and control signals and by monitoring data and control signals on the terminal bus. In particular, this control apparatus continually scans for service requests by placing the address codes of input devices on the bus and looking for a ready response from the device. Because the scanning algorithm is independent of the number and types of input/output devices, the control apparatus sequences automatically through a predetermined number of input device addresses.

The above and other objects of the present invention are achieved and an illustrative embodiment described hereinafter. Novel features which are believed to be characteristic of the invention, both as to its organization and method of operation, together with further objects and advantages thereof will be better understood from the following description considered in connection with the accompanying drawings. It is to be expressly understood however, that these drawings are for the purpose of illustration and description only and are not intended as a definition of the limits of the invention.

BRIEF DESCRIPTION OF THE DRAWINGS

FIG. 5 summarizes the states of pertinent control functions generated within the device controller of FIG. 1;

FIG. 7*a* shows in greater detail the Mode Selection Logic of FIG. 7;

FIG. 7*b* shows in greater detail the Bus Interface Logic of FIG. 7;

FIG. 7*c* shows in greater detail the Input/Output Device Selection Logic of the General Device Control Area and Input/Output device control area of the Device Controller of FIG. 7;

FIG. 7*d* shows in greater detail the Address Response Logic of FIG. 7;

DESCRIPTION OF THE PREFERRED EMBODIMENT

In General

In the terminal system of the present invention, data may be processed in a plurality of operator selectable modes depending on the particular application. For example, in data collection and merging operations, it becomes desirable to process a block or a data record from each input device. This mode, termed herein as a transaction mode, permits one transaction or one block of data to be read from each input device.

On the other hand, in other applications where tasks require extensive volumes of data to be moved to and from a remote site in large groups or batches, it becomes particularly desirable to have a single input device transfer data until it has exhausted its supply of data. This mode of operation is referred to herein as a "batch" mode of operation.

In addition to the above mentioned operator selectable data modes, the terminal system of the present invention may operate different ones of the devices connected thereto "on-line" or "off-line" (i.e., remote or local) simultaneously. When operated on-line, a remote data processing system can request and receive data from any one of the input devices of the terminal system (i.e., from a card reader etc) or the data processing system can transmit data which will be transcribed by selected output devices of the system (e.g., printer or card punch). In an off-line mode, an operator can select input devices to transfer data locally to the output devices of the terminal system.

DESCRIPTION OF THE TERMINAL SYSTEM

Figure 1:
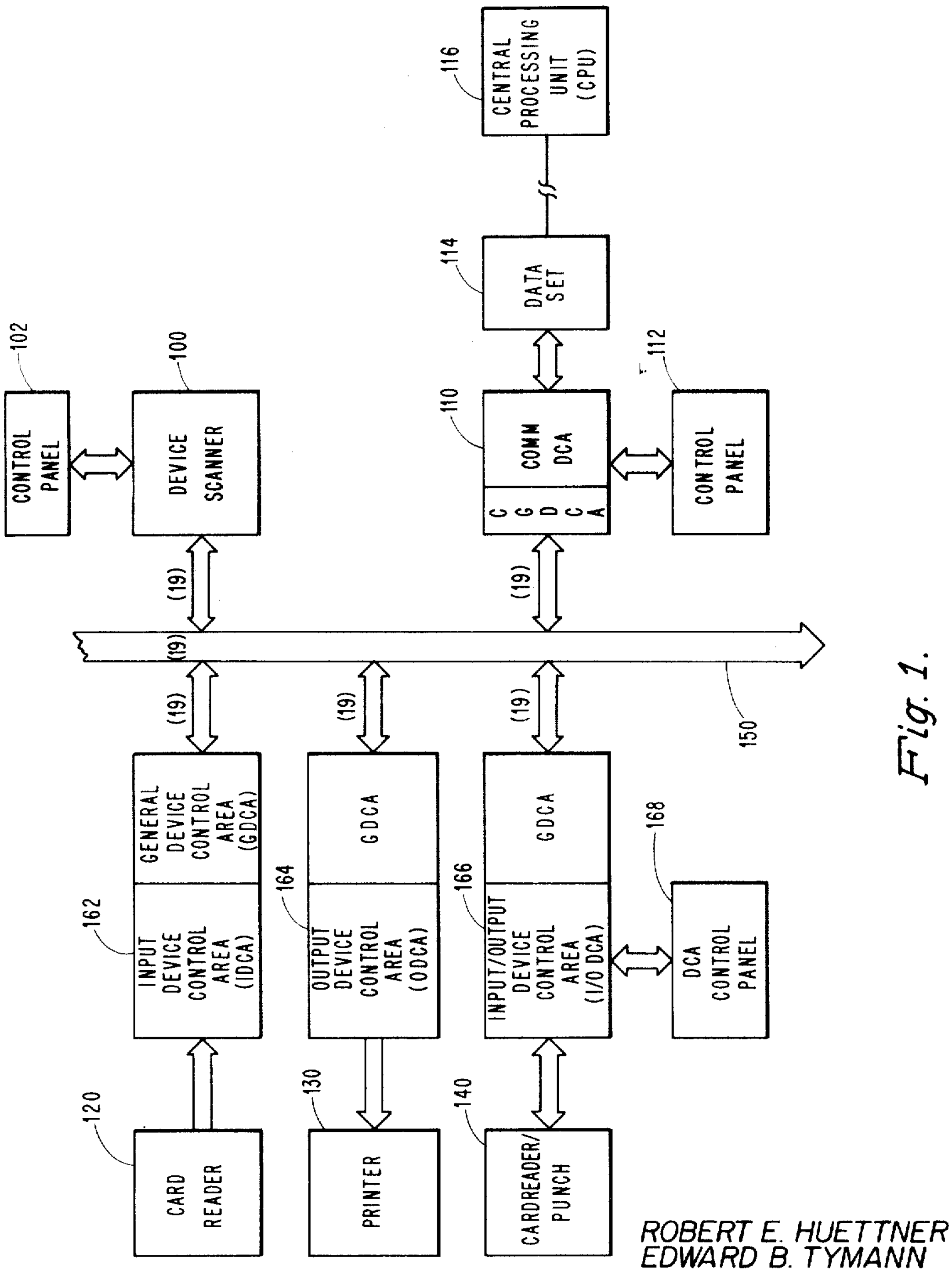
FIG. 1 is a diagrammatic illustration of a terminal system embodying the principles of the present invention.

FIG. 1 is a block diagram of the system of the subject invention which includes input device control apparatus in the form of a device scanner 100, a communications control unit, referenced as a COMM DCA 110, and a plurality of peripheral input and output devices 120, 130 and 140, all of which connect in common to a bus 150.

As shown, the peripheral devices which include a card reader, a printer, and a card reader/punch communicate with the bus 150 through their respective device controllers 162, 164, and 166. These controllers labeled input DCA, output DCA and input/output DCA respectively include control logic, individual buffer storage, interface circuits and power supplies required to regulate the operation of the associated peripheral device.

It will be appreciated that while only three peripheral devices are shown in the Figure, the system can accommodate considerably more devices. For example, the system of the present embodiment can accommodate up to 16 input and 16 output devices. Of course each I/O device will be considered as two devices.

Each of the device controllers has a standard logic interface area termed a general device control area (GDCA) which provides a common interface to the bus 150. The bus 150 consists of nineteen lines that include eight information lines for transferring address and data information, cycle timing signal lines and several control lines. The interface which will be described herein is disclosed in FIG. 2.

The device scanner 100 regulates the transfer data from each of the input devices by generating the timing cycles used in conjunction with data transfers along the bus 150 and generates pertinent control signals. When an input peripheral device is activated, the device scanner 100 is operative to monitor the activity of the terminal bus 150.

In a transaction mode, the device scanner 100 is operative to terminate a transfer of a block of data by generating a release control signal over the bus when it detects a special control character within the data segment.

In general, the COMM DCA 110 provides an interface between the terminal bus 150 of the system the present invention and a communications channel (i.e., a modulator demodulator unit termed a MODEM). This unit allows the terminal system to operate on-line through a remotely located data processing system. In particular, the COMM DCA 110 enables the system to respond to control procedures which poll and select peripheral devices for either transmitting or receiving data through conventional data sets or other telephone line interfaces. Additionally, the DCA 110 includes a memory buffer which provides the necessary buffer capacity for efficient communication operation. And, the COMM DCA 110 is operative to provide the requisite checking and automatic blocking for messages. For further details as to the above operations, reference may be made to the copending applications of Robert E. Huettner, Richard Nolin and Edward R. Tymann titled "A Communication Control Device Utilized as an Input/Output Module for a Remote Terminal System" and "Multi Function Polling Technique" bearing Ser. Nos. 114,852 and 114,431 respectively referenced above and which are incorporated by reference herein.

The detailed logic for each of the blocks of FIG. 1 will be described in detail to the extent as is necessary to understand the present invention.

THE DESCRIPTION OF DEVICE SCANNER LOGIC

General

The device scanner 100 as mentioned establishes the timing for the system wherein it generates the "ON" and "OFF" LINE bus cycles which define the time interval during which a single data character may be transferred over the terminal bus 150 during on-line and off-line operation. The "ON" and "OFF" LINE bus cycles are equally divided and can be varied in frequency by switches provided on a control panel 102 associated with the device scanner 100. Additionally, the scanner 100 is operative to generate a strobe pulse occurring midway between each ON-LINE and OFF-LINE bus cycle for defining a time period during which information on the bus 150 may be accurately sampled. Also, the scanner 100 generates a four bit binary address code which is received by the general device control area (GDCA) of the input/output device controllers 120,130,140 and the communication general device control area (GDCA) of the COMM DCA 110.

Figure 3:
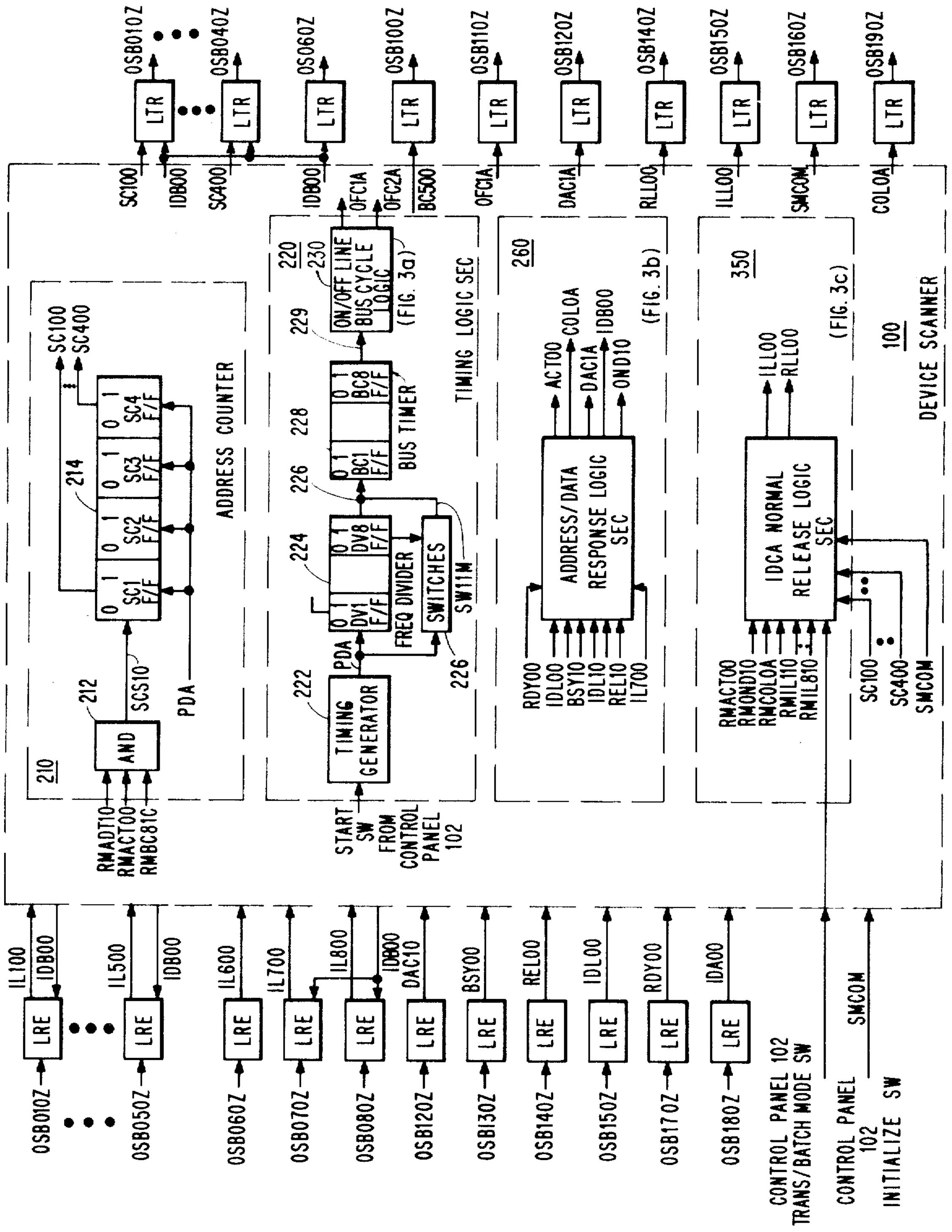
FIG. 3 is a block diagram of device scanner of FIG. 1.

With reference to FIG. 3, it is seen that the scanner 100 comprises four sections. These sections include a Device Scanner Address Counter Section 210, a Timing Logic Section 220, an Address/Data Response Logic Section 260, and a Release Logic Section 350. These sections are illustrated in greater detail in FIGS. 3*a* through 3*c* as designated in each of the section blocks of FIG. 3.

TERMINAL BUS 150

Figure 2:
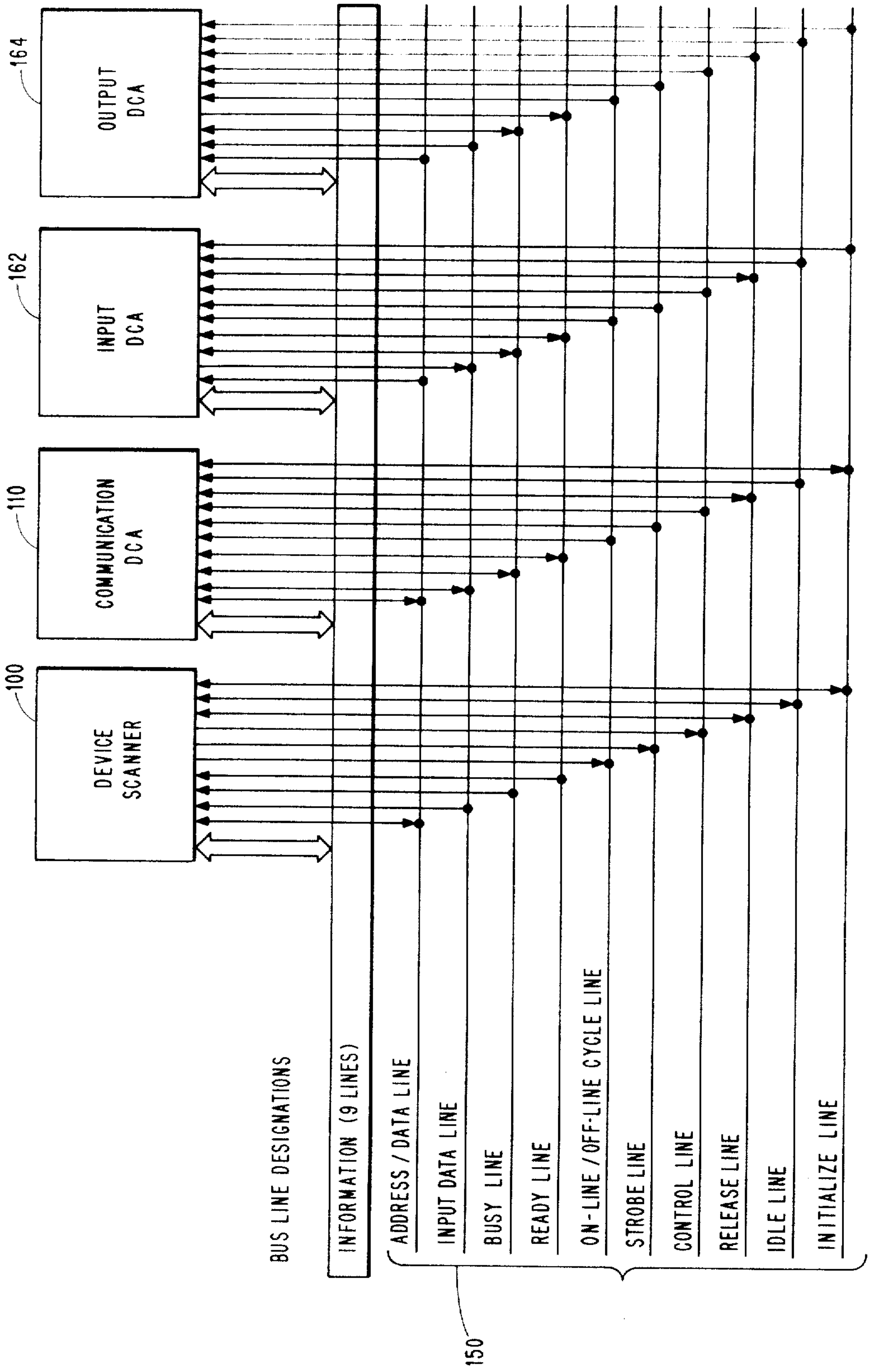
FIG. 2 shows the bus 150 of FIG. 1 in greater detail.

Before discussing the above Figures, reference is made to FIG. 2 mentioned above. A general description of each bus line which forms the bus 150 is summarized in the following table.

TABLE
INTERCONNECTING LINES

| FUNCTION | SIGNAL LINE | DESCRIPTION |
|---|---|---|
| **IL110/IL100** Through **IL910/IL900** | **INFORMATION** (**OSB010Z** Through **OSB090Z**) | Lines 1 through 9 are used to transfer both data and address information. During On-line cycles, the condition of the ADDRESS/DATA line specifies the content of the information lines. During OFF-LINE cycles, the lines are used only for data transfer. When used for address information, line $I_1$ through $I_4$ contain the DCA address, line $I_6$ specifies whether the addressed DCA is to operate as an IDCA or an ODCA, and line $I_7$ specifies either an activation address or status poll address. When used for data transfer, input DCA's place data on line $I_1$ through $I_8$ and output DCA's receive data from these lines. Line $I_9$ is a space line provided for future expansion. |
| **OFC00/ OFC10** | **ON/OFF LINE CYCLE OSB110Z** | The ON/OFF LINE signal is generated continuously by the Device Scanner and provides time sharing of the bus **150**. The On-line condition allows addressing, address response, and On-line data transfers. The off-line conditions allows Off-line data transfer only. |
| **DAC00/ DAC10** | **ADDRESS/DATA OSB120Z** | The condition of this line specifies the content of the Information lines during On-line operation. The address condition allows all DCA's to recognize and respond to addresses on the information lines. The data condition allows On-line DCA's to transfer data over the information lines. |
| **STB10/ STB00** | **STROBE** (**OSB100Z**) | The Strobe signal is generated by the Scanner during each ON-LINE and OFF-LINE cycle. This signal specifies the valid interval for all signals appearing on the SB. DCA's sample the Information, Idle, and Release lines during the Strobe Interval. This signal also provides timing for internal DCA funtions. |
| **BSY10/ BSY00** | **BUSY** (**OSB130Z**) | The busy signal inhibits On-line activation of DCA's while the COMM DCA is in the quiescent (receive) state. It is also used for On-line address/status response, to inhibit On-line data timeout, and to prevent more than one IDCA from entering the OFF-line mode. A signal on the Busy line inhibits address recognition in all IDCA's. DCA's addressed while in the Idle, Off-line, or On-line mode respond by generating a Busy signal. An Off-line IDCA will maintain a signal on the Busy line to prevent any other IDCA from entering the Off-line state. |
| **IDA10/ IDA00** | **INPUT DATA** (**OSB180Z**) | An activated IDCA will transfer a character to the Information lines and then maintain the Input Data signal on this line until a signal on the CONTROL line is detected. The activated IDCA then resets the Input Data signal until the next character is ready for transfer. Activated ODCA's will accept data from the information lines only when the Input Data signal is present. |
| **RDY10/ RDY00** | **READY** (**OSB170Z**) | Used to indicate that addressed DCA's |

| | | |
|---|---|---|
| | | are activated and to acknowledge single character transfer during On-line and Off-line operation. The Scanner senses the transition and generates a signal on the CONTROL line indicating affirmative response to an IDCA or COMM DCA. |
| SMC10/ SMC00 | INITIALIZE (OSB160Z) | Used to interrupt all activity and initialize the terminal. The Initialize signal switches all DCA's to the Idle State. |
| CON00/ CON00 | CONTROL (OSB190Z) | Generated by the Device Scanner to indicate affirmative address response or Next Character Requested in response to a change in state in READY line |
| REL10/ REL00 | Release (OSB140Z) | The condition of this line determines when all DCA's in an On-line state will be switched to their ready state except for DCA's in the audit trial mode which remain in the On-line mode. |
| | | ON-LINE IDCA's change the condition of this line to indicate transmission of an input data transfer operation when the system is operating in the batch mode. |
| | | The device scanner changes the condition of this line to indicate to an IDCA the termination of an input data transfer operation when the system is operating in block mode. |
| IDL10/ IDL00 | Idle (OSB150Z) | The conditions of both the Idle and Release line are used to deactivate DCA's by switching them from the on-line or other active state to the idle state. Both lines when switched to the same state will switch an EDCA from the on-line state to the idle state. Both lines when switched to the same state will switch an IDCA from the on-line state to the idle state. When the idle line is in a predetermined state, it will switch an ODCA in either the on-line or audit trail mode which not generated a Ready response from that state to the idle state. ODCA's which have generated a ready response are switched to the ready state. |

As previously, the device scanner 100 interconnects with the various other portions of the system through the terminal bus 150. The lines which comprise the bus are shown in FIG. 2 and a description of the function each line performs is summarized in the above mentioned table.

In general, the standard bus 100 includes all required data and control signals with the exception of power and indicator lines. The bus 150 represents binary information by two direct current levels (i.e., two wire balanced system). Some of the lines are arranged for bidirectional transfers of information whereby a device may receive and transmit signals along the same line. More particularly, some (13) of the bus lines are employed in transmit operations such as transferring information to the COMM DCA, IDCA's or ODCA's and are designated as follows:

1. OSB010Z through OSB040Z,
2. OSB080Z through OSB020Z;
3. OSB140Z through OSB160Z; and,
4. OSB190Z.

Also some (14) lines including some of the above lines, are used for receiving information from the control PANEL and/or DCA's and these lines are designated as follows:

1. OSB010Z through OSB080Z;
2. OSB120Z through OSB150Z; and,
3. OSB170Z through OSB180Z.

Referring to FIG. 3, it will be noted that each of the above transmit-receive lines are preceded and followed respectively by a block in the form of a logic circuit labeled LTR. This circuit, as shown, has a transmit or data input applied thereto and a gate input which determines whether the circuit operates as a transmitter or as a receiver. When operated only as a receiver, it is labeled LRE. This circuit may be conventional in design and comprise a pair of differential amplifiers. Also, this unit may take the form of a driver/receiver circuit invented by Nelson W. Burke disclosed in a patent application titled "Bidirectional Line Driver-Receiver Circuit" bearing Ser. No. 863,807, assigned to the same assignee named herein.

Moreover, it should be noted that as concerns the internal logic of this system a binary ONE corresponds to a positive voltage level (e.g., 5 volts) while a binary ZERO corresponds to low voltage level (e.g., 0 volts). In the system when none of the devices connected to the bus have enabled their transmitting circuits the bus lines are at zero volts level. Accordingly, each of the internal logic levels are inverted before they are applied to the LTR circuit and they are inverted after they are received from an LRE circuit. Therefore, in this arrangement a binary ZERO is defined as a ZERO volts level on the bus and a binary ONE is defined as a negative voltage level (−2 volts).

The device scanner 100 as shown by FIG. 3 also receives inputs from a control panel 116. The controls which are important to the operation of the device scanner 100 include a BATCH/BLOCK switch and an INITIALIZE switch. As FIG. 3 shows, the BATCH/-BLOCK switch when in the BLOCK position causes a function BAC10 to be generated while depressing the INITIALIZE switch produces the function SMCOM. For further details as to the other controls and indicators this panel could include, reference may be made to the article titled "H-2440 Remote Transmission Terminal" which appears in Volume Four-Number Two issue of the Honeywell Computer Journal, Copyright 1970.

Before referring to the logic diagrams herein, it should be noted that in order to facilitate the explanation of how various gates and storage elements are enabled and are switched, Boolean or logic equations are given either together with the logic or in place of the logic. It will be evident that these equations may be implemented using AND and OR gates or equivalents thereof wherein the dot symbol (·) indicates the use of an AND gate and the plus, (+) indicates the use of an OR gate.

It will be noted that most of the flip-flops disclosed are clocked or synchronous flip-flops and are designated by a diamond shaped block in the drawings. These symbols and other symbols for AND gates, OR gates amplifiers, inverters and storage devices are summarized in FIG. 6.

Figure 6:
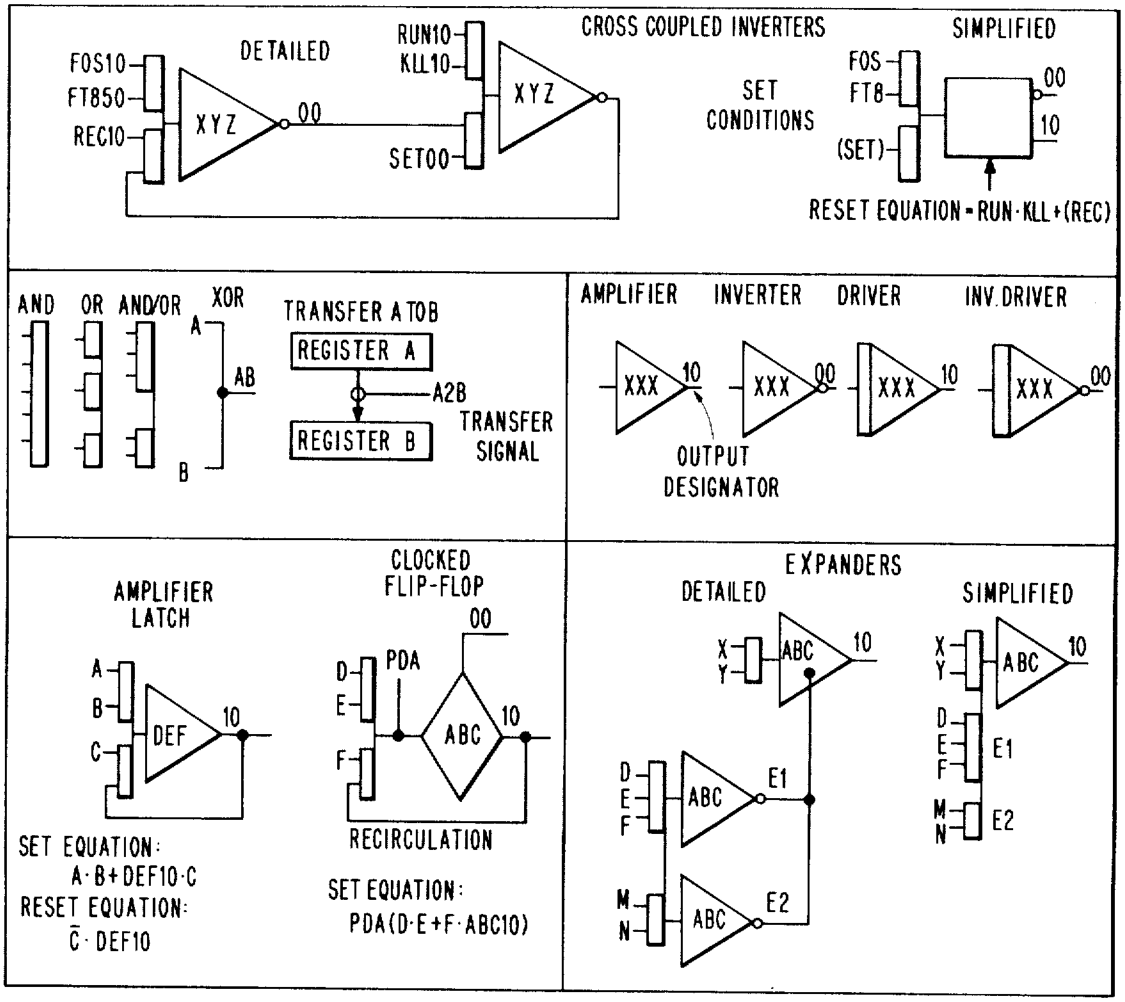
FIG. 6 illustrates the table of symbols used in the logic diagrams.

Referring to FIG. 6, it will be noted that the set and reset equations are given for the various types of flip-flops storage elements (i.e., those SFF, amplifier latch etc). Further, it will be noted that the "ONE" output terminal of a flip-flop is designated by a 10 while the "ZERO" output terminal of the flip-flop is designated by a 00. Also, double lines and single lines are used in the Figures to indicate single and multi-conductor lines respectively. The gating functions or transfer functions are designated by a circle around the conductor or conductors they enable.

DEVICE SCANNER LOGIC SECTIONS

Introduction

FIG. 3 shows the various functions applied as inputs to the device scanner 100 and its major sections. Additionally, FIG. 3 shows the various output functions generated by its sections.

SCANNER TIMING SECTION

The device scanner 100 establishes the overall timing for the terminal system. The scanner's timing section as shown in FIG. 3 includes a Frequency Divider Logic Section 224, a Bus Clock Timer Section 228, and On/-Off Line Bus Cycle Logic Section 220.

The Frequency Divider Logic Section 224 controls the frequency, or more specifically, the time periods of the ON-LINE and OFF-LINE bus cycles. In the present system, each cycle is of the same duration and can be varied by switches from 50.4 to 403.2 microseconds.

It will be appreciated that the device scanner 100 time shares the standard bus 150 between the basic terminal operating modes (i.e., local transfers and remote transfers) by generating a continuing sequence of these ON-LINE and OFF-LINE cycles by switching of the state of the function RMOFC00 applied to bus line OSB110Z.

This section includes a master oscillator and synchronous flip-flop divider network for generating in a conventional manner, the desired with clock pulses herein referred to as PDA pulses. The PDA pulses are fed to the various logic elements of the system for synchronizing the operation thereof.

Additionally, the PDA pulses are fed to a further divider network, the outputs of which are used to define the time duration of the aforementioned ON-LINE and OFF-LINE cycles. In its simplest form, the divider network includes a six bit synchronous counter including stages DV1 through DV6 which are resettable through switches connected at its various stages. Accordingly, different settings of these switches divide the input clock frequency by different amounts thereby establishing a number of different time intervals or periods for the ON-LINE and OFF-LINE cycles as described herein.

As shown by FIG. 3, the selected width pulse output of the Frequency Divider Logic Section 224 is fed along line 226 to the Bus Clock Timer Section 226. This section includes an eight bit shift register whose stages are designated BC1 through BC8 and whose outputs are used to generate the ON-LINE/OFF-LINE bus cycles, a bus cycle strobe designated as function BC500 and other timing functions including RMBC110, RMBC0100, RMBC310, RMBC410, RMBC510, RMBC610, and RMBC810 used for synchronizing the operation of the internal logic of the scanner 100. Accordingly, the logic section 228 divides each ON-LINE and OFF-LINE cycle into a number of time slots or intervals which are defined by the above mentioned functions. In greater detail, the normal bus cycle time of 50.4 microseconds is divided into two alternating periods of 25.2 microseconds. Each 25.2 microsecond period is divided by the Clock Section shift register into seven equal intervals of 3.6 microseconds. The timing function RMBC810 of the Bus Clock Timer is fed to the Bus Logic Section of FIG. 3*a. 3*

Figure 3A:
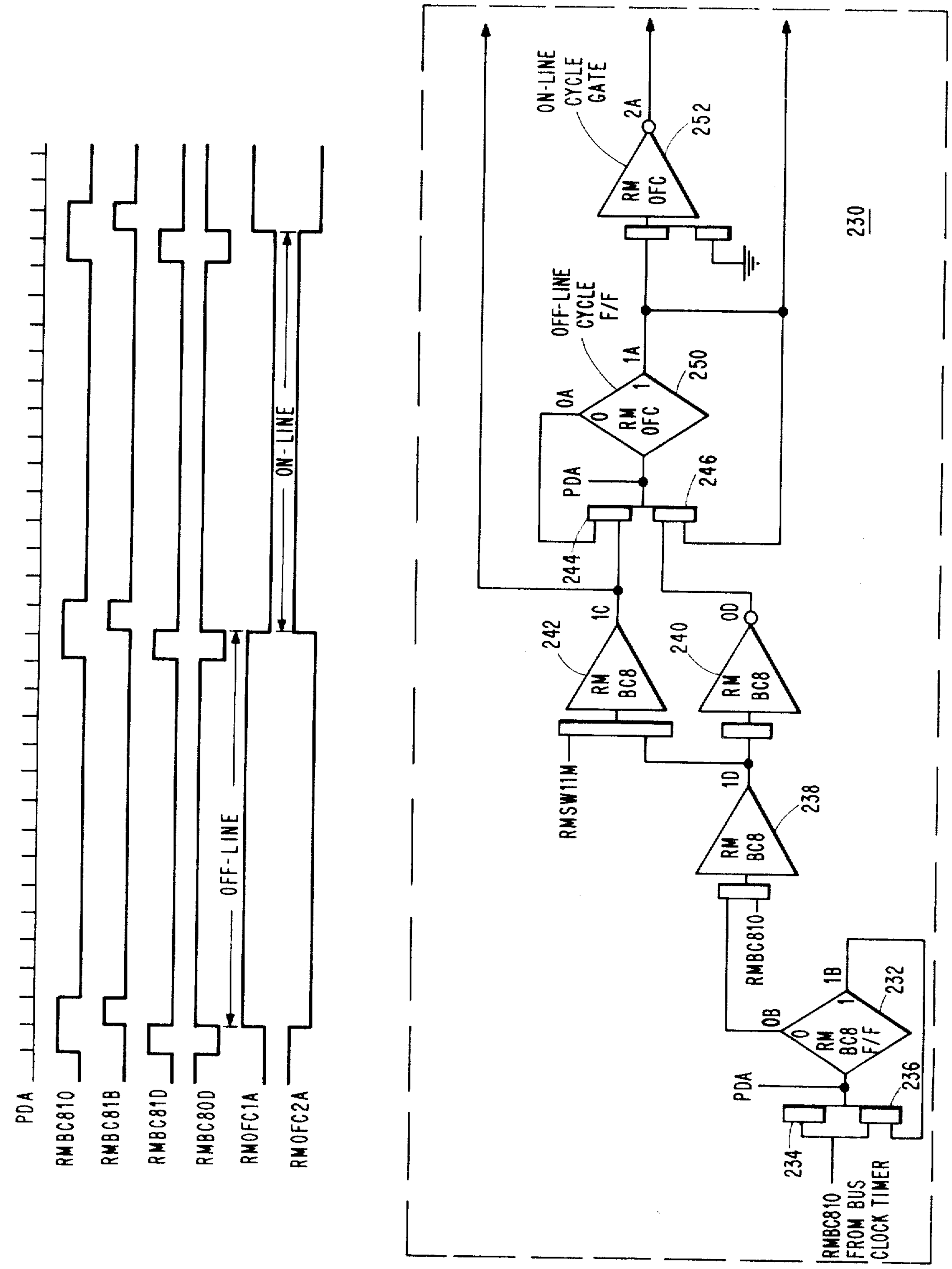
FIG. 3*a* shows in greater detail the timing logic of FIG. 3.

As shown by FIG. 3*a*, the Bus Logic section 230 includes a flip-flop 232 with set and reset AND gates 234 and 236, an OFF-LINE/cycle flip-flop 250 with AND gates 244 and 246 gate buffer amplifier (GBA) stages 238 and 240, and gate buffer inverter (GBI) stages 240 and 252. In operation, when Bus Clock Timer section 228 forces the function RMBC810 high, applied via line 229, this resets flip-flop 232 to its ZERO state which generates the function RMBC80B. The presence of RMBC80B and RMBC810 forces an output RMBC81D which stays high for one clock period of PDA when flip-flop 232 is set to its ONE state via its recirculation gate 236.

During normal operation, the divider switch is in a normal position which forces function RMSW11M high. The functions RMSW11M and RMBC810 enable AND gate 242 which in turn forces RMBC81C high which sets OFF-LINE cycle flip-flop 250 to its "ONE" state. The function RMBC80D generated by recirculation gate 246 serves to hold cycle flip-flop 250 in its "ONE" state until it resets at the next time function RMBC810 comes high. The ON-LINE Bus cycle function is generated by inverting the "ONE" output RMOFC1A of the flip-flop 250. The timing relationships between the functions discussed above are as shown in the timing diagram of FIG. 3*a*.

Figure 3B:
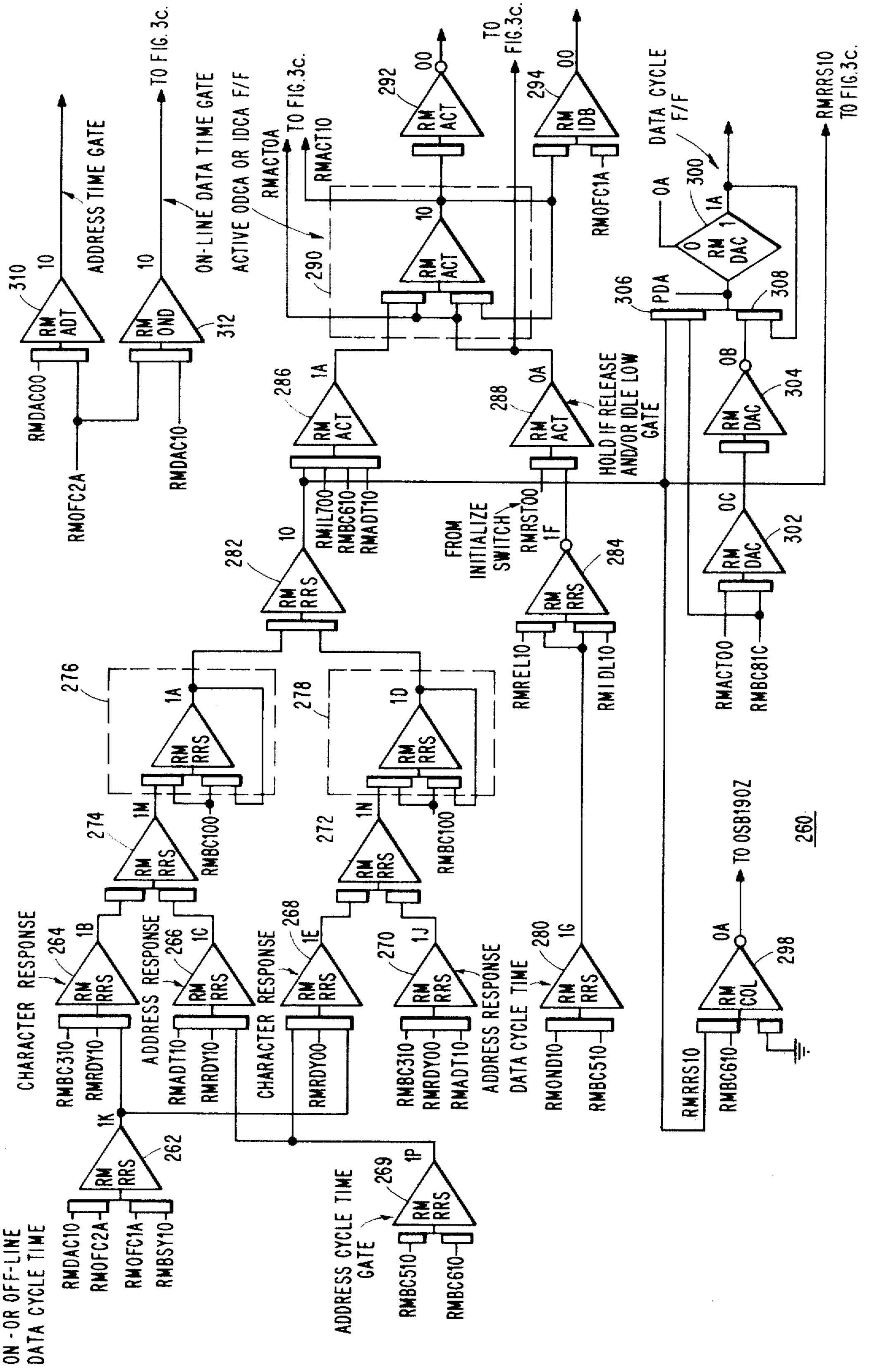
FIG. 3*b* shows in greater detail the address/data response logic of FIG. 3.

SCANNER SYSTEM ADDRESS LOGIC OF FIG. 3b

General

When the terminal system operates "on-line," the device scanner 100 generates a 4 bit address code at outputs SC100-SC400 of a 4 bit counter 214 as shown in FIG. 3. As FIG. 3 discloses, these outputs are applied as inputs to the interface circuits LTR-1 through LTR-4 and then to lines OSB010Z, OSB040Z respectively. The address counter 214 comprises four flip-flop stages designated SC1 through SC4 which are series connected to form a conventional shift register counter 214 which generates up to 16 different address codes within a complete operative cycle. By coding an additional bus line OSB060Z as either a ONE or a ZERO so as to define either input or output device address code, the number of address codes is increased to 32.

The scanner address counter logic is continually advanced or incremented by a counter advance function SCS10 applied via an AND gate 212. In particular, when the Boolean logic statement RMADT10, RMACT00, RMBC81C is satisfied, this activates the AND gate 212 which forces function RMSCS10 high. At this time, the bit counter 214 advances to the next highest address code upon the receipt of a clock pulse PDA during an address time interval of the ON-LINE cycle. The function RMADT10 defines the address time interval of the ON-LINE cycle (when counter incrementing occurs) and is generated by the logic 260 of FIG. 3*b* as described herein. The scanner counter 214 stores this address contents until a following ON-LINE cycle at which time function RMSCS10 again comes high which increments the counter contents by one.

The generation of the advance function RMSCS10 is also conditioned by the fact that none of devices of the system have responded to the device address code applied to the bus lines during a previous address time interval of an ON-LINE bus cycle. This means that when either an input device or an output device responds to its address code, it forces address function RMADT10 high which in turn forces the output of an AND gate 212 low producing function RMSCS00. This function inhibits the incrementing of the address counter. Accordingly, the current four bit device address contents of the counter remain unchanged.

A portion of this logic generates function RMADTI0 which establishes a time interval during which the device scanner 100 sends input device address codes over the bus 150 during ON-LINE cycles. From FIG. 3*b*, it is seen that an address cycle occurs when function RMADTI0 is forced high in accordance with the Boolean Statement: RMOFCIA ·RMDAC00. The function RMOFCIA which defines an ON-LINE cycle is generated by the ON-OFF Line Bus Cycle Logic of FIG. 2*a* as mentioned above. The function RMDAC00 is generated by a data cycle flip-flop 300 as described herein below.

From FIG. 3*b*, it is seen that the binary ONE output, RMACTI0 of the flip-flop 290 is applied to an AND gate 294 which generates an allow scanner to send data to bus function RMIDB00. The state of this function determines when the address information is applied to the bus lines and whether the address information is to be received by an input device or by an output device. In particular, when flip-flop 290 is in its reset state, it forces function RMIDB00 low which permits the address bit contents of the address counter 214 to be applied via their respective line driver circuits LTR1–LTR4 to the bus lines during "ON-LINE" cycles (i.e., when function RMOFCIA is also low). When Active flip-flop 290 switches to its set or binary ONE state (i.e., indicating that there is an active input device IDCA or output device ODCA), it forces function RMIDB00 high which conditions logic to remove the address code from the bus lines.

It will be also noted from FIG. 3 that the aforementioned logic 260 by establishing a predetermined level to the line OSB060Z conditions only input devices to decode the address code applied to the bus. That is, only when line OSB060Z is in a predetermined state will input devices be conditioned to respond to their address codes. This arrangement allows the device scanner 100 to time share the bus between on-line and off-line system data transfer operations which involve input devices.

Also during each address time interval defined by function RMADTI0, the AND gate 270 is operative to force an address response function RMRRSIJ to a ONE when a ready line function RMRDY00 is at a high level during a time defined by timer function RMBC310 (i.e., before the system devices sample the address code applied to the bus). This function activates an AND gate 272 which forces function RMRRS1N high which causes flip-flop 278 to be set to its binary ONE state.

It will be noted that a further address response AND gate 266 receives function RMRRS1P from an AND gate 272 which is enabled during time intervals BC510 and BC610. Additionally, the AND gate 266 also receives function RMADT10 together with a ready function RMRDY10. Normally the addressed device responds to its address code by switching ready function RMRDY10 from a low to high state during time RMBC510. Accordingly, AND gate 266 forces function RMRRS1C high which sets a flip-flop 276 to its ONE state via a gate 274 forcing function RMRRS1A to a ONE. The Scanner 100 generates an address or character response pulse to a change of state in the ready line when functions RMRRS1A and RMRSS1D are both ONES by activating an address or character response AND gate 282. This gate forces function RMRRS10 to a ONE which in turn permits function RMCOLOA to force the bus control line OSB190Z low during time BC610. The control pulse produced serves to acknowledge the device's response to its address code being placed upon the bus during that ON-LINE cycle. Both flip-flops 276 and 278 are reset at the beginning of the next bus cycle by timing function RMBC100.

Another portion of the logic of FIG. 3b establishes a period of time during which only data characters will be transferred over the bus 150 during "ON-LINE" and "OFF-LINE" bus cycles. This logic includes the data flip-flop 300 which is set to its ONE state in accordance with Boolean statement: RMDAC1A=RMRRS10·RMBC81C.

The flip-flop 300 is held in its ONE state by function RMDACOB which activates a hold AND gate 308. As shown, function RMDACOB is generated by amplifier gates 302 and 304 in accordance with the Boolean equation RMDACOB=RMACT00·RMBC81C. Since this logic function is generated by the "NANDing" of functions RMACT00 and RMBC81C, the data cycle flip-flop 300 will remain in its binary ZERO state even in the presence of a set function RMRSS10 until the scanner 100 generates Device Active function RMACT10 when it detects a change in the ready function RDY00 produced by a system device in response to an address code.

Specifically, when a device responds to its address code function RMRRS10 comes high. This causes active ODCA/IDCA flip-flop 290 to switch to its binary ONE state which in turn forces function RMACT00 low. When the function RMACT00 goes low, it forces the hold function RMDACOB high. Accordingly, at the next PDA pulse, the data cycle flip-flop 300 is switched from its binary ZERO state to its binary ONE state thereby producing function RMDAC10 which defines subsequent ON-LINE cycles as data cycles.

The DCA flip-flop 300 which will be held in its binary ONE state (i.e., a data cycle) until the scanner 100 receives a release (i.e., function RMREL10=1) during data cycle time (i.e., function RMOND10=1) and/or the terminal system is initialized (i.e., function RMRST00=0) by a switch on a control panel. At that time, flip-flop 290 resets to a ZERO forcing function RMACT00 high. At time RMBC81C, data cycle flip-flop 300 will be reset to its binary ZERO state by its hold function RMDACOB being forced low which deactivates gate 308.

It will be noted that the ONE output of flip-flop 300 is applied to the driver interface circuit of bus line OSB120Z. This function is monitored by the various devices of the system and its state defines whether the information is an address code or a data character. When function RMDAC00 the information on the bus is to be interpreted as address code and when function RMDAC10 is high the information on the bus is to be interpreted a data character.

In FIG. 3*b*, during data cycle time (i.e., when function RMDAC10=1) an AND gate 262 again is activated and forces function RMRR1K high in accordance with the Boolean equation: RMRRS1K=RMDAC10·RMOFC00+RMOFC10·RMBSY10. Accordingly, function RMRRS1K in turn activates character response AND gate 264 when the ready function RMRDY10 is high during a time defined by timer generated function RMBC310. The AND gate 264 forces function RMRRS1B high which in turn sets the flip-flop 276 to its ONE state.

When all of the devices have accepted the data character applied to the bus information lines, ready function RMRDY00 switches from a low to a high state. This in turn forces function RMRRS1E high which forces function RMRRS1N high, and switches flip-flop 278 to its ONE state. As described above the functions RMRRS1A and RMRRS1D together activate the AND gate 282 which in turn forces function RMRRS10 high. This activates gate 298 during time defined by timing function RMBC610 and produces a control pulse which is thereafter applied to bus line OSB190Z as shown in FIG. 3. The control pulse produced acknowledges the device's responses to their acceptance of the data character placed on the bus to the input device.

In summary, the scanner 100 generates address and character responses via the data cycle time and address cycle time AND gates 262 and 272 as results of changes in state of the function RMRDY00 which causes the appropriate conditioning levels to be applied to the character response gates 264 and 268, and address response gates 266 and 270 respectively.

Figure 3C:
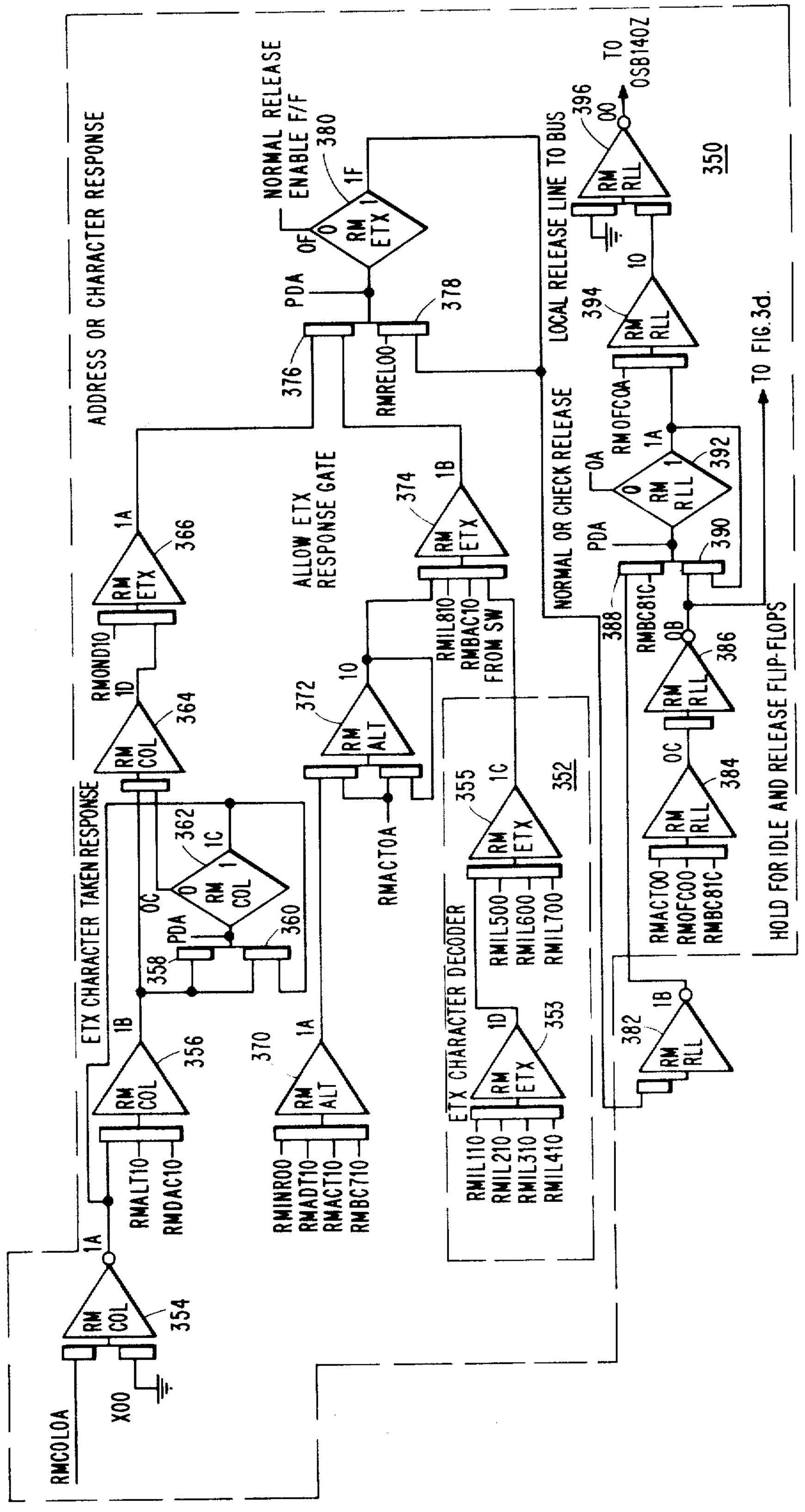
FIG. 3*c* shows in greater detail the Normal Release logic of FIG. 3.

SCANNER NORMAL RELEASE LOGIC-FIG. 3*c*

When the system operates in the transaction (block) mode, the device scanner 100 is operative to detect the presence of a specially coded data character, an End of Text (ETX) character, which normally defines the end of a data block or segment. When all of the various devices of the system acknowledge receipt of the ETX character from the bus by causing a change in state in ready function RDY00, the scanner 100 generates a logic level on line OSB140Z which releases the input device which has been transferring data characters from the bus 150. The scanner 100 then increments its address counter 214 by one to the address code of the next input device to be addressed.

Referring to FIG. 3*c*, it will be noted that when the above mentioned transaction code is selected by placing the BLOCK/BATCH switch on the control panel to the BLOCK position it forces function RMBAC10 high. The AND gates 353 and 255 which comprise a decoder 352 will be enabled to decode the bits of an ETX character when received via bus lines 1L1 through 1L8. The function RMALT10 is a ONE when a flip-flop 372 switches to a ONE as follows. An Allow ETX Response AND gate 370 is forced to a ONE in accordance with the Boolena equation: RMALT1A=RMACT0A·RMACT10·RMINR00·RMBC710. The function RMINR00 can be considered to be a binary ONE since the function RMINR10 and its associated logic only inhibit the scanner 100 from generating a normal response when it senses an ETX character when the system is operating in certain on-line modes (e.g., device polling mode/selection mode). These various modes are described in connection with above mentioned copending patent applications. The function RMALT1A in turn sets an Allow ETX Response flip-flop 372 to its ONE state, thereby forcing function RMALT10 high.

As shown in FIG. 3*c*, the function RMALT10 is applied as an input to a pair of AND gates 356 and 374 which generate the functions RMCOL1B and RMETX1B respectively. The function RM1L810 is a ONE when the parity bit of the ETX character is a ONE indicating correct parity. The function RMETX1B together with RMETX1A sets a Normal Release Enable flip-flop 380, to its binary ONE state.

The AND gate 366 which produces RMETX1A, as shown, receives the two input functions RMCOL1D and RMOND10. An On-Line Date Time function, RMOND10, comes high when an AND gate 312 of FIG. 3b is activated during data cycle (i.e., function RMDAC10=1) and during an ON-LINE bus cycle (i.e., function RMOFC2A=1). The AND gate 364 forces function RMCOL1D to a ONE when an ETX character taken Response function RMCOL1B comes high at a time defined by function RMCOL1C which comes high at the end of PDA pulse when flip-flop 362 switches to its ZERO state. Accordingly, functions RMCOL1B and RMCOL0C condition AND gate 364 to generate function RMCOL1D which is a clock pulse in width. This function when ANDed with function RMOND10 enables AND gate 366 to force the function RMETX1A to a ONE.

As mentioned previously, functions RMETX1A and RMETX1B enable AND gate 376 which switches the Normal Release Enable flip-flop 380 to its ONE state. This flip-flop remains in this state until its hold gate 378 is deactivated by function RMREL00 being forced low. The function RMREL00 goes low when either the release flip-flop 392 is switched to its binary ONE state or an input device generates a release response by forcing line OSB140Z to a ONE. The flip-flop 392 switches to a ONE when the RMETX1F of the Normal Enable Release flip-flop 380 comes high which activates an AND gate 382. This gate forces release function RMRLL1B high via AND gate 388 switching the release RMRLL flip-flop 392 to its binary ONE state. This in turn forces the output function RMRLL10 of AND gate 394 high which is inverted by a gate buffer inverter 396 and applied to line OSB140Z as function RMREL00. The input device which was transmitting data characters to the bus 150 will release itself in response to the change in state in this function as described herein. The next major areas of the system include the Device Control Area (DCA), which will now be described.

IN GENERAL

As illustrated by the system block diagram of FIG. 1, each device has a peripheral control unit termed a DCA which has a GDCA which includes logic for a standard interface between the DCA and bus 150 and a buffer memory. As shown by FIG. 1, the system includes several different types of device control areas and these are labeled IDCA, ODCA, and I/ODCA.

An IDCA provides logic, buffer storage, timing and interface circuits for communicating with the terminal bus 150 and controlling the operation of its associated input device. In particular, an IDCA includes logic operative to transfer information characters via its general device control area (GDCA) to the terminal bus for receipt by an output device or through the COMM DCA to either another remote transmission terminal or to a data processing system. Accordingly, an IDCA performs the following functions:

decodes and recognizes an address wired therein when applied to the bus 150 by the terminal scanner 100; acknowledges the receipt of an address code via a switching of ready function RMRDY00;

loads a first data character from its associated buffer register on to the bus 150 and thereafter generates a data line signaling same;

places a next character into its buffer register upon detecting a predetermined control pulse (RMCON00);

reads, transfers and ignores predetermined characters and;

switches to an inactive state in response to a level placed on the release line by the device scanner 100 when it detects an ETX character on the bus.

Output Device Control Area (ODCA)

The ODCA similarly provides timing, storage, logic and interface circuits for transfers between the standard bus and its associated peripheral device. It performs logic functions comparable to the IDCA with the exception that it performs them for an output device. Therefore, the ODCA accepts a data character when the device scanner places a bus strobe on the appropriate line and it signals via ready line function RMRDY00 when it is conditioned to receive the next character and thereafter stores the received data character in its memory.

Input/Output Control Area (I/ODCA)

The above unit can be considered as a combination of an IDCA and ODCA. It is used as both an input device control area and an output device control area. Whether it operates as either an input or output device is established by the state of bit 6 of the device address code placed on the bus together with the setting of an associated function switch. In particular, when bit 6 is a binary ONE, the I/ODCA will function as an IDCA. And, when bit 6 is a binary ZERO, it operates as an ODCA.

General Device Control Area (GDCA) Logic

Figure 7:
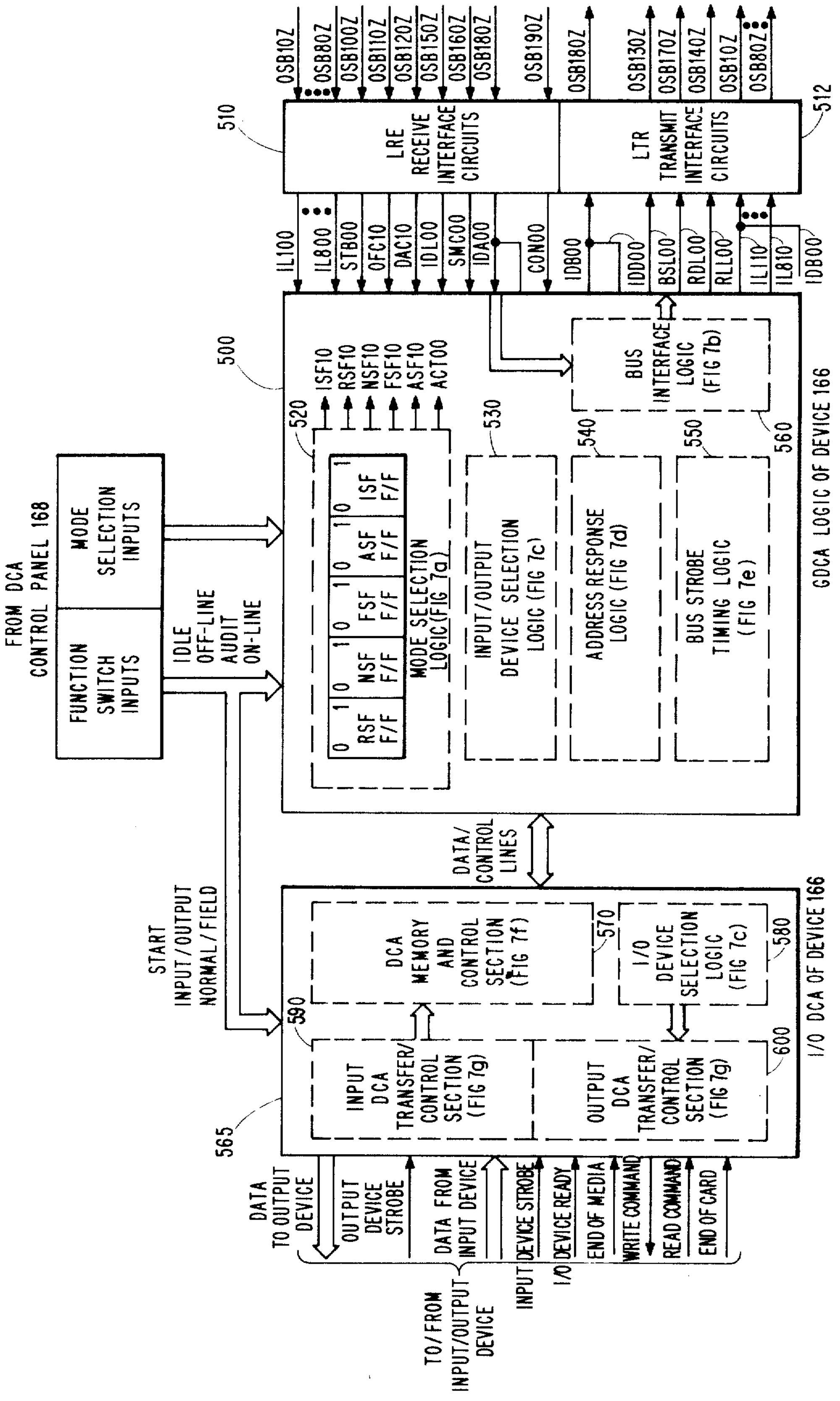
FIG. 7 is a block diagram of one of the device controllers of FIG. 1.

Each DCA, as mentioned, has a GDCA section which provides a uniform logic interface to the terminal bus 150. FIG. 7 illustrates in block form the pertinent sections of the GDCA logic. As shown, the GDCA includes a Mode Selection State Logic Section detailed in FIG. 7*a*, an Address Response Logic Section detailed in FIG. 7*d*, Input/Output Device Section Logic detailed in FIG. 7*c*, Bus Strobe Timing Logic detailed in FIG. 7*e*, and a Bus Interface Logic detailed in FIG. 7*b*.

In some instances, the logic of the various portions of a DCA has not been separated as this would require additional references to other FIGS. Therefore, the following mnemonic prefixes have been used for logic functions generated by the various portions of the system for denoting that portion which generated same. The prefixes used are:

OS=Standard Bus Signal Lines;

IF=GDCA Internal Logic Functions;

IG=GDCA to Bus or to Control Panel Interface Logic Functions;

IH=Bus to GDCA Interface Logic Functions;

RX=DCA Logic Functions; and,

RP=Peripheral Device Logic Functions.

MODE SELECTION LOGIC OF FIGURE 7*a*

General Description of Device Operational Modes

It will be noted that FIG. 7*a* discloses the storage and the logic which establishes the various operating modes, as well as states, for a GDCA.

The GDCA can operate in one of several modes depending upon the position of a control panel mode selection switch and bus conditions. A mode switch is associated with each peripheral device. With the mode switch in conjunction with a START button, an operator can select among the operating modes available to a particular device. These modes are defined by the states of clocked synchronous flip-flops of FIG. 7*a*. These flip-flops may be arranged to drive indicator lights which display the status of each of the devices operating. The operating modes and states and their respective functions are:

| | Modes | Functions |
|---|---|---|
| (1) | Idle | =IGISF**10**; |
| (2) | Ready | =IGRSF**10**; |
| (3) | On-Line | =IGNSF**10**; |
| (4) | Off-Line | =IGFSF**10**; and |
| (5) | Audit Trail | =IGASF**10**. |

Figure 4:
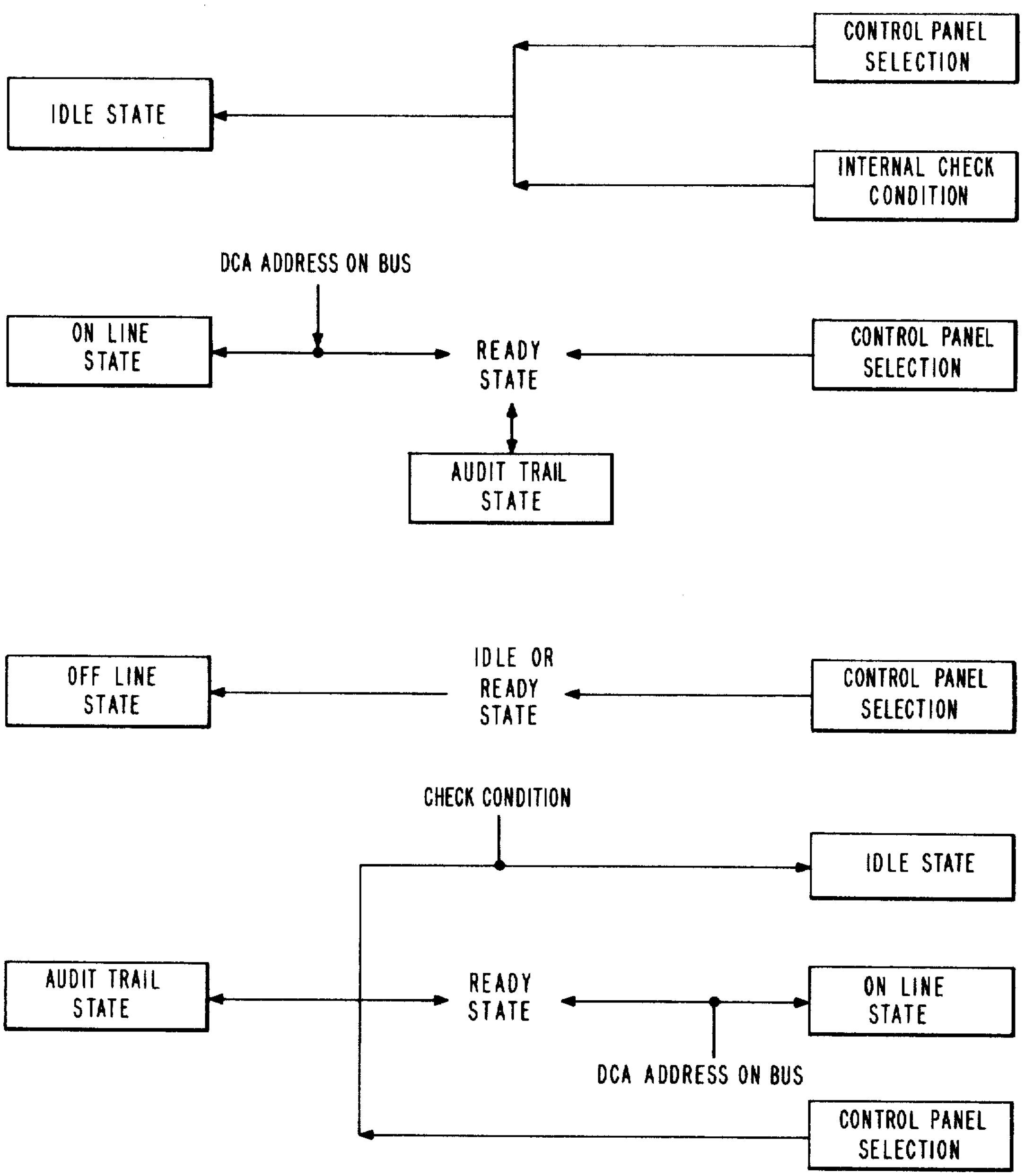
FIG. 4 is a flow diagram of the operating state selection of a typical device controller of FIG. 1.

The sequence of states for establishing the operating modes for the various DCA's are illustrated in the flow diagram of FIG. 4. With reference to this Figure, the operational states will now be described briefly. The GDCA switches to the idle state when an operator manually selects the idle position on the control panel mode switch or the GDCA detects an internal check condition. When a device is in the idle mode, AC power is removed from the device and the device is unavailable for either on-line or off-line processing. Hence, while in the idle mode, the device can be considered as being in an inactive state. Accordingly, when addressed, the device will signal busy via bus line OSB130Z.

By contrast, when in the on-line, off-line or audit trail, the device can be considered to be in an active state.

Prior to entering the on-line mode, the device first switches to the ready state. This state is an intermediate state which is entered when the operator sets the mode switch to the On-line position and depresses a START button. Also, as FIG. 4 illustrates, the GDCA switches to this state when it completes a data transfer when it receives a normal release from the scanner 100. When in this state, AC power is applied to motors associated with the device. This state permits the device to be polled or selected via its GDCA prior to entering the on-line mode. That is, with a function switch set to the on-line position the GDCA upon detecting its address code will switch to the on-line mode.

As mentioned, the GDCA switches to the on-line operation state when it detects its address code on the bus. Additionally, the device may enter the on-line state from the audit trail state when the mode selection switch is in the audit position and the devices address code appears on the standard bus as indicated by FIG. 4.

In the on-line mode, the IDCA/ODCA transfers and accepts respectively data and control characters only during ON-LINE bus cycles.

As FIG. 6 illustrates, the GDCA may terminate on-line mode operation under the following conditions:

1. When the device scanner 100 generates a level on the release line and the DCA generates a ready signal, the DCA switches from the on-line to the ready state;
2. In response to internal check conditions or upon the receipt of a release from an input device, the DCA switches from an on-line to the ready state; and,
3. When the DCA receives a release signal and generates a ready response, it switches from the on-line state to the audit trail state.

Similarly in the off-line mode, the IDCA/ODCA transfers and accepts respectively data and control characters only during the OFF-LINE bus cycles.

As indicated by FIG. 4, the DCA enters the off-line state when the mode switch manually selects the off-line position while it is in either the idle state or ready state. Also, upon receipt of a ready signal followed by a bus release signal, the DCA when in audit trail state switches to the off-line state. The GDCA terminates the off-line state when another state is selected by the mode switch and when the DCA generates a ready response. While, in this mode, an IDCA can transfer data to one or more ODCA's and their associated devices when each ODCA is set to the off-line mode.

Additionally, when in the audit trail mode, output devices through their respective ODCA's can monitor and accept all data characters which are applied to the bus. This state is manually selected and is only utilized by output device control the areas (ODCA's) and their associated devices. And, when its address code appears on the bus, the ODCA responds with a ready signal and then enters the on-line state. The mode switch may be used to switch the ODCA from the audit trail mode to any other operational mode. Switching occurs when the ODCA receives a ready signal from its device.

The ODCA will switch from the on-line state to the audit trail mode following its receipt of a release response and a ready response from the bus. Also, the ODCA will terminate operating in the audit trail mode upon sensing a check or error condition at which time it will switch to the idle mode.

FIG. 5 shows in greater detail, the pertinent control functions, their states and changes therein for the above-mentioned change in modes. These function provide inputs to the logic and state storage of FIG. 7*a*. They will be discussed in greater detail with respect to this Figure.

Bus Interface Logic Section-FIG. 7*b*

This section includes the Bus Input Data Line transmit logic block 751 for input and output devices respectively. The transmit logic shown in block 751 includes a pair of gates inverter amplifier gates 752 and 756 operative to generate functions IFIDB00 and IFIDD00 for an input device as defined by function IGINPI0 as described herein. When an input device places a character on the bus 150, it forces functions IFIDB00 and IFIDD00 low. This forces line OSB180Z to a ZERO which enables the IDCA to apply a data character from its memory to the bus lines OSB010 through OSB090.

The logic of block 761 generates a transfer function IHSTL10 for an output device in response to function IFIDA10 being switched to a predetermined state. In particular, when an active IDCA transfers a data character to the bus lines, it forces the Input Data Line function IFIDA10 high by forcing line OSB180Z to a ZERO. The function IFWBT10 comes high in accordance with the Boolean equation: IFWBT10=IFDRF1-C·IFOFC00+IGFSF10·IFOFC10. This function defines the "working bus time" for each ON-LINE and OFF-LINE bus cycle during which the actual data character transfer occurs within each DCA.

The bus data line receive logic 761 for an output device in response to the presence of function IDA00, forces function IGGSTI0 high by activating an AND gate 762 which in turn generates transfer function IHSTLI0 when output device functions RXPOSI0, RXCLD00 and RXPDYI0 are all ONES. The Boolean equations for each of these functions are given in the FIG. 7*b*.

Further, this section includes logic of blocks 770 and 780 for generating a bus busy response and ready response on bus lines OSB130Z and OSB170Z respectively. A state of the function applied to line OSB170Z indicates whether the addressed DCA has been activated. The DCA devices when addressed in a ready or audit trail state respond by changing the state of ready function IFRDYL00. In particular, amplifier gates 778 and 786 together with flip-flop 784 condition bus lines OSB170Z via inverter amplifier gate 782 to signal a ready upon decoding its device's address code applied lines IFIL100 through IFIL600. The function IFBSR1A generated by an AND gate 788 comes high when there are no check or error conditions (IFCHH00=1), during an address cycle time (IFDAC00=1) portion of an ON-LINE cycle (IFOFC00=1) and when its address response (ARF) flip-flop 982 of FIG. 7d is set to its one state (IFARF10=1). If the device is in either its ready state (i.e., IGRSF10=1) or audit trail state (i.e., IGASF10=1), function IFARL10 comes high in turn switching flip-flop 784 to a binary ONE. This in turn forces function IFRDL00 from a high to a low state and this function is applied to line OSB180Z. The ARL flip-flop 784 switches to a ZERO during the following OFF-LINE cycle (i.e., function IFOFC00=0).

The GDCA logic 780 also generates a ready response for an output device via OSB170Z via gates 792 and 790. That is, the response is generated for each data character accepted by a selected output device (IFDRL1A=IGOUT10), during the working bus time (IFWBT10=1) of a data cycle (IFDAC10=1) when the ODCA previously in a condition of ready to receive a data character (IFDRF10=1) completes writing the data character from the bus 150 into its memory (IFDRF10=0). This causes function IFRDL to be switched from a high to low state switching the ready line from a high to low state. Also the logic 780 includes a transfer gate 794 which enables the IDCA of a selected input device to apply a data character read from its memory to the bus. That is, when the DCA is selected to operate as an input device (IGINP10=1) and has read a data character from its memory (IFDRF10=1), it will activate an AND gate 794 to force output to bus transfer function IFOTB1A high. This enables the IDCA to apply a data character to the bus 150.

When the DCA is in either an off-line or idle state as defined by functions IGFSF10 and IGISF10 respectively, it will generate function IFBSRI0 via an AND gate 778 which in turn forces bus line OSB130Z low. This allows the device to respond busy when the scanner 100 places its device address code on the bus. Additionally, the GDCA also generates a busy response via gates to the address code of an input device (IGINP10=1) when the input device is in the off-line state (IGFSF10=1).

Another group of logic in FIG. 7*b* includes a Normal Release Memory flip-flop 806 with associated logic gates. The one output of this flip-flop is fed to the mode state logic of FIG. 7*a* and will cause the state of the active DCA to be changed when the functions IFREL00 and IFIDL00 are forced to predetermined states by either the device scanner 100 or the active DCA itself.

In greater detail, when the release function IFREL00 is forced low it activates an AND gate 810 which produces function IFNRMI0. And, during an ON-LINE busy cycle (IFOFC00=1) upon the receipt of a strobe pulse (IGSTB3C=1), IFNRM flip-flop 806 switches to its binary ONE state. This forces function INFRM10 high which in turn forces function IFNCR10 high by activating a pair of gates 804 and 802.

An AND gate 828 is activated during an OFF-LINE cycle to switch flip-flop 806 to its ZERO state when its associated DCA has been switched to the idle state (IGISF10=1), or the audit trail state (IGASF10=1) or to the ready state (IGRSF10=1). Switching is accomplished when the above functions force function IFNRMOC to a ZERO which inactivates the hold gate of flip-flop 806.

Last group of logic in this section includes the group of gates and a flip-flop 846 of block 840 which feed bus line OSB140Z. The device DCA uses this line to indicate a termination of input data transfer when it is out of media (e.g., out of forms/cards or reached an inter-record gap). When this occurs, function IHOOF10 comes high when the device DCA is operating in the On-Line state (IFNSF10=1). This causes RLF flip-flop 846 to switch to a binary ONE. During an on-line cycle (IFOFC00=1), the selected input device (IGINP10=1) forces function IFRLL10 high by activating an AND gate 844 in turn forcing the bus line OSB140Z low via an inverter gate 842. This signals that the DCA is releasing its input device from the bus 150.

The logic circuits which process signals from its associated input device as for example a card reader, indicating when it is out of media (e.g., cards) are also shown in block 870 of FIG. 7b. Here, the card reader device generates a function RPOFF00 when it senses a hopper empty condition establishing the above mentioned out of media indication. Referring to this Figure, it will be noted that an out of form (IHOOF) flip-flop 890 is initially switched to its ZERO state by an initialize function RXSTA30 when the device DCA is in its idle state (IGISF10=1). Accordingly, upon receipt of the out of media function RPOFF00 from the card reader device, IHOOF flip-flop 890 switches to its binary ONE state when the last character stored in its memory (RXEOD10=1) applied to the bus 150 has been accepted (IGNEC10=1) by all of the output devices. In greater detail, a function RXOFB10 when ANDED with RXOFF10 by gate 886 forces the gate 886 output high switching flip-flop 890 to its ONE state.

When IHOOF flip-flop 890 switches to a binary ONE, function IHOOF10 comes high and activates an AND gate 848 producing function IFRLF1A which sets RLF flip-flop 846 to its ONE state. Thereafter, in the manner described above, the bus logic 840 is conditioned to generate the release function via bus line OSB140Z.

Input/Output Device Selection Logic of FIG. 7*c*

This logic is shown as block 960 in FIG. 7*c* and determines whether its associated I/O device is to operate as an input device or as an output device during ON-LINE and OFF-LINE bus cycles. As shown, this is established by pairs of jumpers 945 and 966 and the position setting of the Input/Output device function switch on the I/O Device's Control Panel.

When the I/O DCA is selected to operate as an IDCA, the Panel Function switch and jumpers function place IFOUT1J at a binary ZERO and function IFINP1J at a binary ONE. The IDCA is activated in either the idle state IGISF10=1 during an OFF-LINE cycle (IFOFC10=1) when a Bus Strobe (IGSTB1C) is present. Specifically and ANDing of functions IFOFC10, IGSTB1C, and IGISF10 force function IFINP1B to a ONE which sets Allow Active as Input Device (IGINP) flip-flop 942 to its binary ONE state. At the same time, an inverter gate 964 inverts the high output of jumper card 966. This inhibits an Allow Active as Output Device (IGOUT) flip-flop 962 from being switched to its one state during the same OFF-LINE cycle. The I/O DCA is selected to operate as an IDCA from a remote source, e.g., the COMM DCA, as follows.

It will be noted that the Function switch position for IDCA and ODCA remote selection causes both functions IFINP1J and IFOUT1J to be binary ZEROS.

When the IDCA is in its on-line state (IGNSF10=1), an AND gate 946 becomes active forcing function IGREM10 to a ONE when neither flip-flop 942 or 962 are in a ONE state, this causes IGINP flip-flop 942 to be switched to its ONE state when bit 6 of the device address code is a ONE (i.e., IFIL610=1) as mentioned.

When the I/O DCA is to operate as an ODCA, the jumpers are wired in an opposite fashion so that during an OFF-LINE cycle, the IGOUT10 flip-flop 962 is set to a ONE in accordance with the equation: IGOUT10=IFOFC10·IGSTB1C·IGISF10·IFINP0A in a similar fashion.

As concerns remote selection, when the DCA is in an on-line state, IGOUT flip-flop sets in accordance with the equation: IGOUT10=IFNSF10·IFIL600·IGREM10. That is, when the DCA is in its ready state IGOUT flip-flop sets to its ONE state when bit 6 of the address code is a binary ZERO.

Some of the logic of Input/Output Selection Logic discussed above feeds the input/output logic of the I/O DCA shown as block 900 in FIG. 7*c*. This logic includes a Data Ready for transfer IHDRY flip-flop 906 and associated logic in addition to a Device Ready (IFDRF) flip-flop 920. The IHDRY flip-flop 908 switches to its ONE state under several conditions. These include when the DCA is selected by an operator to operate as an output device (IGOUT10=1) or the selection is remote wherein both input (IGINP) and output (IGOUT) flip-flop 940 and 962 are reset to ZEROS which forces function IGREM10 to a ONE, one of these function actuates a gate 910 forcing function RXDRA10 to a ONE. And, when either the peripheral device signals that it is ready (RXRDY00 is forced to a ZERO) and that certain control characters ETX, RS, or EM, have not been transferred to the bus or that the 80th memory location has not been addressed (i.e., RXEOM10=0) function RXPDY10 is forced to a ONE. These functions switch flip-flop 908 to its ONE state.

Additionally, IHDRY flip-flop 906 will also be switched to a ONE by functions RXDOC10 and RXDAR10. The function RXDOC10 comes high when an AND gate 916 is active as a result of the DCA being selected by an operator to operate as a card reader input device (IGINP10=1) and that either input device is not transferring data characters to the DCA memory or has completed its transfer (i.e., RXRSO00=1) wherein data characters are being read out to the bus from memory. The function RXDOC10 together with function RXDAR10 which comes high at bit time 10 when bit 10 is a binary ONE (when the device function switch is in field position) or at bit time 8 (when the function switch is in a normal position) during a normal read data cycle, sets IHDRY flip-flop to its ONE state.

When flip-flop 906 is a ONE, an AND gate 904 forces a Device Ready to Data transfer function (IFDRD10 to a ONE) provided that there are no check or error conditions present (IGCH00=1). The IHDRY 906 flip-flop is reset by function RXDRY40 which is forced low by a gate inverter 912 when the system is initialized (RXSTA10=1) by either the start button on the control panel (IGEXC10=1) or by being released (IGRLF10·RXROS10) or when the scanner 100 generates a response via IFCON00 which forces function IGNEC10 high.

For an input device on-line transfer when the DCA is in its on-line state (i.e., function IFDRF1C=1) the flip-flop 920 switches to its ONE state each time its DCA has a character ready to transfer from its memory to the bus. That is, when functions IFDRD10 and IFINP10 are ANDed by an AND gate 918, function DRF1A comes high and sets flip-flop 920 at a time defined by functions STB3C and IFOFC10 (i.e. at strobe time IGSTB3C during an OFF-LINE cycle) when a flip-flop 922 is switched to its ONE state by these functions.

For an output device on-line transfer when the DCA is in ether its on-line or audit trail state (i.e., function IFDRF1C=1) the flip-flop 920 switches to its ONE state when the gate 918 ANDing IGACT10·IGOUT10 forces function IFDRF1A to a ONE.

For off-line data transfer for both input and output device transfers, the flip-flop 920 switches to its ONE state via gate 918 which is activated under the conditions mentioned above when its DCA is in an off-line state (IGFSF10=1), when function IFFCD10 is a ONE.

The function IFFCD10 generated by the block 910 of FIG. 7*c* comes high during an ON-LINE bus cycle in accordance with the equation: IFFCD10=IGSTB3C·IFOFC00.

It will be noted that DRF flip-flop 920 resets to its ZERO state under four conditions. These are (1) when the system is initialized (IFRST10=1), (2) when its DCA is either in the on-line or audit trail state (DRF1C = IFNSF10+IFASF10·IFDAC10) and the scanner 100 signals that a data character has been accepted by all output devices (i.e., IFDRF1C·IFNEC10·IFFCD10=1), (3) when its ODCA is in the off-line state (IFFSF10=1) and a character has been accepted (IGNEC10·IFNCD10) and (4) by functions DRFOC and DRFOG which come high when there are no checks (IFCHH00), the DCA is in its on-line state (IGNSF10), it is selected to operate as an output device (IGOUT10) and the character on the bus has been written into memory (IHCTN10=1). As shown, the function DRFOC comes high in accordance with the equation: DRFOC=IHCTN10·IFOUT10·IFFCD10. The so called character taken function IHCTN10=RXCLD10·RXLMR10·RXFSB10. The function IHCTN10 is a ONE when the character has been transferred from the bus (RXCLD10=1), a memory read/write cycle has been initiated (RXLMR10=1) and a final bit count has been reached (RXFSB10=1). And, the function IFDRFOG comes high in accordance with the equation: IFDRFOG=IFDRD00+IFCHH00.

GDCA ADDRESS RESPONSE LOGIC of FIG. 7*d*

The address response logic as shown in block 980 of FIG. 7*d* includes a jumper card 998 and an Address Response IFARF flip-flop 982 and associated logic gates. The jumpers on the card 998 are wired so as to assign a unique device address code to each DCA. When an address code on the bus corresponds to the GDCA wired-in address code, as decoded by AND gate 997, function IFADD1S comes high.

During the address portion (DAC00=1) of an ON-line cycle (IFOFC00=1), the function IFADD10 comes high when an AND gate 990 is activated by the I/O Device Selection logic blocks 940 and 962 of FIG. 7*c* which signals either the remote or operator selection of an input or output device by generating either function IGREM10 or function IFADD1Y. This in turn sets flip-flop 982 to its ONE state during an address cycle (IFDAC00=1) of an ON-LINE cycle (IFOFC00=1) when the bus strobe function IGSTB3C is a ONE provided the addressed device is not busy (IFBSY00=1).

However, when the DCA is in either the off-line or idle state, the GDCA will force function IFBSY00 to a ZERO which prevents the address response flip-flop 982 from being switched to its ONE state.

Figure 7E:
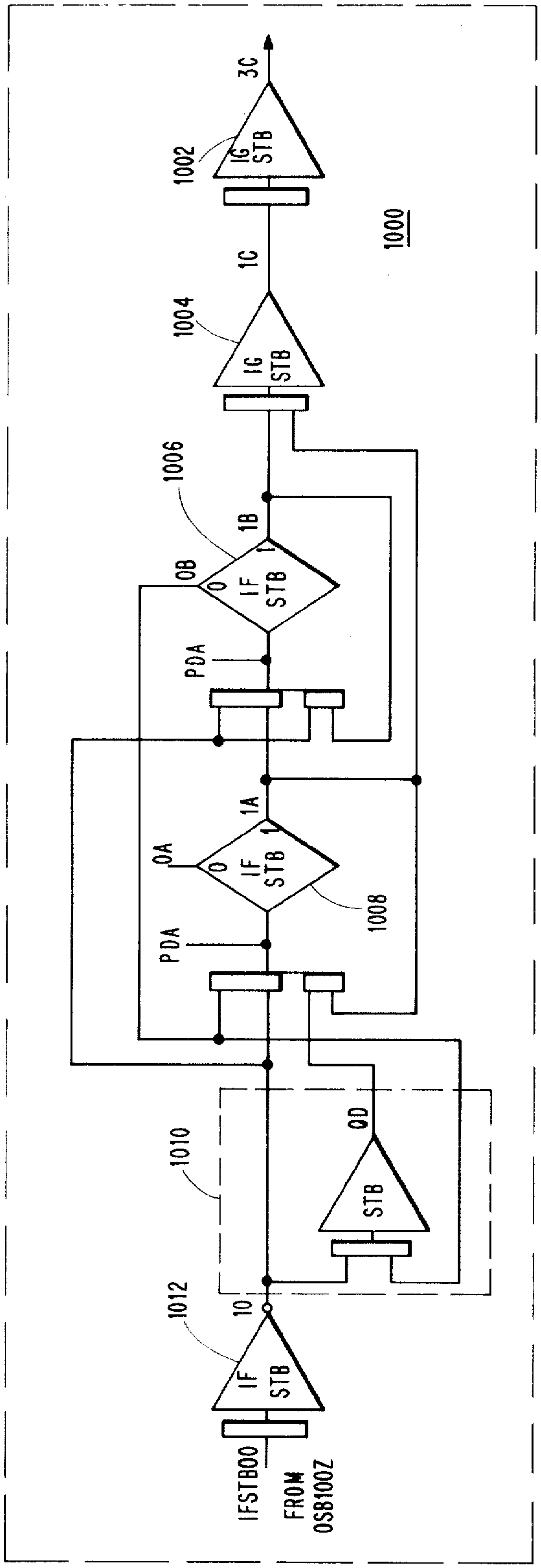
FIG. 7*e* shows in greater detail the Bus Strobe Timing Logic of FIG. 7.

Bus Strobe Timing Logic of FIG. 7*e*

FIG. 7*e* discloses the logic included within block 1000 for generating strobe pulses for synchronizing the various data transfer operations performed by the GDCA and DCA logic in accordance with the ON-LINE and OFF-LINE cycles generated by the device scanner 100. As shown, this logic includes flip-flops 1010, 1008 and 1006 and associated logic.

The scanner generated strobe pulse STB00 derived from scanner timing function BC510 and applied from bus line OSBI10 is inverted by an inverter 1012 and applied as function IFSTB10 to the inputs of flip-flops 1010, 1008 and 1006. The leading edge of pulse IFSTB10 switches, flip-flop 1008 to a binary ONE during a next PDA pulse. When flip-flop 1008 sets, it forces function IFSTBIA to a ONE which switches flip-flop 1006 to a binary ONE upon the occurrence of a next PDA pulse. The trailing edge of same PDA pulse also resets flip-flops 1008 and 1010 to their ZERO states. An AND gate 1004 develops strobe pulses IGSTBIC and IGSTB3C during the time that both flip-flops 1008 and 1006 are set to binary ONES. Accordingly, these pulses are a PDA pulse in width and nomally occur at an interval midway through each ON-LINE and OFF-LINE cycle. A cycle of operation is completed when flip-flop 1006 resets to a ZERO at the trailing edge of the bus strobe pulse IFSTB00.

Device Control Area

Figure 7F:
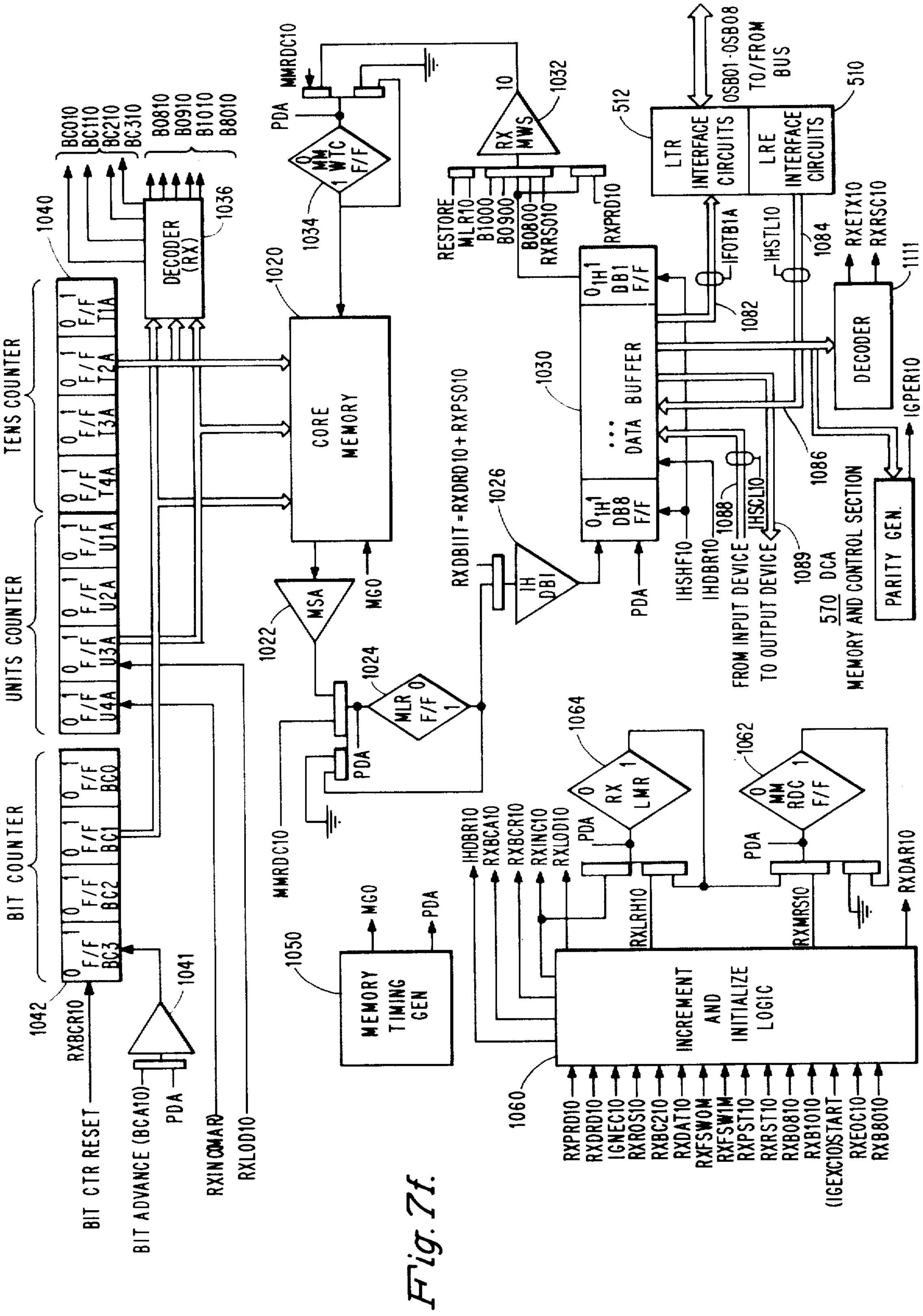
FIG. 7*f* shows in greater detail the memory and control section of the Device Controller of FIG. 7.
Figure 7G:
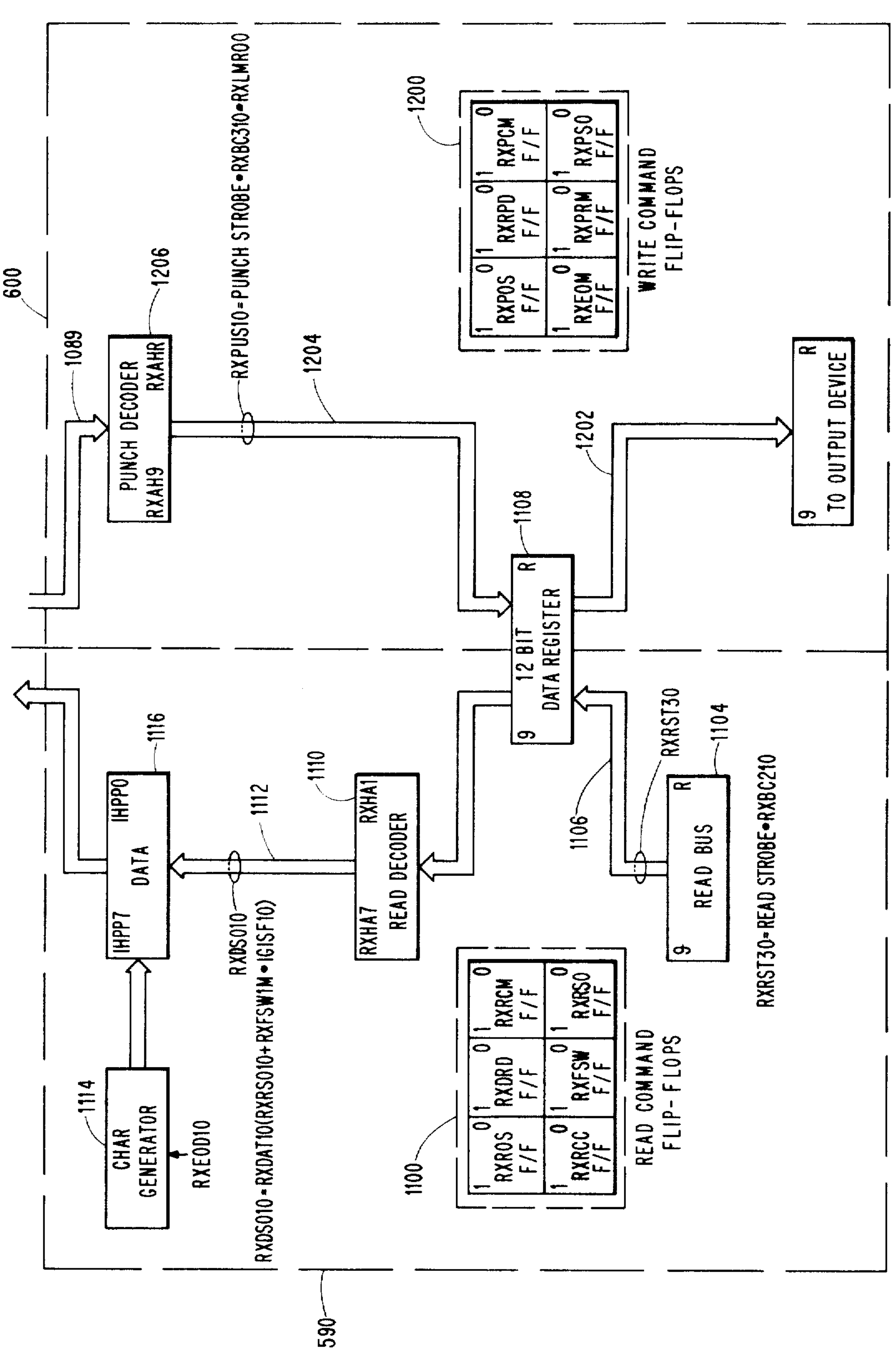
FIG. 7*g* shows in greater detail the Input and Output transfer Control Sections of FIG. 7.

For the purpose of the present invention, the pertinent portions of the device control area of FIG. 7 for an input/output device are disclosed in greater detail in FIGS. 7*f* and 7*g*. It will be appreciated that the device control area (DCA) of either input device or output device is essentially equivalent to the logic of blocks 570 and 600 respectively of the I/O DCA of FIG. 7.

Referring to FIG. 7, the DCA is shown as including a Memory and Control Section 570 (FIG. 7*f*), an Input/Output Logic Section 580 (FIG. 7*c*), and an IDCA and ODCA Data Transfer Control Sections 590 and 600 (FIG. 7*g*).

Memory and Control Section 570

FIG. 7*f* shows the memory and pertinent control logic for the DCA. The memory is a coincident current serial access destructive readout core memory 1020 which contains 200 character locations, each having 10 bits. A timing generator 1050 controls the DCA's memory timing and this unit is similar in construction to the timer unit of FIG. 7*e* described above. That is, it includes an oscillator which feeds a plurality of synchronous flip-flops arranged to generate a memory cycle function (MGO) for each memory cycle which consists of a read cycle (MMRDC10) followed by a write cycle (MMWTC10).

Memory addressing is accomplished by three counters designated as a bit counter 1042 and a units counter and a tens counter which constitute a memory address register (MAR) 1040 of FIG. 7*f*. The bit counter 1042 is a four stage counter whose flip-flop stages are designated BCO10 through BC310. Its output feed a decoder 1036 which generate from counters contents, a number of timing functions including RXBC010, RXBC110, RXBC210, RXBC310, RXBC810, RXBC910, RXB1010 and RXB8010. Some of these timing functions are used to transfer data characters between the Data Transfer Sections 590 and 600 and the memory 1020. Other timing functions as shown are used to gate the bits of a character into an addressed memory location.

The bit counter 1042 is advanced via an AND gate 1041 by a bit counter advance function BCA10 at each PDA pulse and is reset by a bit counter reset function RXBCR10. Under certain conditions described herein, the bit counter 1042 sequences through a portion of its count (i.e., counts 0–3), during which time it will cause the decoder 1036 to generate functions BC010 through BC310 at counts of 0–3 respectively. These functions are used to initialize certain portions of the memory logic so as to synchronize memory timing with the transfer of data characters to and from the memory buffer register 1030 as required. When the bit counter 1042 sequences through only a portion of its count, this count will be referred herein as a fast count. When sequenced through its full count (1 through 10), the bit counter 1042 will cause the decoder 1036 to generate the timing functions B0810 and B1010 at counts of 8 and 10 respectively.

As mentioned, the units and tens counters are four stage counters which serve as the memory address register 1040 for the DCA memory 1020. As shown in FIG. 7*f*, the units counter includes flip-flop stages U1A10 through U4A10 and these stages are advanced by an increment function RXINC10 and are reset to all ZEROS by a function RXLOD10. The tens counter includes stages T1A10 through T4A10 which are advanced by one when the units counter reaches a count of nine (B0910) and when function RXINC10 is a ONE. The stages of the tens counter are also reset by function RXLOD10.

As shown by FIG. 7*f*, functions RXINC10, RXLOD10 and RXBCR10 are generated by the Increment and Initialize logic 1060 as described herein. The memory 1020 transmits and receives data characters to and from a number of transfer paths via its eight stage Data Buffer Register 1030. The register 1030 includes eight synchronous flip-flops series connected to form a shift register which is enabled for shifting by a function IHSHF10 generated by the device DCA as explained herein. It will be appreciated that the register 1030 operates as a parallel to serial converter for operations involving transfers from a data source (i.e., the card reader device or bus) to the memory 1020. And, the register 1030 operates as a serial to parallel converter for operations involving transfers from the memory 1020 to a receiving device (the punch device or bus). The transfer paths include an Input device path 1088, an Output device path 1089, and the bus transfer paths 1082 and 1084.

In general, a memory cycle is initiated when function RXINC10 is forced to a ONE which resets the memory address register (i.e., stages U1A through T4A) to a first count (i.e., count of 1) for addressing the first memory location whose contents are to be read. A Load Memory Ready (RXLMR) flip-flop 1064 forces function RXLMR10 to a ONE when switched to a ONE by function RXINC10. The function RXLMR10 in turn switches a Read Command flip-flop 1062 to its ONE state when function RXMRS10 is a ONE. The function RXMRS10 comes high in accordance with the equation: RXMRS10 = BCA10·RXDAA00. The function RXDAA00 comes high one clock pulse (PDA) after the End of Data Character function RXDAR10 is generated. Function RXDAR10 is generated in accordance with the equation RXDAR10 =

RXFSWOM·RXB0810 RXLMR00 + RXFSWIM·MMMLR10 RXLMR00 RXBI010. The functions RXFSWOM and RXFSWIM are generated in accordance with the setting of the DCA's FIELD/NORMAL mode switch as described herein.

When the bit read out is sensed by a sense amplifier 1022, it is stored in a flip-flop memory local register 1024 when function MMRDC10 is forced high by flip-flop 1062 being set to a ONE. At the next PDA pulse, flip-flop 1062 then resets. Assuming that the information bit is to be restored, then the output MMRDC10 of the flip-flop 1024 switches a write command MMWTC flip-flop 1034 which forces function MMWTC10 to a ONE if the bit read from memory 1020 is a binary ONE. If the bit is a binary ZERO, the MLR output of flip-flop 1024 will not switch flip-flop 1034 to a ONE. Accordingly, a binary ONE or ZERO will be written into the addressed bit location in accordance with the state of flip-flop 1034. As the bits of a character are read out of memory, parity is computed in a conventional manner.

Where the bit to be written into the addressed bit location constitutes new information, such as that previously stored in the buffer register 1030, then MMWTC flip-flop 1034 will be set and reset by function RXMWS10 generated in accordance with the state of the "ONE" output of the first stage DB1 of register 1030. Upon the termination of the memory cycle, the bit counter 1042 is incremented by one and the above operation is repeated for the next bit of a character. When the bit counter 1042 reaches a count of 8 and 10, the decoder 1036 generates outputs B0810 and B1010 respectively. Depending upon the position of the Field/Normal mode switch, one of these outputs will reset flip-flop 1064 to a ZERO which forces function RXLMR00 to a ONE. The memory address register 1040 is now ready to accept the next RXINC10 signal for read out of the bit contents of the next memory location. Also, function RXLMR00 will in turn reset the bit counter 1042 stages to ZEROS by forcing RXBCR10 high and inhibit advance gate 1041 by forcing function RXBCA10 low.

Further memory cycles may be initiated until the last character (here the eightieth character) is written into the memory 1020. At that time an end of data (RXOD10) function comes high as described herein which causes function RXLOD10 to be forced high which in turn resets the stages of MAR 1040 to zeros.

I/O DCA Transfer control Logic

As shown in FIGS. Control f and *7g*, the memory and control section 570 transmits and receives respectively data characters to and from its associated device, as well as from lines OSB010Z through OSB080Z of the bus 150 via LTR and LRE bus interface circuits 512 and 510 respectively. Referring to FIG. *7g*, it will be noted generally that the I/O DCA is divided into two sections. One section (IDCA) labeled as block 590 handles transfers from its associated peripheral device to the memory 1020 and from memory 1020 to the bus 150 when the device is operated as an input device (here as a card reader). The other section (ODCA) labelled as block 600 handles transfers from the bus to memory 1020 and from memory 1020 to its peripheral device when it is operated as an output device (here as a card punch). It will be appreciated that in the case of either an input device or an output device only one section will be required.

I/O DCA Input Section

As shown in FIG. *7g*, the input logic block includes as part of the transfer path 1088, a pair of data registers 1108 and 1116 and a decoder 1110. The path 1088 transfers data applied to a read bus 1104 from the reader input device into the register 1030 of the memory section which thereafter transfers the data characters into memory 1020 and from memory to the bus 150.

Additionally, the input section includes a plurality of flip-flops which form a major portion of a read-command logic block 1100 which is operative to generate functions pertinent to the IDCA data transfer operation. Since many of these functions are generated by the reader input device in a conventional manner, these flip-flops are illustrated only in block form and their associated set and reset logic will be described only to the extent necessary using Boolean equations.

Transfer from Card Reader to Buffer Memory

In greater detail, a read-command (RXRCM10) is generated by a read command RXRCM flip-flop which sets to its ONE state in accordance with the equation: RXRCM10 = RXRDA10(RXROS10·RXDRD00·RXRCC00 +RXFSW00·IGISF10·IGEXC00·RXFSWIM). Considering only the first term, it will be noted that when the card reader device has a read order stored (RXROS10 = 1), the memory 1020 is not transferring data to the bus 150 (RXDRD00 = 1) and the reader device is ready to read a card (RXRDA10 = 1), the reader-command function RXRCM10 is forced to a ONE and then forwarded to the card reader.

A Read Order Stored (RXROS) flip-flop sets to a ONE in accordance with the equation: RXROS10= IGINP10·IGACT10. That is, this flip-flop switches to a ONE when either the DCA function switch or a device address code selects an input device (IGINP10 = 1) and the device is active (IGACT10=1). And, a read last character (RCC) flip-flop which forces function RXRCC00 to a ONE is reset by an initialize switch function (RXSTA30) or upon transfer of the last character to the data buffer 1030. As shown by FIG. *7b*, the logic AND gate 878 of block 870 forces function RXRDA10 to a ONE when the input device generates a signal indicating that it is ready to transfer data to its output bus (RXRDY10=1) and its input hopper is not empty (RXOFF00=1).

Upon receipt of function RXRCM10, the card reader starts moving the card whereupon it sends data and strobe pulses to the DCA memory 1020.

Before describing the above in greater detail, it will be noted that while a read-command (RXRCM10) function is generated when the device operates in an on-line or off-line mode, the function RXRCM10 may also be generated when the device in its idle state (i.e., function IGISF10=1). In the idle state, the operator may initiate a read-command to read a format card into memory 1020. This command will be generated by a read-field card RXFSW flip-flop when the FIELD/NORMAL switch on the DCA's control panel is placed to the FIELD position. Initially, RXFSW flip-flop is initially in its reset or ZERO state and generates function RXFSWOO which when ANDed with Field position function RXFSWIM, function RXRDA10, and start button function IGEXC00 switches the RXRCM flip-flop to its ONE state.

In the manner described herein, the characters of the format card are read into memory 1020 and bit positions 9 and 10 of each character locations are written as ONES or ZEROS. Thereafter, when the data characters are read from memory 1020 for transfer to the bus 150, only those characters, which have bit 10 set to a ONE are transferred to the bus 150. Hence, the coding established in memory 1020 by the format card arrangement provides an automatic editing function for subsequent cards. By contrast, when the FIELD/NORMAL function switch is in the normal position (i.e., RXFSWIM=0 and RXFSWOM=1), all characters will be transferred to the bus until a special character or out of media signal is generated by the input device.

In greater detail, when the card reader applies a data character to its read bus 1106, it generates a strobe function RXRST10 which conditions the Incrementing Logic 1060 of FIG. 7*f* to perform initializing and checking operations. That is, the leading edge of the strobe RXRST10 triggers a ONE shot circuit not shown which generates a 50 microsecond pulse after which time function RXDAT10 is forced to a ONE. Any necessary checking operations will be performed during the 50 microsecond interval. The function RXRST10 forces function RXBCA10 high which starts incrementing the memory bit counter 1042 through a fast count. During bit count 1 (RXBC10=1), function RXLOD10 is forced to a ONE and resets the stages of the MAR 1040 to all ZEROS. When the bit counter 1042 reaches a count of two (RXBC210=1), strobe function RXRST30 transfers the data character on the bus 1104 via transfer path 1106 into the twelve bit buffer register 1108.

From the register 1108, the data character is transferred via the decoder 1110, into the eight bit register 1116 when function RXDS010 comes high. The function RXDS010 comes high in accordance with the equation: RXDS010=RXDAT10·RXRS010. This means this function comes high after checking at which time function RXDAT10 is a ONE and when Read Strobe Stored RXRS0 flip-flop is in its ONE state (RXRS010=1). This flip-flop is switched to its ONE state by a first strobe that generates function RXRST10 and the flip-flop remains in its ONE state until the last character from the card is transferred into memory 1020. That is, function RXRS010=RXRST10 (RXROS10+RXFSWIM·IGISF10). When function RXDAT10 comes high, the bit counter 1042 is reset and is started again through its fast count to complete the transfer.

The decoder 110 is conventional in design and is operative to translate the twelve bit Hollerith coded character contents of the register 1108 into the seven bit USASC11 code. During the second fast count, an ANDing of functions RXDAT10 and RXB2C10, forces a transfer function IHSCL10 to a ONE. This function transfers the bit contents of the register 1116 into the Data Buffer Register 1030.

The register 1116 includes additional input gating permitting coded control characters to be inserted therein. For example, a character generator 1114, conventional in design, generates a record separator (RS) character code which is transferred to the register 1116 to designate when the card reader has reached the end of a card as described in greater detail herein.

At time RXBC310, function RXDAT10 causes function RXINC10 to come high which in turn switches flip-flop 1064 to a binary ONE. And, the bit counter 1042 is reset to ZERO. Additionally, function RXINC10 advances the MAR 1040 by one at which time the MAR now stores the address of the storage location into which the first character will be written. Function RXINC10 also causes the memory 1020 to cycle by switching Read Command flip-flop 1062 to its ONE state. That is, function RXLMR10 forced to a ONE by function RXINC10 which then switches flip-flop 1062 to a ONE which forces function MMRDC10 high.

The bit counter 1042 previously reset by RXBCR10, is enabled by RXLMR10 via function BCA10 to begin incrementing through a complete character count. During the read portion of a memory cycle, the bit content of one bit location is read out into the MLR register 1024 and during the write portion of the same cycle one of the bits of the reader character is shifted through stage IHDB01 of the buffer register 1030 and written into the addressed bit location via flip-flop 1034. That is, the DCA logic generates enable data buffer shift function IHSHF10 which causes the bits of the data character to be applied serially to the flip-flop 1034. The function IHSHF10 is generated during counts 1–8 in accordance with the equation: IHSHF10 = RXBCA00·RXLMR10·B0000·B0900·B1000. When a complete character has been written into the addressed memory location of memory 1020 as determined by the decoder 1036 decoding a bit count of either 8 or 10, flip-flop 1064 is reset to its ZERO state by the logic 1060 forcing function RXLRH10 to a ZERO. That is, function RXLRH10 goes low (i.e., RXLRH00=1) in accordance with the equation: RXLRH00=RXRS000·RXROS10 (RXFSWOM·RXB0810+RXFSWIM·RXB1010).

The above operation is repeated for each character read by the card reader each time it generates reader strobe function RXRST10. When the card reader transfers the data character read from the last column of the card to the bus 1104 and function RXDAT10 comes high, the last character is written into memory 1020. Thereafter, function RXINC10 goes low, and the decoder 1036 produces an output which generates function RXEOD10 indicating that a character has been written into eightieth memory location terminating the transfer. The above data transfer operation also terminates when a decoder 1111, conventional in design, connected to the register 1030 detects an ETX character which also causes function RXEOD10 to be generated by forcing function RXETX10 high. Each of the RXRS0 and RXRCM flip-flops are then reset to their ZERO states which in turn forces functions RXRS010 and RXRCM10 low. In particular, the RXRS0 and RXRCC flip-flops are reset to their ZERO states when the DCA receives an end of card (RXEOC10) signal from the reader device indicating the end of the card has been reached. This complete the reader to memory data transfer operation.

The function RXROC10 thereafter enables the bit counter 1042 to advance through a fast count via function RXBCA10. When the bit counter 1042 reaches a count of one (RXBC110=1), function RXEOC10 forces function RXLOD10 high which in turn clears the contents of the memory address register 1040 to ZEROS. When a bit count of three (RXBC310=1) is reached, the function RXEOC10 forces function RXINC10 to come high which increments the MAR by one which returns the MAR 1040 to the address of the first character location. Also, function RXEOC10 at time three forces the Bus Receive Data RXDRD flip-flop to a ONE. This flip-flop sets in accordance with the equation: RXDRD10=RXROS10·RXBC310·RXEOC10. This conditions the memory 1020 to begin immediately the memory to bus data transfer operation. That is, function RXINC10 switches flip-flip 1064 to a ONE whereafter the bits stored in the first character location are read into register 1030 via gate 1026.

TRANSFER FROM BUFFER MEMORY TO SYSTEM BUS

During subsequent memory cycles, the data bit contents of each of the memory locations are read out serially into the data buffer register 1030 and when a complete character is assembled therein it is then applied to the bus lines OSB01 through OSB08. In particular, as mentioned above, the bit counter 1042 first sequences through a fast count which sets the MAR to the address of the first character to be read out to the bus and sets the Read Command RXDRD flip-flop to its ONE state in preparation for the transfer operation.

Additionally, function RXINC10 sets flip-flop 1064 which generates RXLMR10 to start the bit counter 1042 to advance via RXBCA10 and then sets flip-flop 1062 to its ONE state which produces function MMRDC10. The function MMRDC10 conditions the MLR flip-flop 1024 to read out each of the bits of the first character into the data buffer register 1030. As mentioned, each bit read out into the MLR flip-flop 1024 is written back into the same bit location via flip-flop 1034. When a complete character has been read into the buffer register 1030 (i.e., the bit count is at a count of 8 or 10 wherein B0810 = 1 or B1010 = 1) the function RXDAR10 is forced to a ONE and causes function IFOTB1A to be forced to a ONE via the logic 900. The function IFOTB1A applies the character to the bus via transfer path 1082. Also, function RXDAR10 signals the devices connected to receive via the interface logic block 751 of FIG. 7*b* and line OSB180Z that a character has been applied to the bus 150.

As indicated previously, when the NORMAL/FIELD switch is in the normal position, a complete character will be assembled at a bit count of 8 (RXB0810=1), therefore, function RXDAR10 comes high as follows: RXFSWOM · RXB0810·RXLMR00.

However, when the switch is in the Field position, function RXDAR10 comes high as follows: RXDAR10=RXFSW1M·MMLR10 · RXLMR00·RXB1010. Accordingly, in the event that bit 10 of the character is not a ONE, (i.e., MMMLR10=0), the GDCA logic will not generate function RXDAR10 which will inhibit the generation of function IFDRL10. This in turn inhibits the generation of transfer function IFOTB10 preventing the character in the register 1030 from being applied to the bus 150. At the same time, IFDRL10 by being forced low prevents the generation of function IFID00 which normally signals the devices that a character has been applied to the bus 150. Thus, as mentioned, the coding of bit ten for each character memory location by the introduction of a format card into the memory 1020 provides for automatic editing of data characters.

The function RXDAR10 forces bit counter reset function RXBCR10 to a ONE which resets the bit counter 1042 to ZERO to condition it for processing the next character. At the same time, flip-flop 1024 will also be reset by function RXLRH10. In particular, the function RXLRH00=RXRS000·RXROS10 (RXFSWOM·RXB0810+RXFSW1M·RXB1010). And, when function RXLRH00 is a ONE, the logic block 1060 forces function RXLRH10 to a ZERO.

Normally, the contents of the DB buffer register 1030 will be applied to the bus lines until the GDCA logic generates a send next character (IGNEC10) function of block 910 of FIG. 7*c* in response to the scanner function IFCON00 applied via line OSB190Z. Although not shown it will be appreciated that logic equivalent to that of FIG. 7*e* may be placed in series with the inverter 916 to generate an appropriate width pulse.

When function IGNEC10 comes high, it together with functions RXDRD10 and RXLMR00 forces the Increment function RXINC10 to a ONE advancing the MAR to the next character location. That is during the memory to bus transfer, the logic 1060 forces function RXINC10 to a ONE in accordance with the equation RXINC10=RXDRD10·IGNEC10·RXLMR00. Also, RXINC10 will switch RXLMR flip-flop 1064 to its ONE state which initiates another memory cycle.

During the subsequent memory cycles, the data characters are sequentially read out of memory 1020 and applied to the bus 150. And, the MAR will be incremented by one by function RXINC10, for each character. When the eightieth data character location is addressed, the decoder 1036 causes the generation of function RXEOD10 via function RXB8010. Again, the function RXINC10 sets LMR flip-flop 1064 to a ONE which switches flip-flop 1062 to a ONE which enables the bits of the last data character to be read out serially from the memory 1020 into the register 1030. When function IGNEC10 comes high, indicating that all devices have taken the character, it forces IHSCL10 to a ONE which gates a record separator character (RS) into the DB buffer register 1030. The End of Data function (RXEOD10) produced by function B8010 denotes that the last character of a data record has been read from memory into the register 1030 and conditions the character generator 1114 to force the code configuration of an RS character into the register 1110 and then into the buffer register 1030 when function IHSCL10 is forced high by function IGNEC10. That is, the logic 1060 in the instance of an RS character forces function IHSCL10 to a ONE in accordance with the equation: IHSCL10=RXB8010·RXDRD10 · IGNEC10·RXLMR00. In this manner, the DCA logic automatically separates data records from each other by a RS character at the end of a data record. The functions IGNEC10 and together with function RXRSC10 derived from decoder 1111 upon detecting that a (RS) character has been transferred to the register 1110 switches last character RXRCC flip-flop to a ONE and RXDRD flip-flop to a ZERO. Alternatively, RXRCC and RXDRD flip-flops will also set to a ONE and a ZERO respectively when the decoder 1111 detects an ETX character. That is, the function RXRCC10=RXDRD00=RXRCB10 (RXETX10+RXRSC10) where RXRCB10 is a 25 microsecond pulse generated by a one shot circuit in accordance with the equation: RXDCB10=RXDRD10·IGNEO10·RXLMR00. The function RXRCC10 produced by RXRCC flip-flop forces function RXLOD10 high which resets the stages of the MAR to zero. The function RXRCB10 resets Bus Receive Data RXDRD flip-flop to its ZERO state. When the RS character is taken by all output devices, function IGNEC10 again comes high and resets RXRCC flip-flop to a binary ZERO.

When the input device is ready to read another card defined by function RXRDA10, RXRCM flip-flop will again set a ONE which signals the card reader to read the next card. That is, flip-flop RPRCM will set to a ONE in accordance with the equation RXRCM10=RXRDA10·RXDRD00·RXROS10·RXRCC00.

However, if the last card read was the last card in the hopper, then the card reader will generate an out of media function RXOFF10 (i.e., hopper empty) and this function will inhibit the generation of function RXRDA10 by the logic in block 870 of FIG. 7*b*. Thereafter, the release logic in the block 840 of FIG. 7*b* conditioned by function IHOOF10 will signal the release of the input device by generating release function REL00 via bus line OSB140Z in the manner previously described.

I/O DCA OUTPUT SECTION (ODCA)

As shown by FIG. 7*g*, the logic for the output section 600 of the DCA of FIG. 7 is organized similar to that of the Input Section (IDCA). That is, it includes two major transfer paths and a plurality of flip-flops which form the major part of the Write Command Logic 1200. As in the case of the Input Section, these flip-flops are shown in only in block form and their associated set and reset logic will describe only to the extent necessary using Boolean equations.

One of the paths designated as 1084 in FIG. 7*f* extends from the LRE interface circuits 510 of bus 150 to the memory 1020. Data characters from the memory 1020 are transferred along this path when a Read Data from Bus RXPRD flip-flop is set to its ONE state.

The other path designated as 1089 in FIG. 7*f* extends from memory 1020 to the output device (here the punch) and transfers data characters as described herein when a Punch Set Order RXPSO flip-flop is set to its ONE state.

The RXPRD flip-flop will be set in accordance with the Boolean equation: RXPRD10=RXPOS10·RPRDY00·RXEOM00. That is, when there is Punch Order Stored (RXPOS10=1), the punch device signals that it is ready to punch a card (RPRDY00=1) and an End of Message RXEOM flip-flop has not been switched to a ONE, (RXEOM00=1) RXPRD flip-flop sets to a ONE. The function RXPOS10 comes high when the function switch selects an output device which causes the output device IGOUT flip-flop to set to a ONE (IGOUT10=1) and the output device is active (IGACT10=1) (see blocks 960 and 730 of FIGS. 7*c* and 7*a* respectively). The RXPSO flip-flop sets in accordance with the equation: RXPSO10 = RXPOS10·RXPCM00·RXLMR00·RXPRD00. Initially, RXPCM flip-flop as the others, will be in its ZERO state, (e.g., reset by initialize function RXSTA10). Function RXPCM00 is taken from the reset or ZERO output of punch command RXPCM flip-flop which sets to a ONE only when the output device signals that it is ready to punch a card (RPPDY10=1 ) and the Punch set order flip-flop is set.

TRANSFER FROM THE BUS TO BUFFER MEMORY

Considering the first part of the data transfer, with reference to FIG. 7*g*, data characters applied to the bus 150 are applied to transfer path 1084 from the LRE receive interface circuit 510. Simultaneously therewith, function IFIDA10 comes high which generates the transfer function IHSTL10 by the logic in block 761 of FIG. 7*b*. Specifically, function IHSTL10 comes high when the device has signaled ready (RPRDY10=1), the Punch has an order stored (RXPOS10=1), function IGGST10 is high, and the character loaded from bus function RXCLD10 is a ZERO. Function RXCLD10 is initially a ZERO because the flip-flop producing it (not shown) will have been switched to its ZERO state by functions. RXSTA10, IGNEC10 or RXPRA10. That is, function RXCLD00=IGNEC10+RXSTA10+RXPRA10.

As concerns the cycling and incrementing of memory 1020, function RXINC10 will be generated in a fashion similar to that given above in connection with transferring data characters from memory to the bus 150. That is, preliminary to writing the first character, the bit counter 1042 will be enabled to sequence through a fast count which will force functions RXLOD10 and RXBCR10 to ones resetting the MAR 1040 to ZERO and the bit counter 1042 to ZERO respectively. The RXLMR flip-flop will have initially reset by an initialize function RXSTA10 which forces function RXLRH10 to a ZERO.

When the function IFIDA10 comes high, it forces function IGGST10 to a ONE. This function together with RXPRD10 will force function RXCLD10 to a ONE by switching its flip-flop to a ONE. The functions RXCLD10 and RXPRD10 together force function RXINC10 to a ONE when the decoder 1111 forces function RXASC00 to a ONE signaling that the character is a legal code. This will in turn set RXLMR flip-flop 1064 to a ONE and increment the MAR to the first location. This will cause the memory 1020 to begin writing the character into memory a bit at a time in addition to enabling the bit counter 1042 to advance via forcing function RXBCA10 to a ONE.

As mentioned, function RXLMR10 forces function MMRDC10 to a ONE by switching flip-flop 1062 to its ONE state which enables the bit content of the addressed bit location to be read out into the MMMLR1024. As shown by FIG. 7f, the function MMRDC10 enables flip-flop 1034 to write a new bit of information into the addressed bit location as the bit is shifted from the first stage IHDB1 of the register 1030 into the flip-flop 1062 via the AND gate 1032 which is enabled by function RXPRD10. The shift function IHSHF10, as mentioned, is forced high in accordance with the equation: IHSHF10=RXBCA00·RXLMR10·RXB000·RXB0900·RXB1000. This means the function IHSHF10 shifts the contents of register 1030 during bit counts 1 through 8.

When the bit counter 1042 reaches a count of eight, decoder 1036 produces function RXB0810 and this function together with function RXPOS10 forces function RXLRH10 low which resets RXLMR flip-flop 1024 to its ZERO state at the next PDA pulse. This in turn resets Read Command flip-flop 1062 to ZERO which discontinues the memory write operation. Also, the resetting of the RXLMR flip-flop causes function RXBXR10 to come high which resets the bit counter 1042 to ZERO.

However, before RXLMR flip-flop 1024 resets to ZERO, function RXLMR10 together with character loaded from bus function RXCLD10 forces a character taken function IHCTN10 high when a complete character has been written into memory 1020 (i.e., at a count of eight when RXB0810=1 or a count of ten when RXB1010=1. The function IHCTN10 defines the time when the character placed on the bus 150 has been stored in memory 1020. That is function IHCTN10=RXCLD10·RXLMR10 (RXFSWOM·RXB0810+RXFSW1M·RXB1010).

Before a next character is applied to the bus 150, the scanner causes function IGNEC10 to be forced high and this function resets or reinitializes those functions which generated function IHCTN10 (e.g., flip-flop RXCLD) allowing the memory 1020 to process a next character placed on the bus 150. Again, when the next character is applied to the bus 150, function IFIDA10 is also forced high which in turn forces RXCLD10 high. Function RXINC10 comes high and increments the MAR to the address of the next memory location and the character transferred to the register 1030 is written into the addressed memory location of memory 1020 as described above.

During subsequent memory cycles, the above process repeats for each character until an end of next character (RXETXL0), or an end of message character (RS) or the last memory location is addressed (Location 80). When any of the foregoing occurs, the function RXEOD10 comes high as soon as the character is written into memory 1020 (i.e., RXLMR00=1). That is, function RXEOD10=(RXETX10+RXRSC10) RXLMR00+RXB8010. The function RXEOD10 forces END of message flip-flop to a ONE which forces function RXEOM10 to a ONE. Also, the function RXLMR00 and RXCLD10 switch RXPRD flip-flop to its ZERO state completing the transfer operation.

TRANSFER FROM BUFFER MEMORY TO OUTPUT DEVICE

Upon the completion of the bus to memory transfer, the DCA memory 1020 is ready to read out data characters from memory 1020 along the second data path designated as path 1086, to the output device for printing. It will be noted that this transfer is similar to the transfer from memory to the bus to the extent that both transfer operations require the serial bits of data character to be first assembled in the register 1030 and thereafter transferred in parallel to the receiving unit. Instead of the memory timing being established by bus generated function (i.e., IGNEC10), here it will be established by strobe pulses generated by the punch output device.

A punch command set function RXPSA10 is generated in accordance with the equation: RXPSA10=RXPOS10·RXPRD00·RXPCM00·RXLMR00·RXEOD10. The function RXPSA10 in turn sets a punch order RXPS0 flip-flop to a ONE, clears the contents of the register 1030 via function IHDBR10 and the MAR via RXLOD10. The function RXPS010, generated by RXPS0 flip-flop, when ANDed with RXPCM00 forces function RXINC10 high which increments the MAR 1040 to a count of ONE. Thereafter, function RXPS010 together with device ready function RXRDY10 sets the punch command RXPCM flip-flop to a ONE. The punch command RXPCM flip-flop output RXRCM10 is forwarded to the punching device and it causes the device to initiate card movement which causes strobes to be forwarded to the DCA memory 1020. At the same time, the device forces the ready function RXRDY10 to a ZERO because the punch command RXPCM flip-flop is a ONE and that RXEOM resets flip-flop to its ZERO state.

Each of the punch strobe pulses PPPST00 fires a one shot circuit, not shown, that in turn generates a character time function RXPST10 which allows the bit counter 1041 of FIG. 7f to be advanced via function RXBCA10.

When function RXINC10 comes high, it sets RXLMR flip-flop 1064 to its ONE state and this begins the read out of the first character into memory 1020. Specifically, RXLMR flip-flop forces function MMRDC10 high enabling the read out of the bit of the addressed location and the advancing of bit counter via RXBCA10. The bit read out into the MLR flip-flop 1024 is shifted into the register 1030 via amplifier 1026 and at the same time is rewritten in the addressed bit location via flip-flop 1034. When a complete character has been assembled in the buffer register 1030 as defined by a count of 8, RXLMR10 flip-flop 1024 is reset to its ZERO state by the logic 1060 forcing function RXLRH10 low. That is, the ANDing of functions RXB0810 and RXPOS10 force function RXLRH10 low. The flip-flop 1064 when reset to a ZERO forces function RXBCR10 high which resets the stages of the bit counter 1042 to ZEROS.

In the manner previously described relative to the card reader to memory transfer, the arrival of each punch strobe pulse RXPST10 conditions the bit counter 1042 to first sequence through a fast count by enabling function RXBCA10 during this count. During this count, the assembled character is transferred to the output device and the counters are initialized for read out of the next character. Specifically, at a bit count of three (RXBC310=1), the transfer function RXPUS10 comes high in accordance with the equation RXPUS10=RXLMR00·BC310·RXPST10. This function transfers the contents of the DB register 1030 previously decoded by punch decoder 1206 into the data register 1108 whereafter it is transferred to the punch via path 1202.

The decoder 1026 codes the USASCII coded character applied from the data buffer register 1030 to its input into a 12 bit Hollerith code in a conventional manner and presents this code at its outputs RXAHR10 through RXAH910. Thereafter, function RXPUS10 and RXEOM00 force function RXINC10 high, which again advances the MAR 1040 by one. Also, function RXINC10 sets RXLMR flip-flop to a ONE. This permits the memory 1020 to read bits of the next character and the function RXBCA10 to advance the bit counter 1042. When the character is assembled in the buffer register 1108, RXLMR flip-flop 1024 is reset and the bit counter 1042 will again be reset.

Upon receipt of the next strobe RXPST10, the bit counter 1042 will again sequence through counts 0–3 and at bit time three, function RXPUS10 comes high and transfers the character decoded contents of the data buffer 1030 into the data register 1108 whereafter the character is forwarded to the punch. At the same time, function RXINC10 is again forced high by functions RXPUS10 and RXEOM00 incrementing the MAR by one which initiates another group of read/write memory cycles for assembling the next data character.

During subsequent memory cycles, the above operations are repeated and this continues until either an ETX or an EOM character is loaded into the DB register 1030 or until the MAR stores the address of 80th memory location. At this time, function RXEOD10 comes high, which in turn sets the End of Message RXEOM flip-flop to its ONE state. The flip-flop produces function RXEOM10 which forces function RXEOM00 low thereby inhibiting further incrementing of the MAR by functions RXPUS10 and RXEOM00.

Upon the receipt of a next strobe pulse RXPST10, the bit counter 1042 is sequenced through a fast count. When function RXPUS10 comes high at a time three, it together with function RXEOM10 sets a RXPRA flip-flop of the Write Command logic 1200 which forces function RXPRA10 to a ONE. The function RXPRA10 in turn conditions the Punch Set Order RXPS0 flip-flop and the Punch Command RXPCM flip-flop to be reset to their ZERO states upon the receipt of an acknowledgement signal (PRPCS10) from the punch device. Additionally, function RXPRA10 forces function RXLOD10 high which resets all of the MAR stages to ZERO.

After Punch Command flip-flop resets, it forces function RXPCM00 to a ONE which switches RXPRA flip-flop to a ZERO. When the output device signals that it is ready to punch another card, function RPRDY10 goes low which resets the RXEOM flip-flop to its ZERO state. When RXEOM10 goes low, caused by the resetting of RXEOM flip-flop, this causes the RXPRD flip-flop to set to its ONE state thereby permitting the DCA to begin another transfer of data characters from bus 150 into memory 1020.

DESCRIPTION OF OPERATION OF OVERALL SYSTEM

Figure 8:
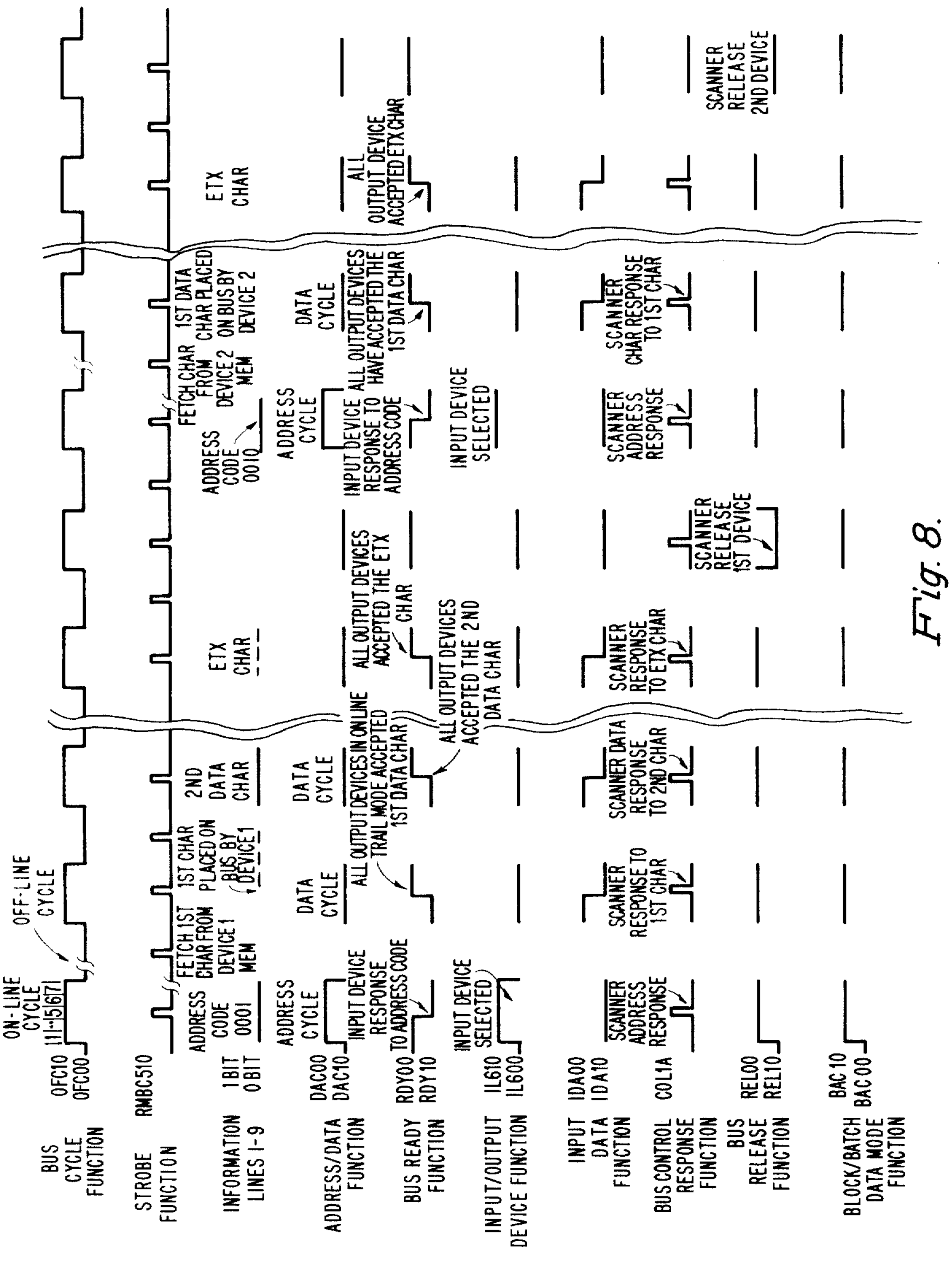
FIG. 8 is a timing diagram illustrating the block data mode of operation for on-line operation of the terminal system of FIG. 1.
Figure 9:
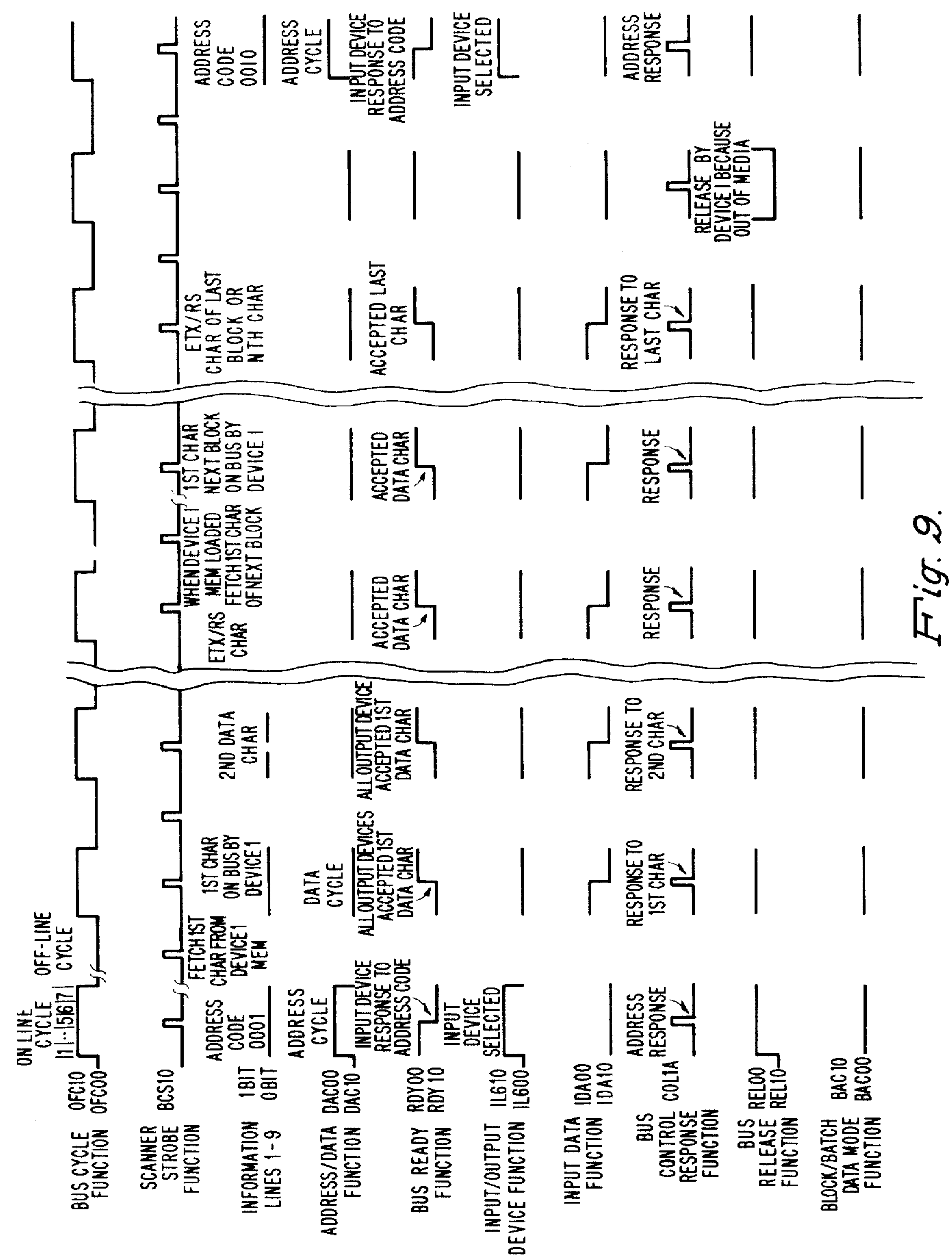
FIG. 9 is a timing diagram illustrating the batch data mode of operation for on-line operation of the terminal system of FIG. 1; and, FIG. 10 is a timing diagram illustrating the operating mode for off-line processing by the terminal system of FIG. 1.
Figure 10:
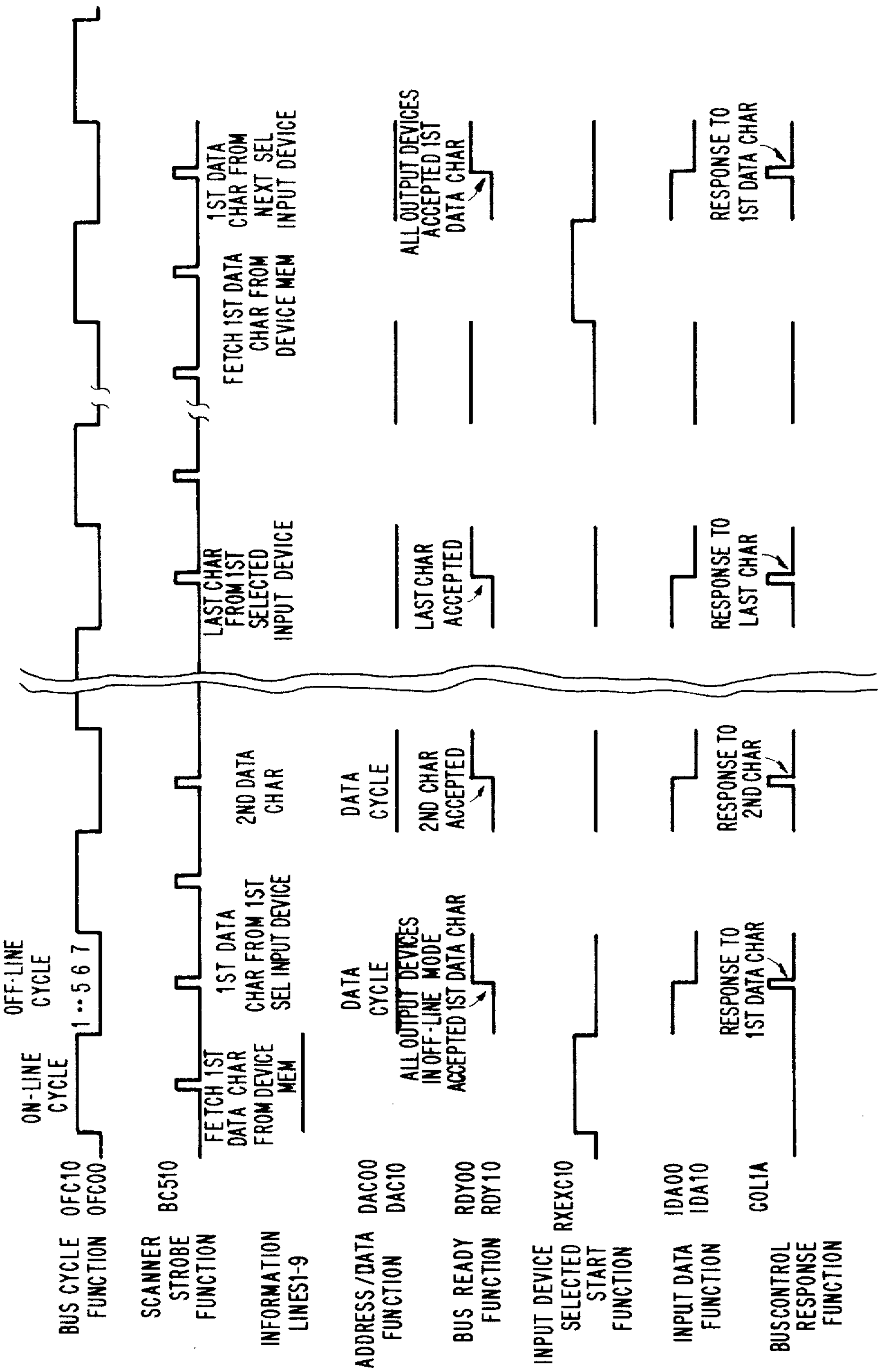

The operation of the system will be given with reference to FIG. 1 through 7 with particular reference being made to the timing diagrams of FIGS. 8, 9 and 10. FIGS. 8 and 9 illustrate the timing for at least two data operating modes, block and batch respectively, of the system of FIG. 1. FIG. 10 illustrates the timing for the data operating mode during off-line operation.

It is assumed that the operator has selected the block data mode and has depressed system initialize button which via function SMC00 resets the pertinent control flip-flops within the system to their ZERO states. The device scanner counter 214 is assumed to be set at a ZERO address code (i.e., lines SC1 - SC4 in FIG. 3 are all ZEROS). Additionally, it is assumed that the input device which is to transfer data is the card reader/punch device 140 of FIG. 1. And, the transfer is to take place while the system devices are operating in their on-line mode. Hence, the function switch on the control panel of the reader/punch DCA 166 will be set to the reader position and its mode switch set to the on-line position. Each of the output devices which is to print the data the input device applies to bus 150 will have its mode switch in the audit trail position.

The reader first sequences through its operational states until it enters the on-line mode. This is accomplished as follows. Referring to FIGS. 3 and 7a, it will be noted that the depression of the initialize button on the device scanner control panel generates function SMCOM which is received by the GDCA logic via line OSB160Z. This function forces function IFRST10 of FIG. 7a high which activates gate inverter 702 to force function ISFOR low, in turn forcing IFISFIR and IFISF2R high which activates AND gate 688 to force function IFISFX high. At stroke cycle time (IGSTB1C=1), function IFISFX sets idle state IGISF flip-flop 680 to its binary ONE state via AND gate 686.

The idle state is the first or initial state, that the IDCA enters. As mentioned previously, this state defines an inactive or idle mode for the device. An operator may prepare the device before it begins active data transfer operation while in this mode. For example, an operator may set the control panel NORMAL/FIELD switch of the reader/punch DCA to the FIELD position wherein a format card will be read into its buffer memory in the manner previously described. That is, when the start switch on the DCA panel has not been depressed and the DCA is in its idle state, function IGISF10 together with functions IGEXC00, RXFSW00, and RXFSWIM will switch the Read Command RXRCM flip-flop of FIG. 7g to its ONE state. The card reader upon receipt of the output RXRCM10 initiates movement of the format card which generates the data and strobe signals by which the Input section (FIG. 7g) of the DCA transfers the data characters into the DCA buffer memory 1020 (FIG. 7f). At the completion of the transfer operation, RXRCM flip-flop is reset to its ZERO state and the Read Field card RXFSW flip-flop is switched to its ONE state (FIG. 7g).

The DCA will then sequence to its next state which is the Ready state. This is established in accordance with the switching of Ready State IGRSF flip-flop 601 of FIG. 7a. Referring to FIG. 7a, it will be noted that there are several groups of inputs applied to the set input of this flip-flop. One is the group of inputs of AND gate 606 which are ANDed to generate function IFRSF1A. That is, when the device signals that it is ready to read another card (RXRDB10=1) derived from the logic in block 870 of FIG. 7b, a strobe pulse is present (IGSTB1C — FIG. 7e) and the mode switch is in the on-line position (IFONS1M=1), then function IFRSF1A comes high. Function IFRSF1A will be high when function IFRSF1E generated by AND gate 608 is high. This will set IGRSF flip-flop to its ONE state. It will be noted that function IFRSF1E comes high when the DCA is in its idle mode (IGISF10=1) and the start switch on the DCA control panel is depressed (IGEXC10=1).

When the DCA is in the ready state, it is now ready to transfer data. Referring to FIG. 8, it will be noted that the first DCA to receive its address code during first ON-LINE bus cycle is the device which has been assigned the address code 0001. When the IDCA decodes its address code, it will switch from the ready state to the on-line state.

In greater detail, during a first ON-LINE cycle, the address counter 214 of FIG. 3 will be incremented by one and the scanner 100 will place the card reader's address 0001 on bus line OSB010Z through OSB400Z and force line OSB60Z high. The card reader's address response logic in block 980 of FIG. 7d in response thereto, generates function IFADD1S and sets IFADD10 high which in turn forces address selection function IFADR10 high. Since the input function switch is set to select an input device (IFINPOA=1), the input device IGINP flip-flop in block 940 of FIG. 7*c* will have been set to a ONE during a previous OFF-LINE bus cycle when the IDCA was in its idle mode (IGISF10=1). Referring to FIG. 7*c*, it will be noted that function IFADD10 comes high when address decode function IFADDIS comes high during the address cycle (IFDAC00=1) of an ON-LINE bus cycle (IFOFC00=1). As shown by FIG. 9, the card reader GDCA logic of FIG. 7*b* upon decoding its address code and switching its address response IFARF10 flip-flop 982 to a ONE, is also operative to generate an address response by forcing the Ready function RDY00 low. Referring to the logic of block 780 of FIG. 7*b*, it will be noted that the GDCA responds to its device's address code when function IFBSR1A is forced high and when the DCA is to be switched to its ready state (IFRSF-1A=1) at a time IGSTBIC derived from strobe scanner generated function BC510 referenced as IFSTB00 in FIG. 7*e*.

Assuming that the input device is not busy, that is, the reader device is ready to transfer data (IFB-SY00=1) or high, there are still no check or error conditions present (IFCHH00 is high), the function IFADR10 together with function IFNSFIC activates AND gate 628 to force function IFNSF1X high. At strobe time (IGSTB1C is high), function IFNSF1A comes high which switches the on-line IGNSF flip-flop 620 to its ONE state upon receipt of a PDA pulse.

It will be noted that an input device by being able to force function IFBSY00 low is able to prevent other devices from transferring data characters on the bus 150. Accordingly, data transfer among devices is easily accomplished on a first come first serve basis.

As illustrated by FIG. 8, the device scanner 100 of FIG. 3 upon detecting a change in the state of a ready function RDY00 during the address cycle of an ON-LINE bus cycle will generate an address response pulse COLIA via line OSB060Z. That is, referring to FIG. 3*b*, when the card reader generates an address response by changing the state of Ready Function RDY00 during times BC510 through BC610, this activates AND gate 282 to force function RMRRS10 high in turn forcing ACT1A high which sets Active flip-flop 290 to a ONE. Accordingly, flip-flop 290 forces its output function RMACT10 high (binary ONE) indicating that the input device addressed is active. The function RMACT10 forces function RMIDB00 high. At the same time, function RMACT00 is forced low, which prevents further incrementing of the scanner counter 214 via AND gate 212.

The function RMIDB00 by being forced high removes the address contents from the bus 150. Also, function RMACT00 causes the scanner data cycle RMDAC flip-flop 300 to be switched to its ONE state by function RMRRS10 during the end of the ON-LINE bus cycle (i.e., time RMBC81C). The flip-flop 300 will switch to a ONE in turn generating function RMDAC10 which forces function DAC00 low as shown by FIG. 8. Additionally, the function RMRRS10 also causes the device scanner 100 to generate function RMCOLIA at time RMBC610 which when inverted by inverter gate 298 forces function IFCON00 low.

Referring to FIG. 7*c*, it will be noted that function IF-CON00 will in turn cause the DCA logic to generate function IGNEC10. In the manner described above, the memory section 7f, in response to the scanner 100 signal, will read out a first data character from memory 1020 during the OFF-LINE cycle and apply it to the bus lines IL1 through IL8 during the next ON-LINE bus cycle.

Referring to FIG. 7*b*, it will be noted that this character will be applied to the bus 150 when the logic of block 751 forces function IFIDB00 low. Simultaneously, therewith, function IFIDD00 is forced low by functions IFDRL10 and IGINP10. As mentioned, function IFDRL10 is forced high when a complete character is ready for transfer (IFDRD10=1) at the beginning of an ON-LINE data bus cycle. The Bus Input Functions IFIDB00 and IFIDD00 together force Input Data Line OSB180Z low signaling that the reader device has placed a character on the bus 150. This is illustrated in FIG. 9 by showing the function IDA00 in a high state at the beginning of the second ON-LINE cycle.

Each of the output devices will store the data character on the bus in its memory and upon so doing will respond by forcing the Ready Function RDY00 high on line OSB170Z. Specifically, each output device includes logic equivalent to that in block 761 of FIG. 7*b*, which will generate the transfer function IHSTL10 in response to function IFIDA10. This will transfer the data character on the bus into the output device's buffer register 1030. When the output device has written the character into its memory, it forces function IFDRFOC high, switching its device IFDRF10 flip-flop 920 to a ZERO (FIG. 7*c*). This in turn will deactivate AND gate 792 to force function IFDRL10 to a ZERO (FIG. 7*b*) which in turn forces the Ready function RDY00 applied to line OSB170Z to a high state.

As shown in FIG. 8, when all of the devices have accepted the character, the scanner 100 will detect a change of state in the Ready function RDY00 (i.e., from a low state to a high state). The scanner response logic of FIG. 3*b* will generate a character response pulse COL1A by again forcing function IFCON00 low.

Again the logic of FIG. 7*c*, in response to function IF-CON00 will generate function IGNEC10 which conditions the input device's memory 1020 to read out another data character into the bus 150. Additionally, the IHDRY10 and IFDRF flip-flops of both the operating input and output devices will be switched to their ZERO states by function IGNEC10 in preparation for processing the next data character. And, this will switch functions IDA00 and RDY00 to their low states.

The function IDA00 remains in its low state until the input device has transferred the second data character from its memory 1020 and placed it on the bus 150. At this time, the logic of block 761 of FIG. 7*b* will again force IFIDA10 high and the Ready function RDY00 of each device will also remain in a low state until each ODCA has accepted the data character placed on the bus by the card reader (i.e., written it into its memory).

It will be appreciated that while FIG. 8 shows all devices signaling acceptance of the first data character during the same cycle it was placed on the bus 150 that in fact several ON-LINE cycles may have elapsed before all devices signal acceptance. The exact time will depend on the memory cycle time of the memories.

Referring to FIG. 8, it will be noted that the input device will continue to transfer data characters until it reads out an ETX character from its memory 1020 and places it on the bus 150. As mentioned, it is assumed that the operator has selected the block data mode. Referring to FIG. 3*c*, this means that the scanner ETX character decoder 352 will be operative to switch the Normal Release Enable RMETX flip-flop 380 to its ONE state when it decodes the ETX character. And, in the manner mentioned, the scanner 100 will generate a response via function COL1A upon detecting a change of state in Ready function RDY00. And, this will again change the state of function IDA00 and RDY00 for processing a next character.

During the next ON-LINE cycle, the scanner release logic will force the Release function IFREL00 from a high to low state as shown in FIG. 8. And, in addition to resetting ETX flip-flop 380 to its ZERO state, the function RMREL00 will force function RMACTOA high and reset Active flip-flop 290 of FIG. *3b* to its ZERO state. When reset RMACT flip-flop 290 will force function RMACT00 high which will reset data cycle flip-flop 300 to its ZERO state. At the same time, function RMACT00 will reset scanner RMRLL flip-flop 392 of FIG. *3c* to its ZERO state and more importantly, function RMACT00 will allow the scanner counter 214 to be incremented by one to the address of the next input device.

When the input device detects the change of state in release function REL00 via line OSB1S0Z, it will active inverter gate 731 to force active function IGACT10 of activate inverter 7a low. Specifically, the Release logic of FIG. 7b, in response to function IFREL10 being forced high and will set Normal Release Memory IFNRM flip-flop 806 to a ONE at strobe time (IGSTB3C=1) during the ON-LINE bus cycle (IGOFC00=1) This in turn will force function IFNCR10 high which in turn forces function IGACT10 low. This function will permit the Read order stored RXROS flip-flop to be reset which inhibits further transfers of data characters from memory to the Register 1030 by inhibiting RXDRD flip-flop from being switched to a ONE.

Additionally, function 1FNRM10 will force function IFFSF10 high and switch the IDCA ready state IGRSF flip-flop 601 of FIG. *7a* to its ONE state. This places the DCA in the ready state until it again detects its address code on the bus at which time it will again switch to the on-line mode. The above assumes that there were no check or error conditions such as the card hopper being empty.

Upon having sequenced to the next address code, the scanner 100 will now place the address code 0010 on the bus via interface circuits enabled by forcing function IDB00 high which also will force bit 6 to a ONE.

As illustrated by FIG. 8, the above operation will be repeated. That is, the addressed input device will first generate a response to its address code. Also, the input device switches from the ready state to the on-line state (i.e., IGRSF flip-flop 601 to a ZERO and sets IGNSF flip-flop 620 to a ONE and thereafter begins transferring data characters onto the bus).

While the system is operating in the block data mode, the above transfers continue wherein each input device transfers a block or segment of information onto the bus under the control of the scanner device 100. The transfer operation continues until all of the devices have transferred a block of data.

In addition to operating in a data transaction mode, the operator may select a batch data mode of operation. When this mode is selected, as FIG. *3c* illustrates, function BAC00 will go low. The timing diagram for this mode is illustrated in FIG. 9.

Referring to the FIG. 9, it will be noted that the functions generated by the scanner and input device are the same as those generated for the mode previously described. However, there is one important difference. The scanner 100 as shown does not complete its transfer operation with the first input device until that device has exhausted all of its media. In this example, the scanner 100 will not address the second device until the card reader has transferred data from all of its cards at which time it will generate Out of Media signal.

As previously described, the logic equivalent to that in block 870 of FIG. *7b* is operative to generate Out of Media function IHOOF10. As shown in FIG. *7b*, this function causes IGRLF flip-flop 846 of block 840 to set to its ONE state which in turn forces the Release Bus line OSB140Z low.

As shown in block 800 of the same Figure, the function IFREL00 being forced low causes IFREL10 to come high and set IFNRM flip-flop 806 to a ONE which in turn forces function IFNCM10 and IFNCR10 high. The function IFNCR10 forces function IGACT10 low. This function together with out of media function IHOOF10 will activate the AND gate 856 of block 840 to force check function IGHCHH10. Since the input device was up to this time in its on-line mode (IGNSF10), the combination of functions IGNSF10, IGCHH10 and IFFSF10 sets the device's idle state IGISF flip-flop 680 of FIG. *7a* to its ONE state. This places the input device in an inactive state until the operator remedies the out of media condition.

The scanner 100 in response to the device's release response will reset its active flip-flop 290 to a zero which will enable the scanner 100 to increment its counter by one and reset its data cycle DCA flip-flop 300 to its ZERO state. At that time, function DAC00 is forced low and the devices are now conditioned for receiving the next device address code placed on the bus.

It will be noted that during this operation also each of the output devices which have been switched to their audit trail mode (i.e., IGASF flip-flop 680 is set to a ONE) will print out or punch each of the data characters applied to the bus during this transfer operation. Specifically, each of the output devices in response to function IDA00 being forced high will generate the transfer function IHSTL10 by logic equivalent to that shown in block 761 of FIG. *7b*. This function causes the transfer of the data character applied to the bus 150 into the device's memory 1020. After the output device has completed writing the character into its memory 1020, it will generate a ready response by forcing line OSB170Z high through output device logic equivalent to that in block 780 in FIG. *7b*.

The foregoing describes the manner in which the system can process transfers employing at least two different data modes. While the system is engaged in on-line processing in either of the above two modes, the system may concurrently process transfers during off-line cycles. FIG. 10 illustrates the timing for off-line processing. It will be noted that still many of the same functions are generated for this operation. Again, the scanner 100 establishes the basic timing for the system by generating functions RMOFC10 and RMBC510.

As assumed previously, the card reader will be the input device selected. Since it will operate off-line, its mode switch will be set to the off-line position. Each of the output devices which is to print the input device data will have its mode switch also set to the off-line position.

Initially, the operator will depress the start button on the control panel of each of the devices which are to be operated. When this happens, function IGEXC10 comes high and switches the IDCA or ODCA from its idle mode to its off-line mode. In particular, referring to FIG. 7*a*, it will be noted that when function IGEXC10 comes high and the device has its idle state flip-flop 680 set to a ONE (IGISF10=1), function IFFSF1E is forced high. Since the mode switch is in the off-line position, when the reader signals that it is ready (function RXRDB10=1 — FIG. 7*c*), function IFFSF1A comes high at strobe time (IGSTB3C). Accordingly, IGFSF flip-flop 640 switches to a ONE at the next PDA clock pulse.

When the IDCA memory 1020 has read out the first data character from its memory during a previous ON-LINE cycle and transferred to the bus 150, it Thereafter, the operator may select another input device to transmit data. It will function IDA00 high via the logic block 751 of FIG. 7*b*. within when all of the output increase have transferred the first data character into their memories, they will cause the ready function RDY00 to change its state as shown in FIG. 10. Now, the scanner device logic of FIG. 3*b* will generate response function COL1A in the manner described previously. This function will force function IFCON00 low and cause the IDCA and the ODCA's to generate function IGNEC10 by logic equivalent to that in block 910 of FIG. 7*c*. And, this function will condition the devices for the next character transfer.

When the reader has the last card into memory 1020 and the data from that card has been transferred to the bus 150, this will complete the transfer. It will be obvious that the data modes used for on-line operation could be included witin the off-line operations with an increse in modifications to the scanner device logic. Since off-line operations presuppose the presence of an operator, this usually eliminates the need for such facilities.

Now there has been described a terminal system which is capable of being operated in at lease two operator selectable data modes. In one mode, the position of a special control character determines the size of the data unit to be transferred by an input device before the next input device is permitted to transfer data. In another mode, the device is permitted to transfer all the data it has until it signals that it is out of media. At this time, a next device is permitted to transfer data.

Also, the system provides for both on-line and off-line operations to be accommodated concurrently by assigning a predetermined portion of a bus operating cycle to these two types of operations. Additionally, each of the devices has similar buffer memory and interface logic termed GDCA which make the system modular in design. Moreover, each of the IDCA's and ODCA's include logic which establish a number of different operator selectable operating modes for their respective devices. Some of these modes permit the aforementioned on-line and off-line operations. Other modes can be used for initially preparing a device for either on-line or off-line operations. And, some modes can be used for monitoring on-line operations.

It will also be noted that the transfers between the device and its buffer memory are asychronous and timed by the device. Also the transfers between the buffer memory and the system bus are also asychronous in that they are also timed by the scanner device. This arrangement enables the attachment of different classes of devices which operate at various speeds to the system without modifying the system. Furthermore, in this regard, the system can accommodate a variety of transfer rates by selecting different operating cycle periods by the frequency divider arrangement of the scanner previously mentioned.

To prevent undue burdening the description with matter within the ken of those skilled in the art, a block diagram has been followed, with a detailed functional description of each block and specific identification of the circuitry it represents. The individual engineer is free to select elements and components such as flip-flop circuits, shift register, etc. from his own background or from available standard references such as "Arithmetic Operations in Digital Computers" by R.K. Richards (Van Nostrand Publishing Company, Copyright, 1955), "Computer Design Fundamentals" by Chu (McGraw-Hill Book Company, Inc., Copyright, 1962), and "Pulse, Digital and Switching Waveforms" by Millman and Taub (McGraw-Hill Book Company, Inc., Copyright, 1965).

While in accordance with the provisions and statutes there has been illustrated and described the best form of the invention known, certain changes may be made in the system described without departing from the spirit of the invention as set forth in the appended claims and that in some cases, certain features of the invention may be used to advantage with out a corresponding use of other features.

Having described the invention, what is claimed as new and novel and for which it is desired to secure Letters Patent is:

1. A data processing terminal system comprising:

a bus;

a plurality of peripheral devices;

a plurality of addressable device control means, each of said device control means being coupled to said bus and to at least one of said plurality of devices for enabling the transfer of data characters between said one device and said bus;

a device scanning means, said device scanning means being coupled to said bus and including addressing means for generating sequentially a plurality of address codes for addressing each one of said plurality of addressable device control means for activating a corresponding ones of said plurality of peripheral devices ready to transfer data; and, mode selection means coupled to said device scanning means and being operative when placed in a first state to selectively condition said device scanning means to operate said system in a first data transfer mode wherein said scanning means only in response to signals from said bus indicating that a first one of said devices activated by the addressable control means associated therewith to transfer data has completed a transfer of a portion of the data constituting the entire data supply generates signals on said bus for logically disconnecting said addressable control means of said first one of said devices from said bus releasing said device and said addressing means being operative to initiate again generating address codes for activating a next device ready to transfer data in response to said signals and said mode selection means being operative when placed in a second state to condition said scanning means to operate said system in a second transfer mode during which said device scanning means generates signals for initiating again the generating of said address codes by said addressing means only in response to signals applied to said bus by said activated device signaling that it has completed the transfer of said entire data supply.

2. A data processing system comprising:

a bus;

a plurality of input devices and output devices;

a plurality of addressable device controllers, each of said controllers being coupled to said bus and to at least a different one of said devices for conditioning said one device for a data transfer operation; and, a device scanning means, said device scanning means being connected to said bus and including: addressing means for generating a sequence of address codes to be applied to said bus for initiating said data transfer operation; control means coupled to said addressing means and to said bus; and, manually operable mode selection means coupled to said control means, said mode selection means when placed in a first state conditioning said scanning means to operate in a first mode wherein said scanning addressing means generates address codes in sequence activating each of the devices previously conditioned by said corresponding device controllers to transfer data, said control means being operative in said first mode to condition said addressing means to initiate again generating said address codes only in response to signals from said bus indicating that the device transferring data has transferred a portion of the data constituting the entire data supply of said device and said mode selection means when placed in a second state conditioning said scanning means to operate in a second mode, said control means being operative in said second mode to condition said device scanning addressing means to initiate again generating said addess codes address in response to signals applied to said bus by said device transferring data indicating that it has transferred said entire data supply.

3. The system of claim 2 wherein said bus includes a plurality of data and control lines and wherein said device scanning control means and said controllers each includes means being coupled to a predetermined one of said lines, each said means being operative for releasing an activated device prior to said addressing means initiating again the generating of address codes by applying signals along said predetermined one of said control lines.

4. The system of claim 2 wherein said device scanning means includes timing means for generating signal levels defining alternatively occurring ON-LINE and OFF-LINE bus cycle intervals; each of said device controllers including state selection means for selecting one of a plurality of different operational states for the device associated therewith, and said timing means conditioning said state selection means to enable the transfer of data characters between said bus and said associated device during either said ON-LINE or OFF-LINE bus cycle intervals in accordance with operational state selected for said device.

5. The system of claim 2 wherein each of said device controllers includes a device control means and memory storage means coupled to said bus, said memory storage means of each of said device controllers being coupled to one of said peripheral devices and including a plurality of memory character storage locations sufficient in number for storing all of the data characters of at least a record, said device control means of each of said device controllers being coupled to the device controller memory storage means and including state selection means for selecting one of a plurality of operational states for said one device, and one of said device controllers further including format selection means coupled to said device control state selection means for enabling said memory storage means of said one of said device controllers to read format characters constituting a first record from said one device into said memory storage means only when said state selection means is in a predetermined one of said operational states and said state selection means upon being switched to another predetermined state being operative to condition said memory storage means to transfer selectively to said bus data characters of a next record subsequently transferred to said memory storage means by said device in accordance with the coding of said format characters prestored in said memory storage means.

6. The system of claim 5 wherein said one of said device controllers further includes character generation means and sensing means coupled to said memory storage means, said character generation means being coupled to said sensing means and said sensing means in the absence of detecting a character having a predetermined bit pattern during the transfer of a predetermined number of data characters by said memory storage means to said bus being operative to condition said generation means to transfer a character having a said predetermined bit pattern to said bus after said predetermined number of data characters have been transferred so that said character having said predetermined bit pattern spaces said predetermined number of data characters from data characters subsequently transferred.

7. The system of claim 5 wherein said bus includes a plurality of data and control lines, said device scanning control means including control response means; and each of said device control means of each of said output devices further including control response means coupled in common to a first one of said control lines, said control response means of each of said output devices being conditioned by said memory storage means to generate a predetermined change of state in a signal level to be applied to said first one of control lines when said memory means has stored a bit representation of a character applied by an input device to said data lines of said bus, and said control response means of said scanning control means being operative to generate a control response signal only in response to a resultant change of state in said first control line indicating that all of the active ones of said output devices have taken said character applied to said data lines.

8. The system of claim 7 wherein each of said device control means of each of said input devices includes input data control means coupled to said memory storage means and to a second control line, said input data control means of each of said input devices being conditioned to apply a predetermined signal level to said signal level to said second line signaling each time said memory storage means associated therewith applies a data character to said bus.

9. A terminal system comprising:

a data and control bus;

a plurality of addressable device control elements, each of said elements being coupled to said bus;

a corresponding number of input and output devices, each device being interconnected through a different one of said device control elements for transferring data characters between the device and said bus; and, a device control scanning means, said device scanning means including: address generating means coupled to said bus for applying different address codes to said bus for addressing each of said device control elements of corresponding ones of said input devices; a plurality of sensing means coupled to said address generating means and to said bus; and, mode selection means coupled to one of said sensing means, said mode selection means when placed in a first mode being operative to condition said one of said sensing means to enable said address means to address the device control element of a different device only when an input device of a previously addressed device control element transferring data characters signals completing the transfer of all of the data characters constituting of a portion of the entire supply of data to be transferred by said input device by applying a character having a predetermined bit pattern to said bus; and said mode selection means when placed in a second mode being operative to disable said one sensing means from sensing said character, said address means being enabled by another one of said sensing means to address said device control element of said different device only when said input device signals of completing a transfer of all of the data characters constituting said entire supply of data by applying a predetermined signal level to said bus.

10. The system of claim 9 wherein said device scanning means further includes timing means coupled to said bus for generating signal levels defining alternatively occurring ON-LINE and OFF-LINE bus cycle intervals; each of said device control elements including state selection means for selecting one of a plurality of operational states for said device associated therewith and said timing signal levels conditioning said state selection means to enable the transfer of data characters between said bus and said device during either said ON-LINE or OFF-LINE bus cycle intervals in accordance with the operational state selected for said device.

11. The system of claim 9 wherein each of said device control elements includes a device control means and memory storage means coupled to said bus, said memory storage means of each of said device control elements being coupled to one of said input and output devices and including a plurality of memory character storage locations for storing at least a record of data characters; said device control means of each of said device control elements being coupled to said memory storage means and including state selection means for selecting one of a plurality of operational states for said one device, and one of said device control elements further including format selection means coupled to said device control state selection means for enabling said memory storage means of said one of said device control elements to read format characters of a first record from said one device into said memory storage means only when said state selection means is in a predetermined one of said operational states and said state selection means upon being switched to another predetermined state being operative to enable said memory storage means to transfer selectively to said bus characters of a next record subsequently transferred to said memory storage means by said device in accordance with the coding of said format characters prestored in said memory storage means.

12. The system of claim 11 wherein said one of said device control elements further includes character generation means and sensing means coupled to said memory storage means, said character generating means being coupled to said sensing means and said sensing means in the absence of detecting a character having a predetermined bit pattern during a transfer of a predetermined number of data characters by said memory storage means to said bus being operative to condition said generation means to transfer a character having a different predetermined bit pattern to said bus when said predetermined number of data characters constituting a record have been transferred so that said character having said different predetermined bit pattern spaces said record from a succeeding record of data characters.

13. The system of claim 12 wherein said bus includes a plurality of control and data lines and each of said device control elements of each of said input devices includes input data control means coupled to said memory storage means and to a predetermined one of said control lines, said input data control means being operative to apply a predetermined signal level to said predetermined one of said control lines each time said memory storage means applies a data character to said bus.

14. A data processing terminal system coupled to communicate with a remote processing system, said terminal system comprising a central device controller;

a common bus for transferring information;

a plurality of input and output peripheral devices;

a plurality of device controllers, each controller being coupled to said bus and to at least one of said peripheral devices for enabling the transfer of data characters between said one device and said bus; each device controller including mode control selection means for selecting one of a plurality of operational states for said device; and, said central device controller being coupled to said bus and including cyclic timing means for generating timing signals on said bus establishing timing intervals defining alternately occurring intervals of time when on-line character transfers between said remote processing system and selected ones of said peripheral devices and off-line character transfers between other ones of said input and output devices are effected, each of said device controllers further including transfer control means coupled to said mode selection means associated therewith, said transfer control means of each of said peripheral devices selected to engage in said on-line and off-line transfers being operative in response to said timing signals to enable selectively either said on-line transfers or said off-line transfers during said alternately occurring intervals of time in accordance with the state selected by said associated mode selection means so that said terminal system performs both on-line and off-line operations simultaneously.

15. The system of claim 14 wherein each of said device controllers includes a device control means and memory storage means coupled to said bus, said memory storage means of each of said device controllers being coupled to a different one of said peripheral devices and including a plurality of memory character storage locations for storing at least a record of data characters; said device control means of each of said device controllers being coupled to said memory storage means and including state selection means for selecting one of a plurality of operational states for said device, and at least one of said device controllers including format selection means coupled to said device control means for enabling said memory storage means to read format characters constituting a first record from said device into said memory storage means only when said state selection means is in a predetermined one of said operational states and said state selection means upon being switched to another predetermined state being operative to condition said memory storage means to transfer selectively to said bus characters of a next record subsequently transferred to said memory storage means by said device in accordance with the coding of said format characters prestored in said memory storage means.

16. The system of claim 15 wherein said one of said device controllers further includes character generation means and sensing means coupled to said memory storage means, said character generation means being coupled to said sensing means and said sensing means in the absence of detecting a character having a predetermined bit pattern during the transfer of a predetermined number of data characters by said memory storage means to said bus being operative to condition said generation means to transfer a character having said predetermined bit pattern to said bus after said predetermined number of data characters have been transferred so that said character having said predetermined bit pattern spaces said predetermined number of data characters constituting a record from a next record.

17. The system of claim 15 wherein said bus includes a plurality of data and control lines; said central device controller further including control response means and each of said device control means of each of said output devices further including control response means coupled in common to a first one of said control lines, said control response means of each of said output devices being conditioned by said memory storage means to generate a predetermined change of state in a signal level to be applied to said first one of said control lines when said said memory means has stored a bit representation of a character applied by an input device to said data lines of said bus and said central device controller control response means being operative to generate a control response signal only in response to a resultant, change of state in said first control line indicating that all of the active ones of said output devices have taken said character applied to said bus.

18. A remote terminal system comprising:

a multiline bus;

a plurality of input and output devices;

a device scanner, said device scanner being coupled to said bus and including; address generating means for generating a sequence of device address codes to be applied to said lines for addressing said plurality of input and output devices, mode selection means when placed in first and second states respectively being operative to enable said terminal system to operate in a first mode wherein each addressed input device transfers one block of data characters and in a second mode wherein each addressed input device transfers all of the data characters it has assembled, address control and response means being coupled to said bus and to said mode selection means, said address control and response means including first means coupled to a first one of said bus lines, said first means being operative to generate a predetermined signal level to a first one of said bus lines signaling that a device address code is being applied to said bus and release control means coupled to said bus and to said address control and response means for applying a predetermined signal level to said bus signaling the termination of a data transfer operation;

a plurality of addressable device control means corresponding in number to the number of said plurality of input and output devices, each of said control means being coupled to said bus and to a different one of said devices for enabling the transfer of data characters between said one device and said bus, each of said device control means including;

state selection means for selecting one of a plurality of operating states for said one device, memory storage means coupled to said bus and said one device, said memory storage means including a plurality of memory character storage locations sufficient in number for storing at least a block of data characters for said one device, a general device control means, said general device control means including state selection storage means coupled to said state selection means for storing indications defining each of said plurality of operational states, addressing decoding means coupled to said bus, said address decoding means being operative to decode a predetermined address code assigned to the device associated therewith, and control response means coupled to said bus and to said address decoding means, said control response means being operative to apply a predetermined signal level to a second line of said bus indicating when said one device is ready to transfer data characters between said memory storage means and said bus;

said address decoding means of a device ready to transfer data characters when conditioned by said predetermined signal applied to said first one of said lines being operative to generate an output signal level upon detecting an assigned device address code identifying its respective device, said control response means being conditioned by said output signal level to apply said predetermined level to said second line and conditioning said state selection storage means to switch to a predetermined one of said plurality of operational states; and, said scanner address control and response means including second means coupled to said second line and to said first means, said second means being operative in response to each application of said predetermined signal level to said second line to condition said first means to switch said first line from said predetermined signal level to a different state removing said address code from said bus, said scanner mode selection means including means operative when said selection means is in said first state for conditioning said first means of said address control and response means to maintain said first line in said different state until the device control means of said one device applies a character having a predetermined bit pattern to said bus indicating the end of a transfer of a block of characters and said means of said scanner mode selection means being operative when said selection means is in said second state for conditioning said first means of said address control and response means to maintain said first line in said different state until said device control means of said one device generates a release signal on a third line of said bus in response to an end of media signal from said one device indicating the end of a rransfer of all of the device characters, said first means of said scanner address control and response means further including means operative in response to said character having said predetermined bit pattern to condition said release control means to generate said release signal in said first mode and said address control and response means including second means coupled to said third line and to said first means, said second means being operative in response to said release signal to switch said first line to said predetermined signal level thereby applying the address code assigned to a next input device to said bus.

19. The system of claim 18 wherein said state selection storage means includes means operative in response to said scanner release signal level to switch said state selection storage means from said predetermined one of said plurality of operational states to an intermediate state, said state selection storage means being conditioned by said control response means to again switch to said predetermined one of said plurality of operational states in response to said assigned device address code

20. The system of claim 18 wherein said state selection storage means further includes means coupled to said device, said means being operative in response to an out of media signal from the device associated therewith to switch said state selection storage means from said predetermined one of said plurality of operational state to an inactive one of said operational states.

21. The system of claim 20 wherein said intermediate state is identified as a ready state, said inactive one of said operational states is identified as an idle state and said predetermined one of said plurality of operational states is identified as an ON-LINE state.

22. The system of claim 18 wherein said device scanner further includes timing means coupled to said bus for applying to a bus line levels defining successively occuring ON-LINE and OFF-LINE bus cycles for enabling simultaneous ON-LINE and OFF-LINE data transfer operations and each of said device control means being conditioned by said ON-LINE and OFF-LINE bus signal levels and signals from said state selection storage means to enable the transfer of data characters between said memory storage means and said bus only during those cycles selected by said state selection means.

23. The system of claim 22 wherein said device scanner further includes means for selecting different durations of said time intervals of said ON-LINE and OFF-LINE bus cycles.

24. The system of claim 22 wherein said device scanner timing means includes means coupled to another one of said bus lines, said means being operative to generate and apply a timing strobe signal level to said another one of bus lines for defining the interval during which signal levels applied to said bus are to be sampled and each of said general device control means further including timing means coupled to said another one of said bus lines operative in response to said timing strobe signal level for processing internal transfers within the device control means associated therewith.

25. The system of claim 18 wherein said address generating means includes a counter coupled to said address control and response means, said counter being operative to be continuously incremented for generating said sequence of device address codes, said address control and response means inhibiting said counter in response to said predetermined signal level being applied to said second line by the control response means of an addressed input device indicating that its address decoding means has decoded the device assigned address code.

26. The system of claim 18 wherein said scanner control and response means further includes control generating means for generating a control pulse to be applied to another line of said bus in response to a predetermined change of state in the signal level applied to said second line indicating that all of the device control means of each of the output devices whose selection storage means have been switched to an active state have accepted the data character applied to said bus by an input device, the general device control means of said input device including means operative in response to said scanner control pulse to condition the memory storage means of said input device for transfer of a next data character to said bus and said general device control means of each of said output devices including means operative in response to said control pulse to condition said control response means to switch the state of said level applied to said second line enabling the processing of said next data character.

27. The system of claim 26 wherein the general device control means of each of said device control means of said input devices includes input data control means coupled to a predetermined line of said bus and said memory storage means of each of said device control means further including memory addressing means for addressing said storage locations within said memory storage means and an output register means coupled to said memory storage means and to said bus, said memory addressing means being coupled to said input data control means, said memory storage means being operative in response to said scanner control pulse to address a next storage location and said input data control means being operative in response to said scanner control pulse to apply a predetermined signal level to said predetermined line upon the read out of a complete data character into said output register signaling the application of a next data character to said bus.

28. The system of claim 26 wherein said general device control means of each device control means coupled to an input and to an output device further includes mode control means for selecting either of said devices and function control selection means coupled to said address decoding means for selectively conditioning address decoding means so as to activate said state storage means of said respective device control means in accordance with a setting of said mode control means.

29. The system of claim 28 wherein said function control selection means includes switch means for selecting remote activation and local activation of said device control means coupled to said input and output device to operate as either said input or said output device.

30. The system of claim 29 wherein selection by said function control means is made only when said general device control means is in another one of said plurality of states corresponding to an idle state.

31. The system of claim 29, wherein said remote activation takes place only when said state selection storage means is in a ready, on-line, or audit trail state.

32. The system of claim 31 wherein said state selection storage means includes a predetermined number of bistable storage devices for defining said plurality of operational states, said bistable storage devices being interconnected so that only one bistable device is switched to a binary ONE between the time occurrence of said timing strobe signal levels during either said ON-LINE or OFF-LINE bus cycles.

33. The system of claim 18 wherein each of said device control means further includes device transfer and control logic means coupled to said memory storage means and to the device associated therewith, said device including means for applying strobe signals to said control logic means, said device control logic means being operative to condition said memory storage means to initiate an asynchronous transfer of data characters between said device and said memory storage means in accordance with said strobe signals.

34. The system of claim 18 wherein at least one of said device control means further includes format selection means for conditioning said memory storage means when said state selection storage means is in a predetermined state to enable a transfer format character codes of a first record from said device into said memory storage locations for coding said memory storage means, said memory storage means being operative to transfer to said bus characters of other blocks of data characters subsequently read into said memory storage means only when a predetermined bit position of said character storage locations storing said format character codes is coded in a predetermined manner.

* * * * *

UNITED STATES PATENT OFFICE
CERTIFICATE OF CORRECTION

Patent No. 3,771,135 Dated November 6, 1973

Inventor(s) Robert E. Huettner and Edward B. Tymann

It is certified that error appears in the above-identified patent and that said Letters Patent are hereby corrected as shown below:

Column 43, line 41, delete "addess" and insert --address--.

Column 43, line 42, delete "address" and insert --only--.

Column 49, line 19, delete "rrans-" and insert --trans---.

Column 49, line 42, after "code" insert --.--.

Signed and sealed this 2nd day of July 1974.

(SEAL)
Attest

EDWARD M. FLETCHER, JR.
Attesting Officer

C. MARSHALL DANN
Commissioner of Patents